US010101036B2

(12) United States Patent
Fuller et al.

(10) Patent No.: US 10,101,036 B2
(45) Date of Patent: Oct. 16, 2018

(54) HEATER WITH FLAME DISPLAY

(71) Applicant: WET, Sun Valley, CA (US)

(72) Inventors: Mark Fuller, Sun Valley, CA (US); Susan Fuller, Sun Valley, CA (US); Dezso Molnar, Sun Valley, CA (US); James W. Doyle, Sun Valley, CA (US); Riae Yoo, Sun Valley, CA (US); Scott Winslow, Sun Valley, CA (US)

(73) Assignee: WET, Sun Valley, CA (US)

( * ) Notice: Subject to any disclaimer, the term of this patent is extended or adjusted under 35 U.S.C. 154(b) by 490 days.

(21) Appl. No.: 14/736,254

(22) Filed: Jun. 10, 2015

(65) Prior Publication Data

US 2015/0354817 A1    Dec. 10, 2015

Related U.S. Application Data

(60) Provisional application No. 62/010,431, filed on Jun. 10, 2014.

(51) Int. Cl.
| | | |
|---|---|---|
| *F24C 15/00* | (2006.01) | |
| *F24C 3/00* | (2006.01) | |
| *F24C 1/14* | (2006.01) | |
| *F24C 15/06* | (2006.01) | |
| *F24H 9/00* | (2006.01) | |
| *F24H 3/02* | (2006.01) | |

(52) U.S. Cl.
CPC ............. *F24C 15/002* (2013.01); *F24C 1/14* (2013.01); *F24C 3/002* (2013.01); *F24C 15/06* (2013.01); *F24H 9/0068* (2013.01); *F24H 3/025* (2013.01); *Y02B 40/166* (2013.01)

(58) Field of Classification Search
CPC ........ F24C 15/002; F24C 3/002; F24C 3/004; F24C 1/14; F24H 9/0068; F24H 3/025
See application file for complete search history.

(56) References Cited

U.S. PATENT DOCUMENTS

| | | | |
|---|---|---|---|
| 517,361 A | 3/1894 | Pomeroy | |
| 2,806,677 A | 9/1955 | Jacobs | |
| 3,654,913 A * | 4/1972 | Derringer | ............. F24B 1/1808 |
| | | | 126/110 B |
| 5,055,031 A | 10/1991 | Werner | |
| 5,388,555 A | 2/1995 | Smith et al. | |

(Continued)

FOREIGN PATENT DOCUMENTS

| | | |
|---|---|---|
| CN | 103196159 A | 7/2013 |
| CN | 203323232 U | 12/2013 |

(Continued)

OTHER PUBLICATIONS

PCT, International Search Report and Written Opinion, PCT/US2015/035211, dated Oct. 15, 2015, 12 pages.

(Continued)

*Primary Examiner* — David J Laux
(74) *Attorney, Agent, or Firm* — Maceiko IP

(57) ABSTRACT

A heater with a visual flame display is described. The heater may include a top portion and a base, separated by concentric cylinders. The innermost cylinder houses a flame element, which may be spun into a vortex. The cylinders may be constructed from transparent materials such that the flame element is visible to an observer. The base provides heat at or near ground level for efficient heat distribution.

16 Claims, 45 Drawing Sheets

(56) References Cited

U.S. PATENT DOCUMENTS

| | | | |
|---|---|---|---|
| 6,186,775 B1 | 2/2001 | Jansohn et al. | |
| 6,799,727 B2 | 10/2004 | Webster et al. | |
| 7,097,448 B2 | 8/2006 | Chesney | |
| 7,175,424 B2 | 2/2007 | Frink et al. | |
| 8,613,277 B2 * | 12/2013 | Hall, Jr. | F23D 14/12 |
| | | | 126/85 R |
| 8,616,010 B2 | 12/2013 | Bakos | |
| 8,641,413 B2 * | 2/2014 | Chen | F23D 5/04 |
| | | | 431/288 |
| 9,328,927 B2 * | 5/2016 | Wang | F24C 1/12 |
| 9,377,187 B2 * | 6/2016 | Chen | F23C 7/002 |
| 9,404,671 B2 * | 8/2016 | Liang | F24H 9/0073 |
| 9,557,051 B2 * | 1/2017 | Chen | F23C 7/002 |
| 9,726,368 B2 * | 8/2017 | Chen | F23C 7/002 |
| 2008/0156892 A1 | 7/2008 | Eberhardt | |
| 2009/0016048 A1 | 1/2009 | McBrien et al. | |
| 2010/0132698 A1 | 6/2010 | Pedersen et al. | |
| 2012/0225391 A1 | 9/2012 | Moetteli et al. | |
| 2013/0160756 A1 * | 6/2013 | Yen | F24C 3/14 |
| | | | 126/275 R |

FOREIGN PATENT DOCUMENTS

| | | |
|---|---|---|
| DE | 20 2007 018 478 U1 | 10/2008 |
| EP | 2 071 244 A1 | 6/2009 |
| EP | 2 098 781 A2 | 9/2009 |
| GB | 2488391 A | 8/2012 |
| WO | WO 1999/020941 | 4/1999 |
| WO | WO 2008/062061 A2 | 5/2008 |
| WO | WO 2013-046174 | 4/2013 |

OTHER PUBLICATIONS www.moderustic.com/Vortex-Fire.html, Moderustic Aquatic Glassel, Vortex Fire, Mar. 28, 2014, 40 pages.

European Patent Office, Communication-Extended European Search Report, Appl. No. 15 806 334.7, dated Jan. 4, 2018, 6 pages.

* cited by examiner

HEATER WITH FLAME DISPLAY

CROSS REFERENCE TO RELATED APPLICATIONS

This application claims the benefit of U.S. Provisional Application No. 61/010,431, filed Jun. 10, 2014, the contents of which are incorporated herein by reference.

FIELD OF THE INVENTION

The present invention generally relates to heaters, including heaters that may warm a surrounding area and provide a visual flame display, as well as heaters that provide an overall aesthetic effect.

BACKGROUND OF THE INVENTION

Various types of heaters that provide heat extracted from fire or flame have existed for some time. These types of heaters include gas-burning devices. However, these types of heaters typically do not visually alter, feature, or display the fire or flame. And while heating devices that display an actual or simulated flame may exist, the flame in these devices typically does not provide significant heat to the surrounding area.

For example, existing outdoor or patio heaters typically include a top section which houses a burner encased behind a screen or perforated metal, through which a flame may be seen and heat radiates. The burner top section typically burns methane, butane, propane or similar gas from a fuel source. The flame in these devices does not form a dramatic visual flame effect, and usually looks like a mere pilot light.

In addition, these existing devices do not efficiently provide heat laterally to the surrounding area because most of the heat is radiated upward through and around the top portion of the device. The heat therefore rises or otherwise dissipates without efficiently heating the area below. As such, existing devices used by restaurants in outdoor areas only heat the areas immediately surrounding the device, in an inefficient manner. It is common to see several such heaters grouped together, because individually, they do not provide significant heat near the ground where the people are standing or seated.

Other types of existing devices may include artificial or simulated flames, but these devices do not use an actual flame with combustion providing heat. As another example, simulated flames have been used in architectural elements such as with indoor or outdoor torches, but these devices are intended to provide only the visual effect of flame, and do not provide significant heat for warming the surrounding area.

For example, U.S. Pat. No. 6,799,727B to Webster entitled "Flame-Effect Heating Apparatus" discloses a heating device with an artificial flame. This device emits some heat to the surrounding area, but the heat is extracted from a hot water source, and not produced by combustion from an actual flame or fire. In fact, the source of heat in this device is not the same source that provides the visual display.

Similarly, GB 2,488,391 to Charlton & Jenwick entitled "Heating Apparatus" discloses a device with an artificial flame. This device is designed for use in homes to provide the sensation of a traditional wood-burning fireplace, while adhering to government regulation that place restrictions on wood-burning fireplaces. However, the artificial flame in this device does not provide heat by combustion.

There are also existing devices in which actual flames may be displayed. However, the visual effect of the flame provided by these devices is limited. Furthermore, these devices are not designed to emit significant amounts of heat for efficiently warming a surrounding area. Instead, these devices are designed to be used primarily as architectural elements for visual effect. In these devices, or architectural elements, any heat from the flame is directed upward into the sky for safety reasons, and away from people in the vicinity of the heater. As such, these devices generally do not warm the surrounding area laterally, as most of the heat travels upward.

In the existing types of devices described above, any noxious fumes from combustion are released upward along with most of the heat. Accordingly, there is no effort made in these devices to separate out noxious fumes from the heat, which makes sense given that providing heat is not a primary concern for these devices.

Another type of existing device in which a flame is displayed is shown in U.S. Pat. No. 7,175,424 B2 to Frink, entitled "Indoor/Outdoor Patio Heater Fire Sculpture." This device uses a flame as an architectural element, and uses a known method of deflecting heat from a metal cap situated perpendicular to escaping gasses. This method of heat distribution is inefficient given that hot air rises, and heat released from the top of a device will quickly dissipate in relation to the area below which is typically the area that needs to be heated. Furthermore, similar to the devices described above where noxious fumes are not separated from heat, the Frink device uses annular chambers as insulators, and releases heat as well as fumes upward, rather than redirecting captured heat for increasing heat transfer to the surrounding area.

DE 202007018478 to Reiger also discloses a device having a flame element. In this device, the flame is housed in the center of annular chambers, but the device uses a fan to draw air from the base and direct it up and out through the top of the device. Again, there is no separation of heat from noxious fumes and any heat is also not released at or near ground level so as to efficiently warm the surrounding area.

Beyond the foregoing, the flame element in existing architecturally-oriented devices typically consists of flames that are relatively static in appearance and cannot be customized. Accordingly, the visual display provided by existing devices is limited. While some existing devices may allow the appearance of the flame to be altered somewhat, these devices typically still do not use vortex flame to provide a dramatic and customizable display or to efficiently heat the surrounding area. These devices also typically release both the usable heat and noxious fumes safely upward.

For example, U.S. Pat. No. 6,186,775 B1 to Jansohn, entitled "Burner for Operating a Heat Generator" discloses a flame vortex to increase the density of a combustion chamber. However, the vortex flame in that device is designed to save fuel, and is not for purposes of providing a visual display. Indeed, this device is a passive device that relies on entrained air, rather than using a blower to spin the flame such that the spinning flame element may also be customized and/or otherwise provide a dramatic visual effect.

EP2098781 entitled "Flame Generating Device" likewise discloses a passive air entrainment system to create a vortex of flame, rather than a forced air design that allows the flame to be modified and customized. In addition, this system is not designed to heat the surrounding area, or to recapture the updraft of the heat and redirect it to ground level for efficient distribution.

Similarly, CN103196159A, entitled "Grading Trapped Vortex Annular Combustor" discloses a vortex in high power gas turbines to increase combustion efficiency, but this device does not efficiently distribute heat to the surrounding area, while also providing a visual flame display.

U.S. Pat. No. 7,097,448 to Chesney, entitled "Vortex Type Gas Lamp," uses a flame element designed to provide light to a room, but the flame therein is not used to efficiently heat the surrounding area. This lamp uses a passive air entrainment flame generator that expels heat and fumes upward, rather than separating the fumes from the heat, and redirecting the heat toward the ground such that it can efficiently heat a room or other surrounding area.

Other existing devices that provide heat include electrically powered radiative heaters. However, such heaters do not include any visible flame element.

Beyond the lack of a heater device that efficiently provides heat and also provides a flame display, there are other drawbacks to existing heater devices. For example, heater devices that are mounted to the ground are not portable. Even existing portable devices may include electric cords for power that may be hazardous when lying on the ground, especially in crowded areas like restaurants.

Furthermore, many existing heaters may become dirty or damaged after repeated use due to fumes and heat byproducts or misuse. Many of these heaters are difficult to clean or repair and are oftentimes continued to be used in restaurants and other locations despite their dirty and/or scratched and dented appearance.

Many existing heaters may also be difficult to start or operate, and may involve components that break or are unreliable. This increases cost and maintenance or may result in the heater not being used.

In view of the foregoing, there is a need for a heater that provides visual effects of a flame, while also emitting heat in an efficient manner to a surrounding area. There is also a need for a heater that provides heat from the visible flame element for purposes of efficiency, and separates the heat while allowing noxious fumes to continue in an upward direction such that they will not adversely impact the surrounding areas. There is also a need for a heater that directs heat downward so that it may be released lower to the ground to increase efficient heat distribution.

The longstanding need for heaters that provide significant heat is confirmed by the fact that existing heaters are used, albeit inefficiently to heat various locations. For example, restaurants employ outdoor heaters on patios and other outdoor dining spaces so that those spaces may be used during evening hours and cool weather seasons. However, the inadequacy of these types of heaters to provide heat is confirmed by the fact that oftentimes, several of these heaters are lined up next to each other because they individually do not provide much heat. Most of their heat goes straight up.

There is also a need for visual displays in heaters to be customized, or customizable. Existing heaters or architectural elements with flame displays do not include dramatic flame elements that may be customized, for example by varying the direction of the flame vortex, the speed of the vortex and/or the color of the flame element. And as noted above, these flames do not provide much heat. Accordingly, there is a need to address these shortcomings and to also customize the flame such that it may be proportional to the heat output.

There is also a need that the size of the device may be varied, such that it may be used to heat a small studio apartment, to heat a larger residence or to heat even larger areas such as outdoor tents or large outdoor spaces. There is also a need for portable heaters.

There is also a need for a heater which may be readily cleaned to address any heat byproducts. There is also a need for a heater that may be readily started and operated.

There is also a need for a heater that provides an overall design and aesthetic that is visually pleasing, and that may harmoniously reside in various locations. To this end, there is a need for a heater that may provide the visual effect of a work of art or that may complement surrounding furniture or the overall motif of its location.

SUMMARY OF THE INVENTION

The heater of the current invention addresses the foregoing shortcomings and other drawbacks of existing heaters and flame displays. It also represents a significant advance regarding its overall design appearance and aesthetic effect.

In a first aspect of the invention, the manner in which the heater efficiently provides heat to warm a surrounding area, while also providing visual flame effects is described. To this end, the heater may include bottom, middle and top sections. The bottom section may include a fuel source and a combustion chamber in which fuel is ignited to create a flame. The middle section may be transparent to reveal the flame display. The top section may include one or more heat exchangers to capture heat from the flame. This heat may be directed downward toward a fan that may be located in the bottom or base section, so that the heat is released from the base at or near ground level. Any noxious fumes resulting from combustion may be separated from the heat, so that the fumes are directed upward or outward from the top of the heater or otherwise away from the space to be heated and/or nearby individuals.

In a preferred embodiment, the flame may be adjustable or otherwise customizable. For example, the flame may be twirled or experience other air effects to create a vortex or other appearance. Furthermore, the direction of the flame vortex may be varied, as may the speed of the flame in the vortex and/or the color of the flame. The height and width of the flame vortex may also be varied or otherwise customized.

In this manner, the heater of the current invention may provide a dramatic aesthetic effect that conveys mood and/or complements the surrounding area.

The middle section through which the flame may be displayed may comprise inner and outer, or twin, cylinders separated by an annular gap. The inner cylinder may house the flame element, while the outer cylinder may shield persons and objects in the vicinity of the heater from the flame. The outer tube may also provide a shatter-resistant structure to help support the heat exchanger on top. The annular gap between the cylinders may provide a duct or passageway for heat captured in the top section to be directed or drawn downward, such that it may be released through exhaust vents in the base. Other shapes, including non-curved shapes such as squares, rectangles or triangles may be used for the inner and outer tubes.

In another aspect of the invention, a device that provides heat in an efficient manner is described. To this end, the device preferably provides heat from its base at or near ground level. This is preferred because heated air generally rises, so releasing the heated air at or near ground level allows more heat to be laterally or radially distributed as it rises. This expanded footprint of heat provides more efficient heating of a room or other surrounding area. This aspect is in sharp contrast to existing devices that emit heat through their top portions, where such heat rises above the surrounding area and/or nearby individuals.

In this aspect of the current invention, the heater's increased efficiency preferably meets and/or exceeds legislative standards for energy efficiency. Accordingly, this aspect of the invention may result in discounts on utility bills and/or other cost savings.

In another aspect of the invention, the use of fans to draw heat from the flame and deliver it to the surrounding area is described. To this end, a fan may be located in the base or near the bottom of the device to draw heated air downward through the annular gap or other duct and then deliver it to the surrounding area, for example, through the heat exhaust ports located in the base. This placement of the fan lowers the overall center of gravity of the heater, makes the heater more stable, and provides a view of the flame without electric wires or opaque obstructions between the viewer and the fire.

The fan may be an electrically driven axial fan. The fan preferably operates smoothly and quietly by providing the primary structural support for the heater, as well as electrical and gas utilities, through the center hub of the fan. This preferably allows the fan blades to reach further out towards the dimensions of the base so as to provide an increased downward force to draw heat from above. As such, the fan approaches the best performance for low noise and high flow operation. Alternatively, the fan blades may extend shy of the heater base so that utilities may be run in the gap therebetween. The axial flow fan may alternatively be replaced with a centrifugal fan running along the inside base. The fan may be belt driven or direct drive. The fan may be controlled by control circuits to manage fan speed and direction.

In another aspect of the invention, the life span of the heater is preferably increased and its need for maintenance may be decreased. For example, heat from the fan motor in the base may be directed outward with the heat from the flame. This may cool the fan apparatus and lead to longer fan life and better operation, as well as distribute the heat generated by the electric fan.

Other aspects of the current invention relating to the base section are also described. For example, the base section may include a fuel source, a combustion chamber and exhaust vents to deliver heated air to the surrounding area. A series of control circuits and solenoids may manage fuel flow and an ignitor or pilot light to provide for main burner starts and restarts of the flame. Air ejectors or inlets may be placed downwind of the fan but prior to the exhaust ports to add cool air to the hot air stream to regulate temperature and increase the total flow of warm air leaving the exhaust ports.

The exhaust port(s) may distribute heat evenly around the heater. Alternatively, one or more focused exhaust ports may be used, or a method of covering parts of the exhaust ports to focus the heated air in a selected direction may be employed. For example, doors that may open and close over parts of exhaust vents 22 may be used.

The fuel source may be either intrinsic or extrinsic. The fuel may be mixed with chemical elements to create different visual effects, such as different color effects. The combustion chamber may be used to create the flame from the fuel mixture.

Other aspects of the current invention regarding the heater's top section are also described. The top section may include a heat exchange cap or housing that contains one or more heat exchangers that capture heat from the flame, which heat may be directed downward toward the exhaust vents in the base section.

The heat exchange cap may also separate fumes of combustion from the heat, such that any noxious fumes may be dispersed in a safe manner. For example, the heater may be vented or otherwise configured such that harmful fumes and/or combustion products are directed out of the heater's top end, away from the area to be heated and/or nearby individuals. Alternatively, fumes and combustion products may be directed out the side of the top section. At the same time, the captured heat may be directed back toward the ground via the annular gap or other duct between the tubes of the middle section.

The heat exchanger(s) located in the top section may be configured to run cool, so that leaves, building materials or other materials that may come into contact with the top surface, may be shielded from the heat of the flame. This adds to the safety aspect of the invention.

In a preferred embodiment, an air-to-air heat exchanger may be placed in the heat exchanger cap or otherwise above the twin cylinders of the middle section. Configurations of multiple stacked air-to-air heat exchangers may also be used. Alternatively, one or more water filled radiators may be housed in the heat exchanger cap.

In another aspect of the invention, additional uses of air flow are described. For example, the heater may draw in cool air from the surrounding area into the top section so that it is heated. More specifically, ambient air may be pulled into the heat exchangers from a location below the fume exhaust by the draw of the fan located in the base of the heater. This air may pass through the small channels of the heat exchanger, transferring the heat of the flame to the passing air. This air may then be directed to the gap or duct between the tubes of the middle section and drawn toward an exhaust port at or near the ground. Ambient air may also be drawn into the base and mixed with heated air to arrive at a desired temperature prior to the heated air being emitted through the exhaust ports.

In another aspect of the invention, a portable heater is described. This is in contrast to existing heating devices that are mounted to a floor or other stationary structure. For example, the fuel source and other components that provide heat as well as a visual effect may be contained in the device so that the whole system may be readily transported.

To maximize portability of the device, the base section may house a variety of batteries to power fans and other aspects of the device. The batteries may eliminate the need for electrical cords, which may result in hazards. For example, in the restaurant setting, cords stretching between tables can cause patrons and employees to trip. The absence of cords improves safety, as well as allowing users to easily position the device as desired.

The base section may also house a propane bottle or other fuel that may be removed or replaced as needed. This increases the ease of use in addition to increasing the portability of the device. Alternatively fuel and electricity may be hard-wired to the device.

In one embodiment, the portable heater may be mounted as part of a table, wherein the base is located below the table and the fire display extends up from the table. In this embodiment, the base may function as the support for the table.

As an alternative, the heater may be mounted to or in the ground or other subterranean mount. In one embodiment, the base section may be located under ground so that the fire display extends from the ground level up so that the flame display may be the main focus. In this embodiment, the heated air may be released from the ground surrounding the heater or from some other location.

In another aspect of the invention, the device may be operated by remote control for ease of use. The remote control may ignite the combustion chamber, and dictate the speed and direction of the vortex fan to alter the visual display.

In another aspect of the invention suitable for indoor use, the base may comprise a combustion chamber and vortex inducing fan and supporting subsystems thereby omitting a fan to draw heated air down. In this version, reaching from floor to ceiling, the heat exchanger may be mounted above the ceiling within traditional HVAC ducting and supported by the building structure. An exhaust stack may provide for removal of fumes, while airflow through the heat exchanger running perpendicular to the heater flame may feed warm air directly into the central heat ducting system, with forced air pressure being provided by a fan in the heating duct system, rather than in the base of the fire display unit. In this version, concentric cylinders may be unnecessary.

In another aspect of the invention, the heater provides a pleasing overall design appearance and aesthetic effect. To this end, the heater of the current invention preferably has a sleek appearance that may evoke an appearance of art or fine furniture. The heater may also aesthetically complement the surrounding furniture and/or motif of its location. The aesthetic effect of the heater may also be enhanced by the dramatic and variable fire display referenced above.

Other aspects of the invention may involve any of the foregoing in combination with each other.

DETAILED DESCRIPTION OF THE PREFERRED EMBODIMENTS

Figure 1:
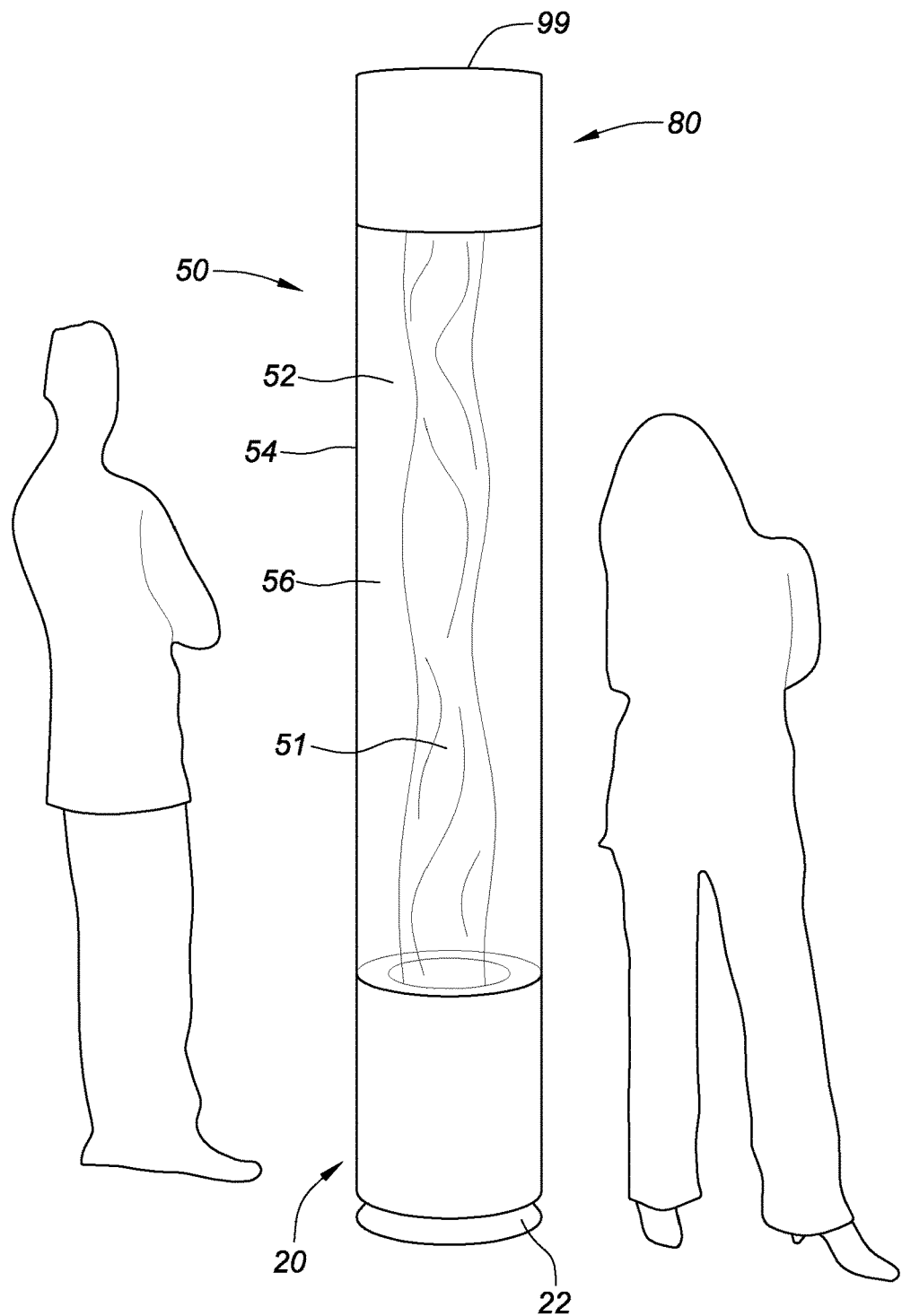
FIG. 1 is a perspective view of a heater having a fire visual display.

Preferred embodiments of heater 10 of the current invention and related items are now described. In general, heater 10 may efficiently provide heat to warm a surrounding area and also provide a visual feature of a flame, such as a flame or fire vortex or expression. In this manner, heater 10 may uniquely serve both the utilitarian function of providing heat, as well as the aesthetic function of providing a dynamic visual display that enhances its location. As discussed in more detail below, the overall design of heater 10 itself may also be aesthetically unique and significant.

It is preferred that heater 10 provides a significant amount of heat to warm various types of surrounding areas such as rooms, apartments, other housing or business locations, outdoor locations and other areas. It is also preferred that the heat provided by heater 10 may be varied in intensity and the direction(s) at which heat is provided to suit different areas to be heated. Similarly, the flame vortex may be adjusted to provide different appearances, moods and expressions. In this manner, the vortex may be customized according to the user's preferences, to match the intensity of heat provided by heater 10, to match a desired mood, to complement the motif of its surroundings or otherwise.

It is also preferred that heater 10 is versatile. For example, it may be portable so that it may heat different surrounding areas. Any noxious fumes from the combustion associated with the vortex flame may be directed away, e.g. through the top or side of its upper section. Heater 10 may also be remotely controlled, such as by a wall switch or by a mobile app for a user's cell phone, tablet or other mobile or remote device.

Heater 10 of the current invention is now described with reference to the figures. Components appearing in more than one figure bear the same or similar reference numerals.

The general operation of heater 10 is first described with reference to FIGS. 1-4. As shown in FIG. 1, heater 10 may include base or base section 20, midsection 50 and top section 80. Though FIG. 1 shows heater 10 as being cylindrical, other shapes, including non-curved shapes, may be used. Furthermore, the relative dimensions of base 20, midsection 50 and top section 80 may vary. In a preferred embodiment, however, base, mid and top sections 20, 50, 80 may be similarly shaped and dimensioned to provide a sleek appearance. It is preferred that midsection 50 is clear or transparent, or has some amount of transparency, e.g., lightly colored, so that the flame display is visible.

Figure 2:
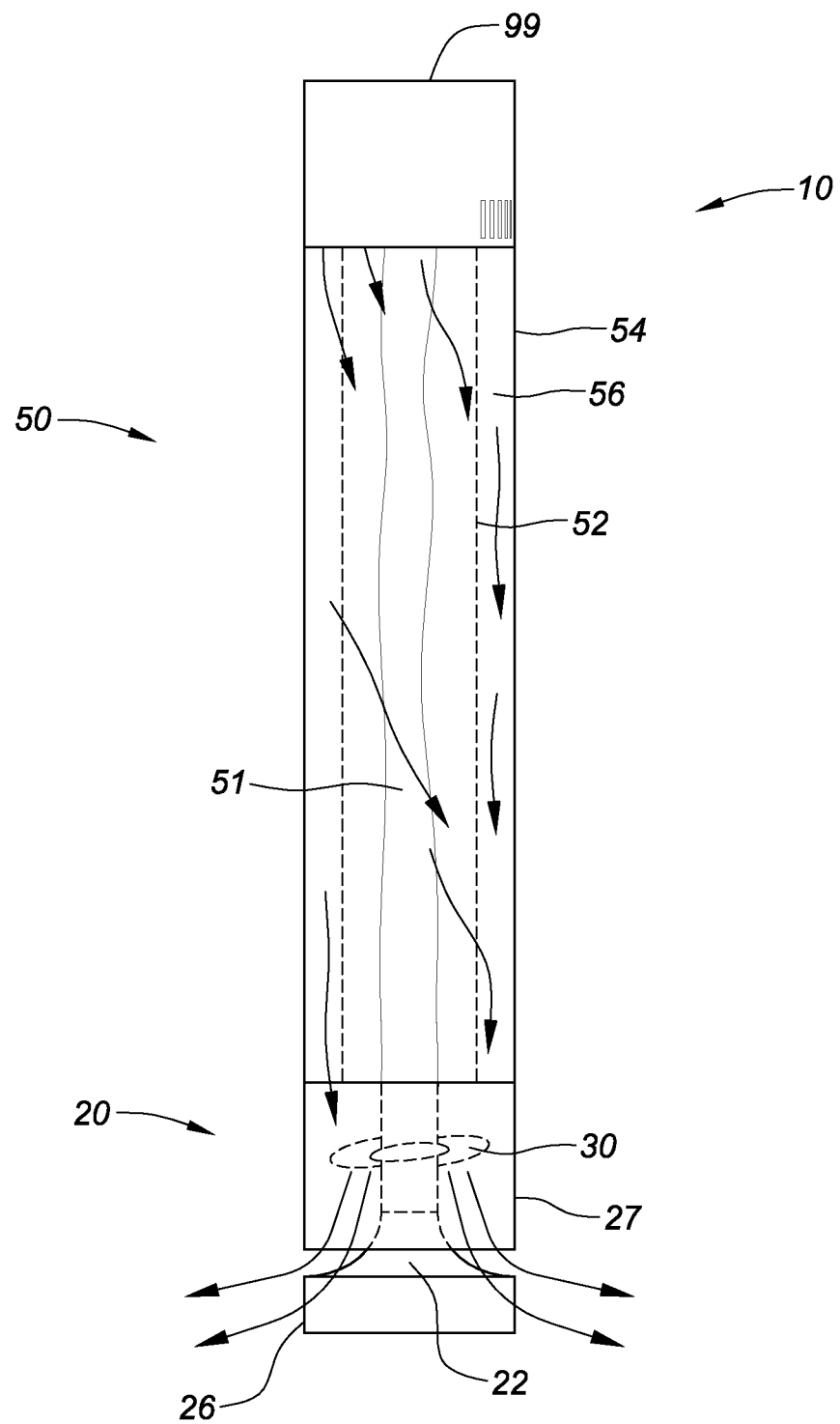
FIG. 2 is a side partial cross-sectional view of the heater including the flame element and a depiction of the airflow.
Figure 3A:
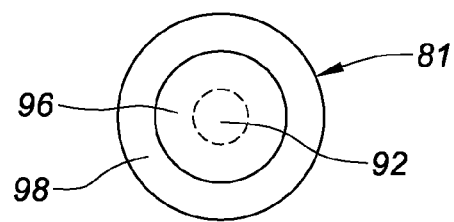
FIG. 3A is a top view of the heater.
Figure 3:
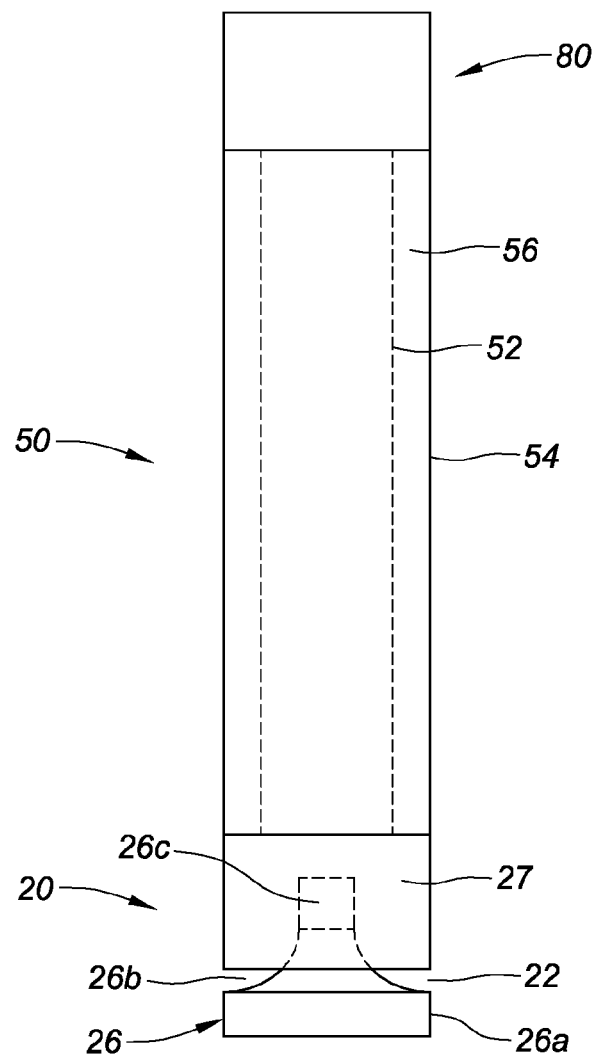
FIG. 3 is a side partial cross-sectional view of the heater.
Figure 4:
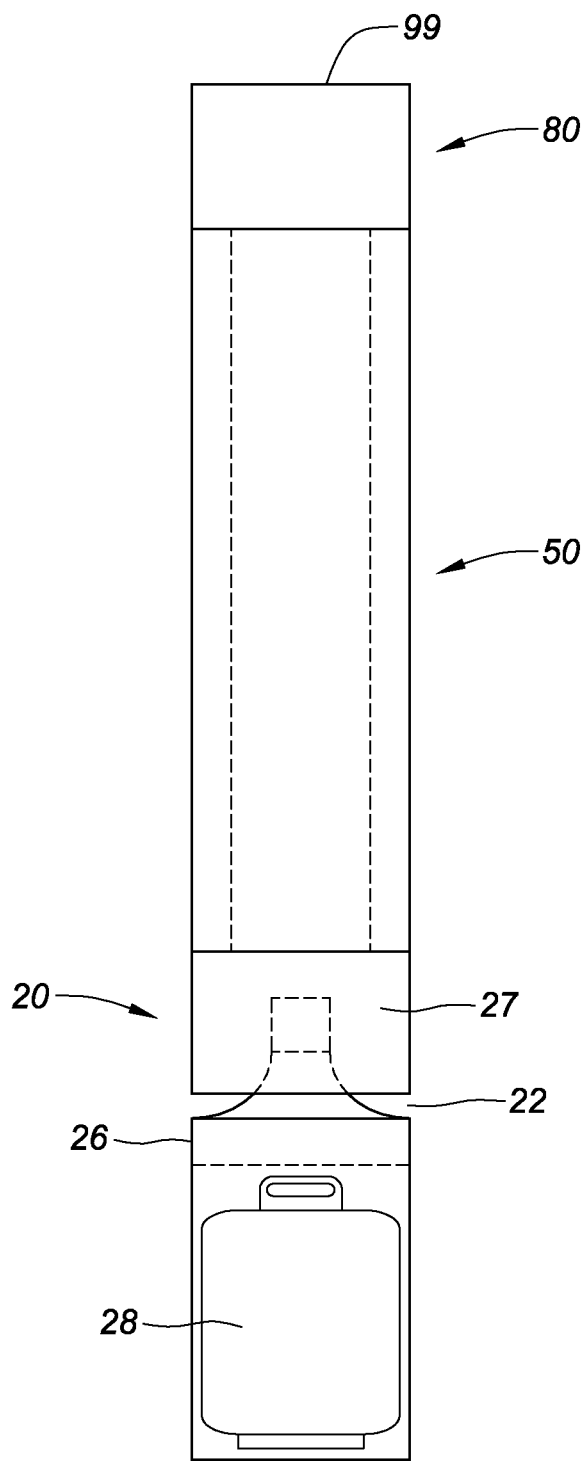
FIG. 4 is a side partial cross-sectional view of the heater, showing a fuel source.
Figure 7:
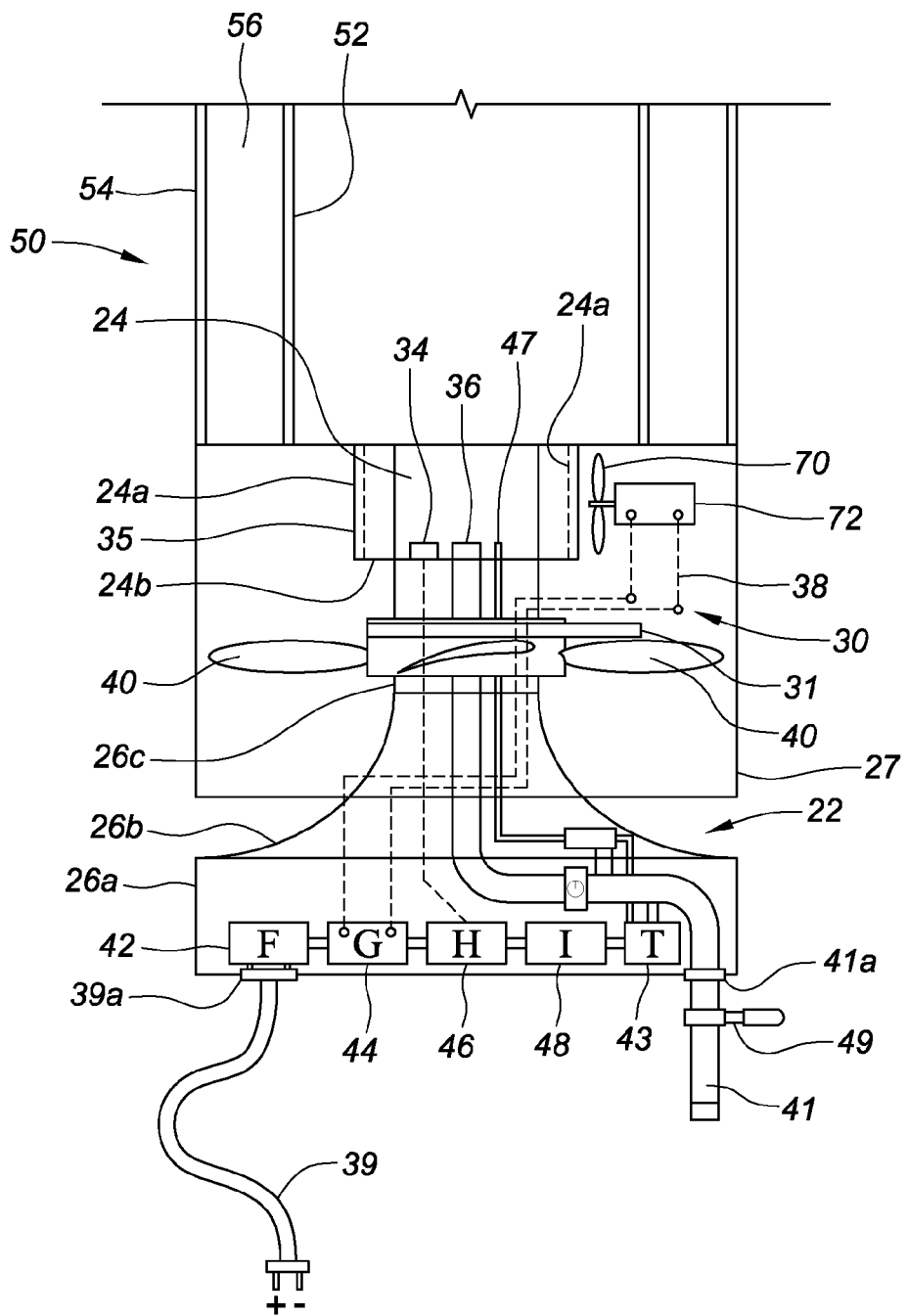
FIG. 7 is a side cross-sectional view of the base of the heater, including a base fan.

As shown in FIGS. 2-4, base 20 may generally include pedestal 26 and cabinet or base tube or cylinder 27 that may in turn contain various components. Base 20 may include exhaust outlet(s) 22 formed between pedestal 26 and cabinet 27 to provide heated air to the surrounding area. Base 20 may also include combustion chamber 24. As shown in FIG. 4, base 20 may include an extended pedestal 26 that may contain a fuel source, such as portable gas tank 28. Fuel from the fuel source may be fed to combustion chamber 24 where it may be combined with air and ignited to create combustion in base 20. The resulting flame may rise so that it is visible in midsection 50. As shown in FIG. 7, vortex fan 70 may also be positioned in base 20 to provide rotation to swirl the flame into flame or fire vortex or expression 51 as the flames rise through midsection 50.

As shown in FIG. 1, midsection 50 may include inner cylinder 52 and outer cylinder 54 that may be separated by annular gap 56. Flame vortex 51 is generally contained within inner cylinder 52, and as the flame continues upward through midsection 50, it preferably provides a dramatic visual display or expression that may be adjusted by the user. Vortex flame 51 and its associated heat and other combustion products such as fumes may then enter top section 80.

Heat generated from the flame may be captured by one or more heat exchangers located in top portion 80. Air may be forced to flow through top portion 80, which air may capture heat from the heat exchangers. This heated air may be drawn downward through annular gap 56 of midsection 50 and into base 20. More specifically, fan assembly 30 in base 20 may draw heat downward from top section 80 through annular gap 56 of midsection 50. The heat may then enter base 20 where it may be emitted through exhaust vents 22 at or near ground level. In this manner, heat is efficiently provided to the surrounding area, in that the heat is provided at or near ground level and may be laterally or radially distributed over a larger footprint or area as it rises in the surrounding area. This is in contrast to existing heaters that provide heat at some distance above the ground only to have the heat rise and dissipate without achieving any significant heating of the surrounding area.

As noted above, top section 80 may include one or more heat exchangers that capture the heat from flame vortex 51. However, it is also preferred that any noxious fumes or other undesirable combustion products are separated from the captured heat and are directed upward or outward, away from persons nearby.

The overall appearance of heater 10 is now further described with reference to FIG. 1. The relative heights and other dimensions of each of the sections 20, 50, 80 may vary, as may the overall height and width of heater 10. For example, heater 10 may generally be smaller when used to heat smaller areas such as studio apartments. Larger dimensions may be used to heat larger areas.

As shown, base 20 and top section 80 may generally be opaque so as to enclose the components housed therein. The finish used for base 20 and top section 80 may vary to suit the surrounding area to be heated. To this end, heater 10 may be configured to match other furniture or decor in a residence or business. For example, base and top sections 20, 80 may be a certain color to match surrounding decor. As another example, for indoor or outdoor uses, base 20 and top section 80 may be stainless steel or brushed aluminum or other metallic finish. Alternatively, for a more industrial look, base 20 and/or top section 80 may be transparent so that their components are visible.

Though heater 10 in FIG. 1 is cylindrical, other shapes may be used. For example, heater 10 may be shaped to have a square, rectangular, triangular or other shaped cross section. In this configuration, midsection 50 may include inner and outer tubes having a square or other shaped cross section with an annular gap between them. The shape of heater 10 may be configured to match furniture in the space to be heated and/or to address other design considerations. Furthermore, base 20, midsection 50 and top section 80 may have different cross sectional shapes and need not all be cylindrical or have other matching cross sectional shapes. However, in a preferred embodiment, it is preferred that base, mid and top sections 20, 50, 80 are similarly configured to provide a sleek appearance and aesthetic effect.

As noted above, midsection 50 is preferably clear or generally transparent so that flame vortex 51 is visible. Midsection 50 may be clear, tinted or some other color.

Midsection 50 may also be configured to become opaque and transparent as desired by the user. As discussed in more detail below, the color, speed, direction and other characteristics of flame vortex 51 may be adjusted to suit different moods or to better match the area in which it is located.

In sum, heater 10 may serve the utilitarian function of providing heat, while also serving the aesthetic effect of providing an adjustable flame display. Furthermore, the appearance of heater 10 may also provide an aesthetic effect, akin to a unique piece of furniture or other design feature of the space in which it is located.

Base section 20 and its components are now further described with reference to FIGS. 1, 2, 3, 4 and 7. As shown in FIG. 1, base 20 may include pedestal 26 and base tube or cabinet 27. These components may be attached together to form a closed cabinet which may house various components described below. The closed nature of the cabinet may contribute to the aesthetic appeal of heater 10. Base 20 may be cylindrical, as shown in FIG. 1, but other shapes are also contemplated such as square, rectangular, triangular, elliptical or other shapes or combinations of shapes. The outer surface of base 20 may be customized with a variety of finishes in order to complement the surrounding decor and/or create a particular atmosphere.

As shown, pedestal 26 may extend up into cabinet or base tube 27. Pedestal 26 and cabinet 27 may also be separated by a gap, thereby forming exhaust vent 22, to allow heated air to be distributed at or near ground level. Other types of exhaust vents to provide heated air may also be used. In other embodiments, heated air may be provided above ground level, but in general, it is preferred that heated air be released at a lower height to take advantage of the heating efficiency associated with heated air rising in the surrounding area. In this manner, more heat may be laterally or radially distributed over a larger area as it rises. This is in sharp contrast to existing devices that provide heat at or near the top of the device.

Pedestal 26 may itself include a base or lower portion 26a which may rest on the ground. It is preferred that pedestal lower portion 26a have sufficient width to stably support heater 10. Pedestal lower portion or pedestal base 26a may also include legs (not shown) that extend radially outward to provide increased stability. Lower portion 26a may also be square or otherwise have a larger footprint. In other embodiments described later, heater 10 may be implanted in the ground such that base 20 may generally be subterranean.

Further up, pedestal 26 may include vent portion 26b which may be curved to help direct heated air out of base 20 and into the surrounding area. As shown in FIGS. 2, 3, 4 and 7, the curve of vent portion 26b may be concave, though other profiles may be used, including non-curved profiles. It is preferred that the profile of vent portion provide for the laminar flow of the heated air to increase overall heater efficiency. Vent portion 26b may be attached to pedestal base portion 26a or may be contiguous therewith.

Further up, pedestal 26 may also include support or structural portion 26c which may be cylindrical and which may be attached to vent portion 26b. Structural portion 26c may also be secured to cabinet 27 to form base 20. For example, support section 26c may engage a corresponding support structure (not shown) formed in the interior of cabinet 27. Besides supporting cabinet 27 and heater 10, support section 26c may also serve as the support or axle around which fan assembly 30 rotates.

In a preferred embodiment, support 26c may be cylindrical having walls that are strong enough to stably support heater 10. In this embodiment, it is preferred that support section 26c have a sufficient diameter to allow the passage of services such as fuel lines, injectors and/or other utilities within its diameter. And as discussed further below, the dimensions of support 26c preferably allow the blades of fan assembly 30 to extend further out towards the outer dimensions of cabinet 27. Alternative support structures may be used to support mud and top sections 50, 80 as discussed later.

The pedestal base, venting and structural sections 26a, 26b, 26c of pedestal 26 may be welded together or may be attached to each other with nuts and bolts or other suitable fasteners. Alternatively, these sections may be contiguously formed.

The height of base 20 may be varied in order to accommodate different uses for the heater, as well as the components contained therein. For example, as shown in FIG. 4, pedestal 26 of base 20 may include fuel source 28. In this configuration, pedestal 26 and base 20 may be taller to accommodate fuel source 28. As an example, base 20 may be 18" tall, though other smaller or larger heights may be used and the invention is not limited to this example. Pedestal 26 may also house a battery to provide power for any electrical functions that may be included in heater 10, e.g., lighting and the like.

In this embodiment, pedestal base 26a may include a door through which replacement gas tanks or other fuel sources and/or batteries may be changed as necessary. An advantage of this embodiment is that heater 10 may be self-contained and be transported without the need to consider fuel lines and electrical cords.

Alternatively, as shown in FIGS. 2, 3 and 7, pedestal base 26a need not contain a fuel source and/or battery, and instead, fuel and electricity may be hard-wired to heater 10. In this embodiment, as best shown in FIG. 7, fuel may be provided from a remote fuel source 28 (not shown), and pedestal base 26a may include inlet port 41a to accept a fuel line such as gas line 41 that may provide fuel to heater 10. Fuel line 41 may include main fuel valve 49 that may serve to close or open the fuel supply. Pedestal base 26a may also include outlet 39a into which electrical line 39 may be plugged to provide power for lighting, motors and/or other electrical functions. It is preferred that electrical line 39 may simply plug into a standard wall outlet. This embodiment of heater 10 is also portable in that it may be relocated by simply disconnecting any utility lines.

In one embodiment the utilities may come up from a floor and engage the bottom of pedestal portion 26a. Alternatively, the utilities may engage the sides of pedestal portion 26a.

As also shown in FIG. 7, pedestal 26 may also contain other components. For example, pedestal 26 may include sequence switches and relays unit 42 which may generally serve as a control unit. Control unit 42 may transmit electrical signals through base 20 to various components and at various times to provide desired functions. For example, switches and relays unit 42 may be connected to fan speed control unit 44 that may control fan assembly 30. Control unit 42 may also be used to turn heater 10 on and off, customize flame 51 and provide other functions. To provide these functions, sequence switches and relays unit 42 may include suitable memory and other electronics.

Pedestal 26 may also include high voltage transformer 46, fuel control valve 48, chemical injector 43, pilot light valve 45 and their associated electrical lines. Transformer 46 may step down the incoming voltage for transmission through heater 10. Fuel control valve may control the amount of fuel provided for combustion. Chemical injector 43 may serve to add chemical(s) to the fuel to be combusted to enhance combustion, to change the color of flame 51 and/or otherwise vary the visual effects provided by vortex flame 51. As shown, these components may be housed in pedestal base 26a at a location near the ground. This preferably contributes to a lower center of gravity and overall stability of heater 10. Alternatively, these components may be located in other suitable locations. Fuel line 41 may also extend to pedestal base 26a en route to combustion chamber 24 discussed later.

Pedestal 26 may also include pilot light valve 45 located in its vent portion 26b. Pilot light valve 45 may control an igniter or a pilot flame to turn heater 10 on and off. As also shown in FIG. 7, vent portion 26b may also contain wiring to support the foregoing components. It is preferred that this wiring pass through the middle of vent and structural sections 26b, 26c, i.e., in what may form the axle for fan 30. This preferably avoids stray wires that may interfere with fan 30 and/or may become too hot if subjected to heated air.

Base 20 may include an air intake (shown in FIGS. 17 and 17A), which may pull fresh air into base 20 to facilitate combustion or to help vortex fan 70 create flame vortex 51 as discussed below. Base 20 may further house fan assembly 30 to draw heated air downward through heater 10 and release it to the exterior via vents 22 at or near ground level. Fresh air intake(s) may be located between fan assembly 30 and vents 22 so that cool ambient air may be mixed with heated air to achieve a desired overall temperature. To this end, thermistors or other temperature sensing units may be placed in base 20 or other locations in heater 10 to provide feedback and temperature control. For example, they may be placed at the exit of vents 22 to monitor the temperature of the heated air being provided to the surrounding area. Alternatively, they may be located elsewhere to monitor the temperature of different sections of heater 10 for safety and efficiency purposes.

The manners in which fuel may be combusted and flame 51 may be created are now further described with reference to FIG. 7. Base cylinder or cabinet 27 may include combustion chamber 24 in which the fuel is ignited to provide a flame or fire. Combustion chamber 24 may include cylindrical wall 24a and chamber bottom 24b though chamber 24 may assume other shapes. Combustion chamber 24 may be formed contiguously to the interior of base cabinet 27 or may be attached thereto. It is preferred that the walls of combustion chamber 24 not conduct excessive heat to their outer surfaces to avoid overheating other components located within base 20.

Various components may protrude through chamber bottom 24b. For example, fuel line 41 may extend through base support section 26c and into combustion chamber 24. Fuel line 41 may conclude with fuel injector 36 which dispenses fuel for combustion in chamber 24.

Spark igniter 34 may also protrude through combustion chamber bottom 24b, and may ignite the fuel injected by fuel injector 36. Pilot fuel injector 47 may also protrude into combustion chamber 24 and may inject pilot fuel into chamber 24. Though these components are shown as protruding through chamber bottom 24b, they may enter chamber 24 through walls 24a or other suitable locations. In any event, after the fuel is ignited in combustion chamber 24, a flame or fire is provided that may rise into midsection 50.

The manner in which chemical additives may be added to the fuel is now further described. Chemicals may be added to the fuel by chemical injector 43. The fuel and additives may be mixed together and released into a combustion chamber to create a flame. The fuel may be injected with various chemicals to customize the visual display. For example, chemicals may be added to adjust the color of the flame. Such chemicals may be housed in chemical injector 43. The fuel and chemicals may be released into combustion chamber 24 via control valve 48 which may be located downstream from chemical injector 43. To provide multiple effects to flame 51, different chemicals may be provided by multiple chemical injectors 43, which may be controlled by control unit 42. Varying the color of flame vortex 51 may provide aesthetic benefits to fit a desired mood or complement the heater's surroundings.

The components discussed above in connection with providing fuel and chemicals into combustion chamber 24 may also be used in the embodiment shown in FIG. 4 which includes the fuel source 26 in base 20. With this embodiment, these components may generally be located between gas bottle 28 and combustion chamber 24.

The manner in which the flame may be configured as a swirling vortex is now further described with reference to FIGS. 2, 7, 8, 31, and 32A-B. In general, combustion chamber 24 may include vortex air slots 35 which allow air to mix with the fuel (as well as chemical additives) for combustion. Vortex fan 70 may blow air into the fuel mixture through vortex air slots 35. Vortex fan 70 may be powered by a vortex fan motor 72. Fan 70 may spin the air and fuel as they combust. As the resulting flame rises from combustion chamber 24 to midsection 50, the flame preferably twirls. As such, flame or fire vortex 51 is created.

Figure 8:
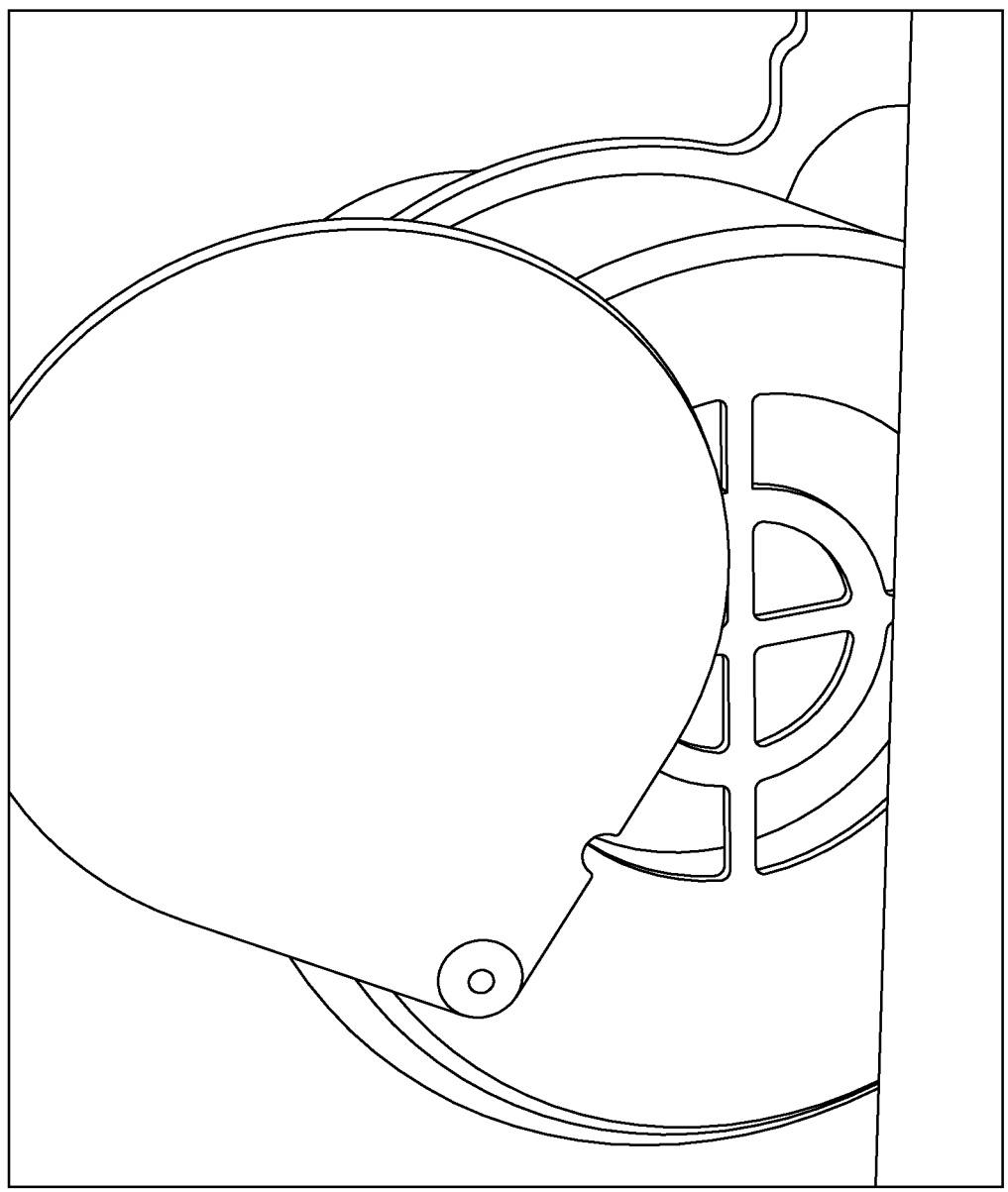
FIG. 8 shows an air intake in the present invention, including a mechanical plate that may vary the amount of air drawn into the vortex-inducing fan.

The appearance of flame vortex 51 may be controlled and/or customized. For example, the size of vortex air slot 35 may be varied while the fan speed remains constant in order to vary the speed of rotation of flame vortex 51. As shown in FIG. 8, a mechanical plate may be moved to open or close slot 35 to vary the amount of air delivered to combustion chamber 24. Alternatively, the speed of vortex flame 51 may vary depending on the speed of fan 70. With either type of flame control, the speed of vortex fan 70 and motor 72 may be controlled by fan speed control unit 44, which may in turn be controlled by control unit 42. As shown, electrical lines may couple fan speed control 44 to fan motor 72. As mentioned above, it is preferred that these electrical lines pass through the center of fan assembly 30, i.e., through structural support section 26c.

Figure 31:
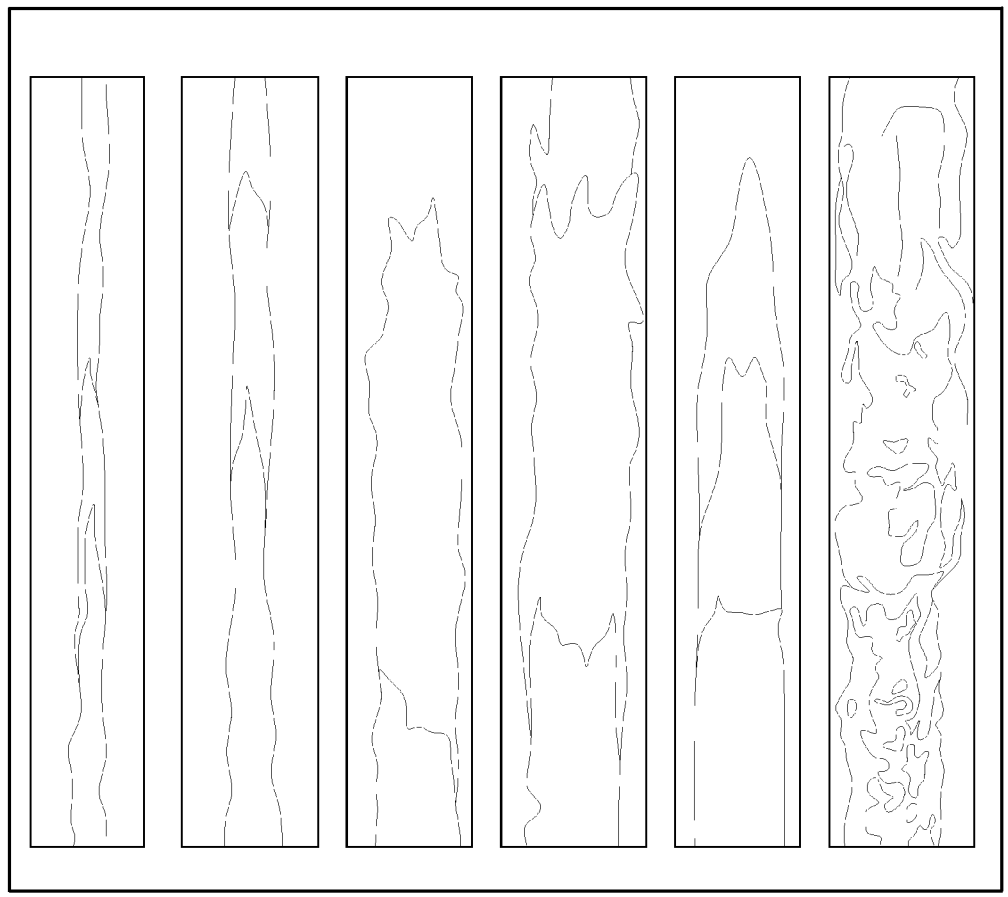
FIG. 31 shows a variety of different fire vortices or expressions that may be created by the heater.

When vortex fan 70 is spinning rapidly, a tight and fast moving vortex may be created. As the fan is slowed, the flame may spread out and spin at a lower rate. Vortex fan 70 may have a range of speeds, and may also be reversible, such that the direction of flame vortex 51 may be reversed. The gas output may also be varied to produce different expressions. This may occur through solenoids that may be used to control the flow of gas. To this end, increasing gas flow may generally increase the amount of flame in vortex 51 and/or may increase its height. FIG. 31 illustrates a variety of different flame vortices 51 that may be achieved by adjusting the speed of vortex fan 70 and/or gas output through gas line 41 and fuel injector 36.

Figure 32A:
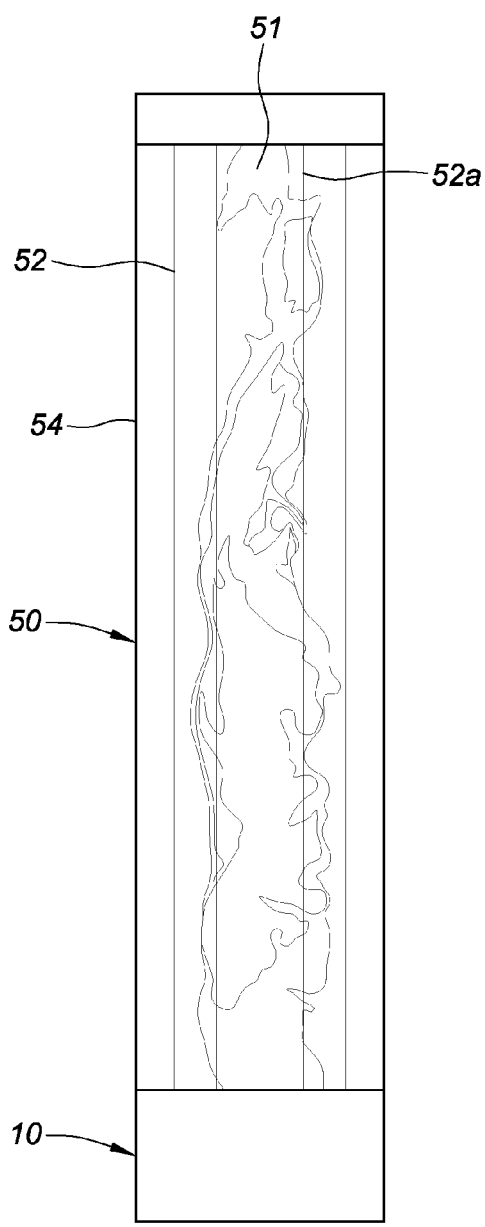
FIGS. 32A and 32B show different fire vortices or expressions that may be created by different embodiments of the heater.

The flame vortex 51 may also be modified to extend the run time of the available fuel source and/or to provide additional visual effects or expressions. As shown in FIG. 32A, heater 10 and midsection 50 may include an additional innermost cylinder or tube 52a having a smaller circumference than inner cylinder 52 and outer cylinder 54. The flame vortex 51 may spin around the outside of innermost cylinder 52a, thereby allowing a smaller flame vortex 51 to appear larger while advantageously using relatively less fuel. In this manner, the visual spiral of flame vortex 51 may also be increased since the center will be hollow.

Figure 32B:
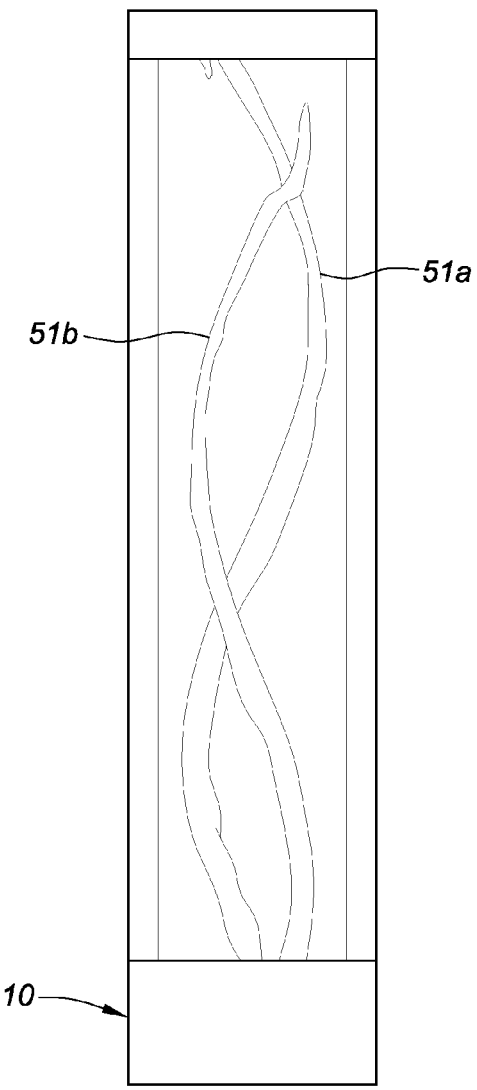

Alternatively, as shown in FIG. 32B, multiple smaller jets such as multiple fuel injectors 36 may be utilized to create a plurality of smaller flame vortices 51a, 51b that may appear to spin, or dance, around each other. In one embodiment, for example, multiple fuel injectors 36 may feed combustion chamber 24 in a spaced apart arrangement whereby each injector 36 may result in a separate fire vortex 51a, 51b, etc. Alternatively, several injectors 36 may be located close together to provide a single fire vortex, and another group of injectors may be spaced close together, though at some distance from the first group, to provide a second fire vortex. In this manner, stronger but still separate fire vortices 51a, 51b may be created. Additional groups of injectors may provide additional fire vortices.

Various visual effects may be provided by separate multiple flame vortices. For example, they may be sequentially turned off and on, they may be colored differently and their expressions may vary by changing the gas flow. And if each separate individual injector or each separate group of injectors has a separate vortex fan 70, another dimension of varying the expressions is added.

Further, the appearance of flame vortex 51, or multiple flame vortices 51, may be adjusted to convey different moods and/or aesthetic effects. For example, a chemical additive may be added to the fuel when flame vortex 51 reaches a certain speed. In this manner, for example, flame vortex 51 may be red when spinning quickly to signify increased intensity. If flame vortex 51 is slowed, the red additive may be deleted and/or another softer color, e.g., yellow may be injected into the fuel to convey a softer appearance. The control of all the foregoing may be implemented by control unit or sequence switches and relay unit 42. Control unit may be programmed so that it provides any number of preprogrammed adjustments to flame vortex 51 or vortices 51. As such, heater 10 preferably serves a significant aesthetic function while also providing heat.

In any event, flame vortex 51 may rise up through midsection 50 to top section 80. At this point, heat may be captured and directed downward through annular gap 56 back down to base 20. Fan assembly 30 and the manner in which it draws heat down to base 20 and exhausts heated air to the surrounding area is now further described with reference to FIGS. 1-4 and 7.

Fan assembly 30 may be an axial flow fan with rotating blades 40 that may draw heated air from the flame downward through annular gap 56 for release through vents 22 at or near ground level. This efficient release of heat is in sharp contrast to existing heater devices that release heat and exhaust upward, rather than delivering heat through lower exhaust vents. Locating fan 30 in base 20 is also preferred because this relatively low position also contributes to lower center of gravity and overall stability of heater 10.

Locating fan 30 in base 20 also provides that the view of flame 51 in section 50 is not obstructed by electric wires or opaque obstructions between the viewer and fire 51. This also facilitates the overall sleek appearance of heater 10.

It is preferred that a single heated air fan 30 sufficiently draws heated air down for release. This preferably allows quiet and energy efficient operation, as well as a reduced number of moving parts for maintenance purposes. Fan assembly 30 may be powered by fan motor 38 which drives a pulley that is coupled to propeller or blade assembly 40 by fan belt 31. A direct drive fan without a belt may also be used as discussed later. Fan blades 40 may be rotatably mounted to support section 26c of pedestal 26. To this end, suitable bearings may be located between support 26c and propeller 40.

Fan assembly 30 may operate smoothly and quietly given that its primary structural support, as well as all of the electrical and gas utilities, may be located through the center hub of the fan as depicted in FIG. 7. A central location of fan 30 also allows the fan propeller blades 40 to reach the maximum diameter within the restriction of the base 20. This allows blades 40 to be more accurately positioned below annular gap 56 to increase or maximize the downward force to draw heat down. As such, fan 30 approaches the best performance for low noise and high flow operation. Fan 30 may alternatively be replaced with a centrifugal fan that may run along the inside of base 20.

As shown in FIG. 7, blades 40 may be configured to provide a downward drawing force. In the embodiment of FIG. 7, blades 40 may rotate counterclockwise when viewed from above. The angle and curvature of blades 40 thus provide a downward force. The number of blades, as well as their shape, may be varied to accommodate differently sized heaters 10. Furthermore, the direction of rotation of fan blade 40 may rotate clockwise and their angle and curvature may also be varied.

As discussed in more detail later in connection with top section 80, the downward drawing force provided by blades 40 preferably extends through annular gap 56 and into top section 80. At this point, this force serves to draw ambient air into top section 80 and past the heat exchangers so that the ambient air is heated. This heated air is then drawn from top section 80, down annular gap 56 and into base 20 where it may be vented to the surrounding area.

Besides drawing heated air from top section 80 and through midsection 50, fan assembly also directs the heated air out exhaust vents 22. As noted above, vents 22 may be configured as the curved profile of vent portion 26b of pedestal 26. It is preferred that the profile of vent portion 26b and the speed of the exhausted heated air work together so that the heated air is provided to the surrounding area in a laminar flow fashion. This in turn allows the heat to be more efficiently distributed to the surrounding area.

The exhausted heat may also include heat generated by vortex fan motor 72, fan motor 38 and/or fan belt 31. As such, the overall heat provided by heater 10 may be increased by the heat generated by motor 38 and/or belt 31. Directing the heat generated by these moving parts away may allow them to operate at lower temperatures which preferably reduces wear and decreases maintenance. The airflow through base 20 may also serve to transport away heat generated by electrical components such as by control unit 42. This preferably increases the overall life of heater 10.

Figure 9:
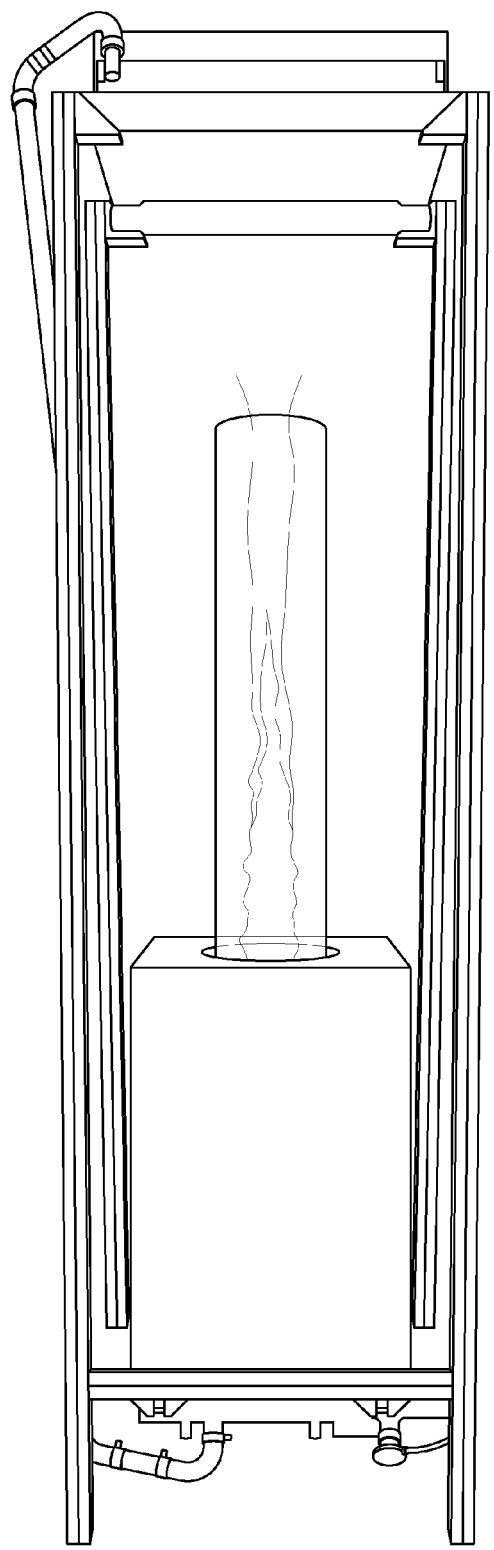
FIG. 9 shows an embodiment of the heater including a visible flame vortex.
Figure 11:
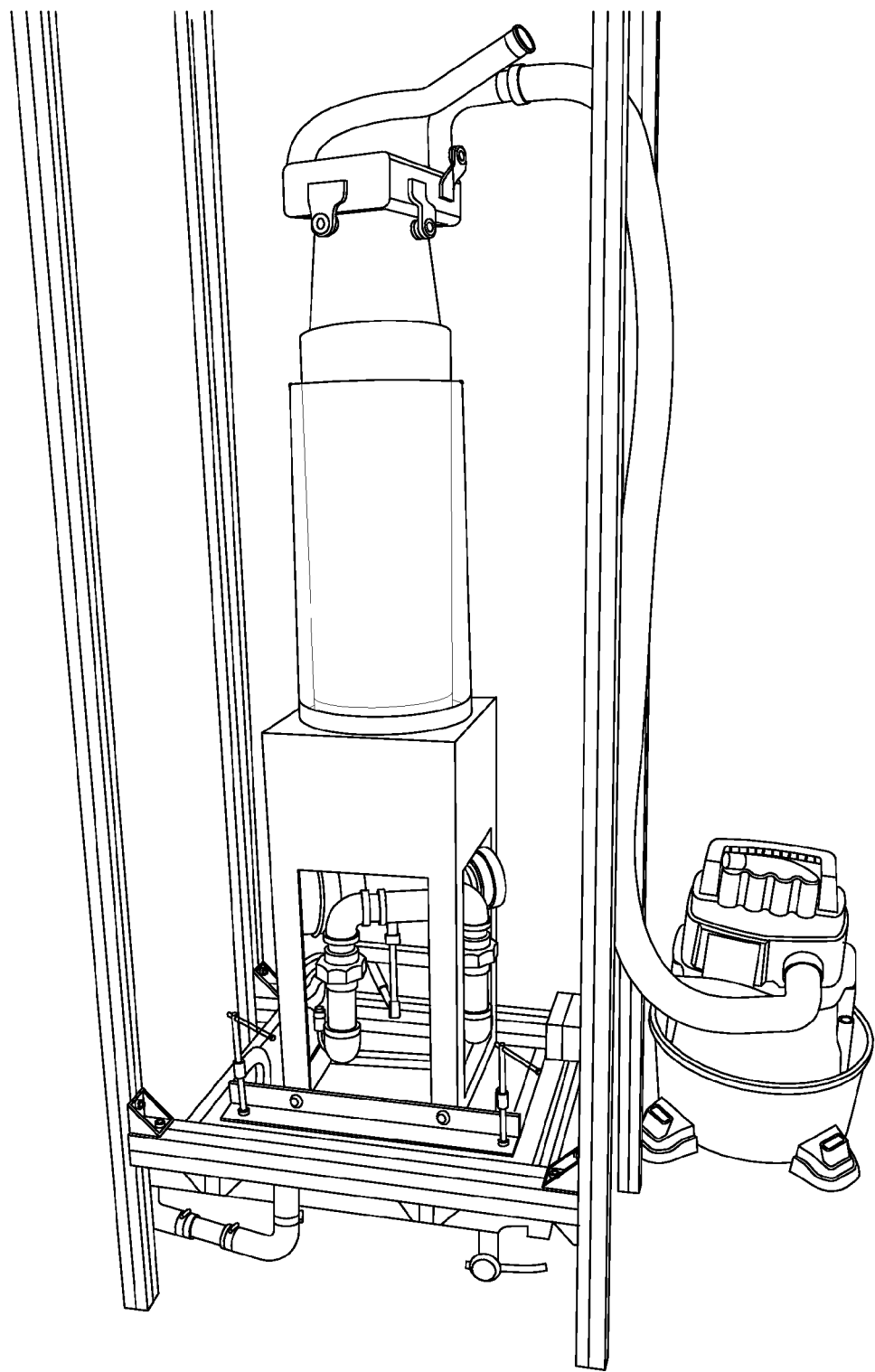
FIG. 11 shows an alternate embodiment of the heater including an air-filled heat exchanger.

Base 20 may also include one or more heat exchangers to facilitate the movement of heated air through exhaust vents 22. The type of heat exchangers used and the manner in which they may be arranged may vary. For example, as shown in FIG. 9, the heat exchangers may comprise one or more water-filled radiators. Alternatively, as shown in FIG. 11, a single air-filled heat exchanger, such as a turbocharger intercooler, may be used in place of the water units.

Figure 12:
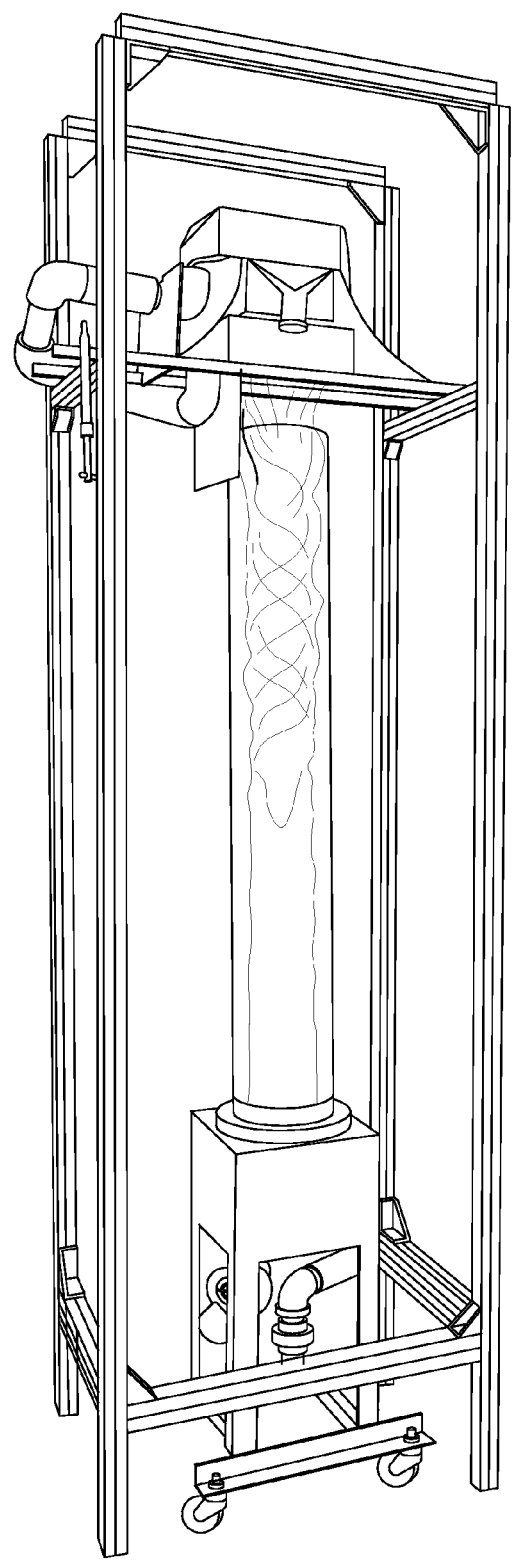
FIG. 12 shows an alternate embodiment of the heater including multiple air-filled heat exchangers stacked and attached to a common manifold. Positive pressure airflow is pumped up to the heat exchangers with a fan creating a forced-air heating system that pushes hot air downward while allowing exhaust gases to continue upward unaffected.
Figure 13:
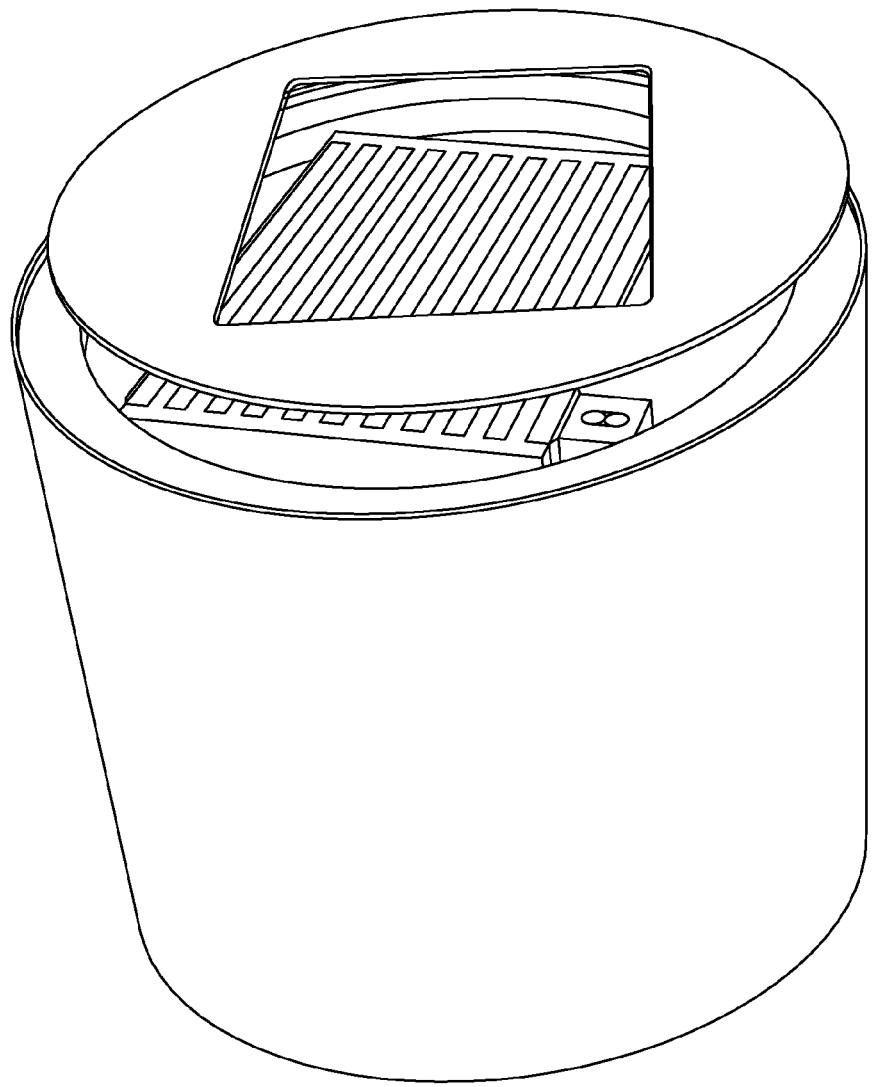
FIG. 13 shows a top heat cap stack of the heater. Heat exchange equipment may be installed in a casing that functions as a plenum chamber, allowing exhaust fumes to exit the top of the stack while inhaling clean air and directing heated air toward the base through the gap between transparent tubes.

FIG. 9 depicts an embodiment in which two heat exchangers are placed below the base tube or cabinet 27, such that heat may be released at or near ground level. FIG. 12 depicts an alternate embodiment in which three air-filled heat exchangers are stacked and attached to a common manifold.

Where one or more heat exchangers located in base 20 are used, fan 40 may be positioned to draw air from these heat exchangers and blow heated air outward through exhaust vent 22. As such, the use of heat exchangers in base 20 may contribute to the amount of heated air provided by heater 10.

The foregoing features may generally contribute to an increased footprint of heat and increased heating efficiency provided by heater 10. As noted above, locating heat exhaust vents 22 at or near ground level allows the heat to laterally or radially spread out over a larger footprint or area as the heat rises. Furthermore, the curvature of vent portion 26b and the rate at which the heat is directed out of vents 22 preferably helps direct the heated air over a larger area. The amount of heat distributed and the area which receives heat may also be increased due to distribution of heat generated by internal components, heat exchangers and other means as described above and herein. As such, heater 10 may efficiently heat various sized indoor and outdoor locations.

Middle or midsection 50 is now further described with reference to FIGS. 1, 2, 3, 4, 7 and 10. As discussed above, middle section 50 provides the visible display feature of heater 10, and also provides the conduit or passageway of annular gap 56, which allows heat from flame vortex 51 to be directed downward.

As shown in FIGS. 1, 2, 3 and 4, middle section 50 may include concentric cylinders 52, 54 separated by annular gap 56. In the embodiment of FIG. 32A, midsection 50 may also include innermost cylinder 52A. Midsection 50 may be located on top of base 20. Cylinders 52, 54 (and innermost cylinder 52A when included) preferably comprise lightweight material so as to avoid making heater 10 top heavy. Midsection 50 may be attached to base 20 by suitable means such as welds, nuts and bolts, brackets or other fasteners so that heater 10 is stably assembled. Inner and outer cylinders 52, 54 (and innermost cylinder 52A when included) may also be attached together so that they may be mounted to base 20 as a unit. In a preferred embodiment, midsection 50 may be removed from base 20, and inner and outer cylinders 52, 54 (and innermost cylinder 52A when included) may be detached from each other, for cleaning or other maintenance purposes from time to time. Alternate cleaning methods and related items are discussed later.

It is preferred that the top of base 20 include an opening that corresponds to the bottom of annular gap 56 to receive the downwardly-directed heated air. For example, the top of base cabinet or base tube 27 may include an opening that circumferentially extends about its periphery. A filter (not shown) may be located at the top of base 20 to filter any contaminants that may have been directed downward with the captured heat through annular gap 56.

The height of cylinders 52, 54 may be varied. For example, cylinders 52, 54 may be approximately 60 inches tall, though other lengths may be used depending on the amount of heat to be provided and the size of the space in which heater 10 may be located. The dimensions of annular gap 56 may also vary to provide a suitably sized conduit for the heated air. These dimensions may, for example be increased for larger heaters 10 that are used to heat larger surrounding areas.

Inner cylinder 52 may generally contain flame vortex 51, and may comprise a material that conducts heat such as a low-thermal-expansion borosilicate glass or another type of glass. In a preferred embodiment, PYREX may be used. Conductive materials are preferred because radially directed heat from vortex flame 51 may pass through the wall of inner cylinder 52 thereby heating the outer surface of inner cylinder 52 and contributing to the heat in annular gap 56. This may in turn increase the amount of heat to be delivered by midsection 50 to base 20 for release to the surrounding area. The material comprising inner cylinder 52 is preferably transparent so that vortex flame 51 may be viewed. When included, as in the embodiment of FIG. 32A, the foregoing may generally apply to innermost cylinder 52A.

Outer cylinder 54 may have a larger diameter than inner cylinder 52. Outer cylinder 54 may comprise a non-thermally conductive material, such as plastic or other synthetic materials. An example material is acrylic, but other materials are contemplated. Non-thermally conductive materials, or materials having low conductivity, are preferred so that the outer surface of cylinder 54 is safe to touch and does not burn nearby individuals. It is also preferred that the outer surface of cylinder 54 is cool so that materials that come into contact with the surface will not ignite. In any event, outer cylinder 54 may conduct some amount of heat so that heat transfer to the outer surroundings is maximized, while remaining cool enough to preserve the safety of persons in the vicinity of heater 10.

The material comprising outer cylinder 56 is also preferably clear or transparent, or have some amount of transparency, so that the flame in inner cylinder 54 may be visible through both cylinders. Cylinder 54 may also be tinted.

Outer cylinder 54 may also serve a significant structural function. To this end, outer cylinder 54 may provide some or all of the strength necessary to support top section 80 and the components contained therein. Inner cylinder 52, and when used, innermost cylinder 52A may also serve a structural support function. Furthermore, outer cylinder 54 may comprise a shatterproof material so that it does not crack or shatter if hit with an object, so as to avoid top portion 80 from tumbling down. It is also desired that outer cylinder 54 be durable so as to provide safety for containing flame 51.

With further respect to safety, heater 10 may also include an automatic shutoff valve or switch if it is knocked over or if it burns too hot. In this manner, even if heater 10 were knocked over and midsection 50 became dislodged from base 20, fuel would cease to be ignited and any exposed flame would quickly die out. The mechanical and electrical components for the automatic shutoff feature may be located in base 20, midsection 50 or top section 80.

As noted above, outer cylinder 54 is preferably transparent so that flame 51 may be visible. Alternatively, inner and/or outer cylinders 52, 54 may be configured to change color, to be made temporarily opaque or to provide other visual effects.

As noted above, annular gap 56 may exist between cylinders 52, 54. The width of annular gap 56 between the cylinders may be varied depending on factors that include the desired size of heater 10, the amount of desired heat and other factors. Annular gap 56 may, for example, be 10 inches. Other annular gap dimensions are contemplated and the invention is not limited to this example.

Figure 10:
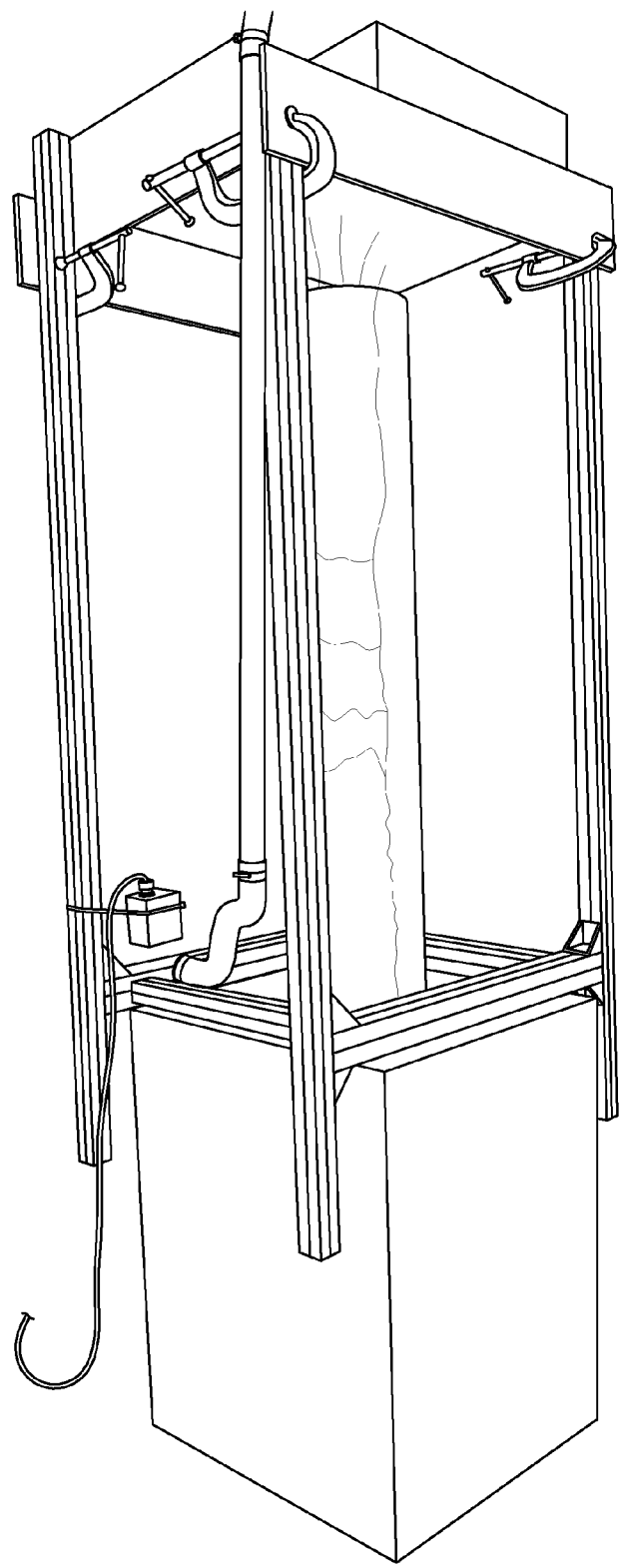
FIG. 10 shows an alternate embodiment of the heater in which water-filled heat exchangers are placed in the middle portion of the heater.

In one embodiment of heater 10, heat exchangers may be placed in the middle section 50, as shown in FIG. 10. In the embodiment shown in FIG. 10, heat exchangers may be placed such that heat from flame 51 may be delivered to a person's chest level.

It is preferred that noxious fumes and other undesirable combustion products are directed upward, and do not travel downward with the heat in annular gap 56. This may occur through the separation of heat and fumes in top section 80, before the heat is drawn downward through gap 56. However, as noted above, filters may be placed at one or more locations in heater 10 to reduce or prevent any fumes or other contaminants from being delivered with the heat to the surrounding area.

Figure 5:
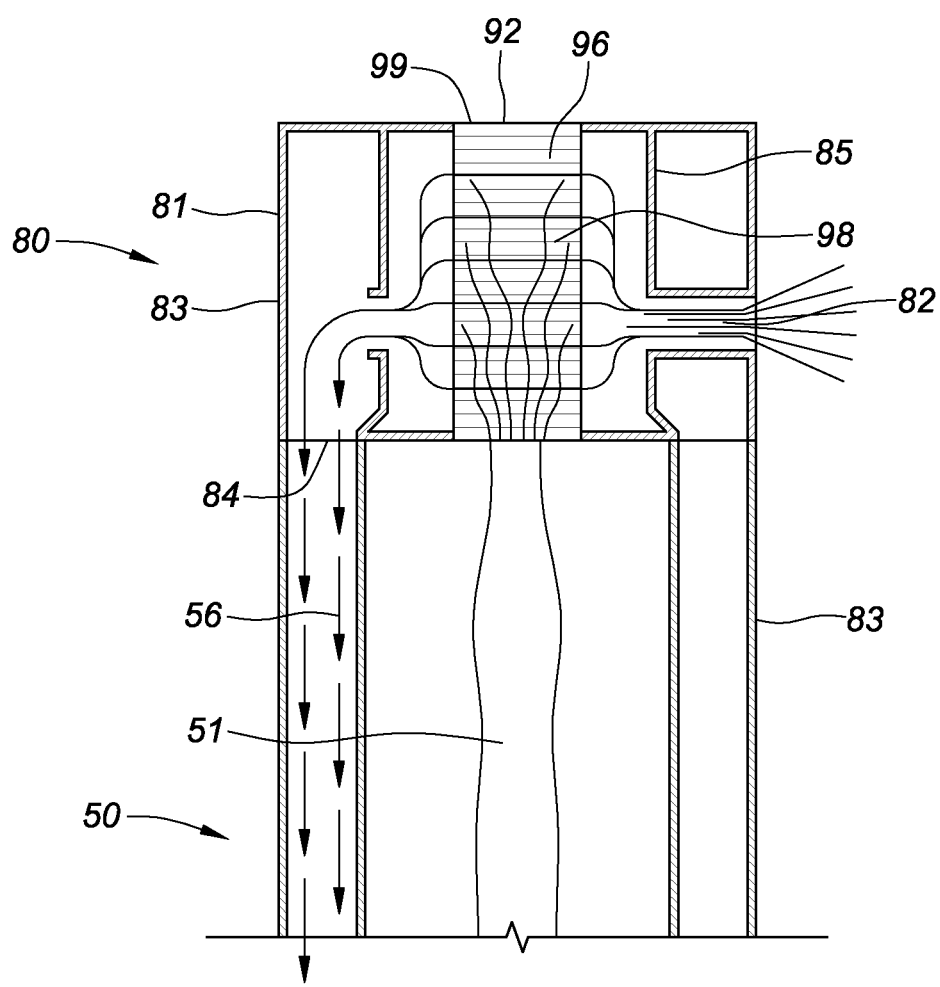
FIG. 5 is a side cross-sectional of the upper portion of the heater, including a depiction of the flame element and the airflow.
Figure 6:
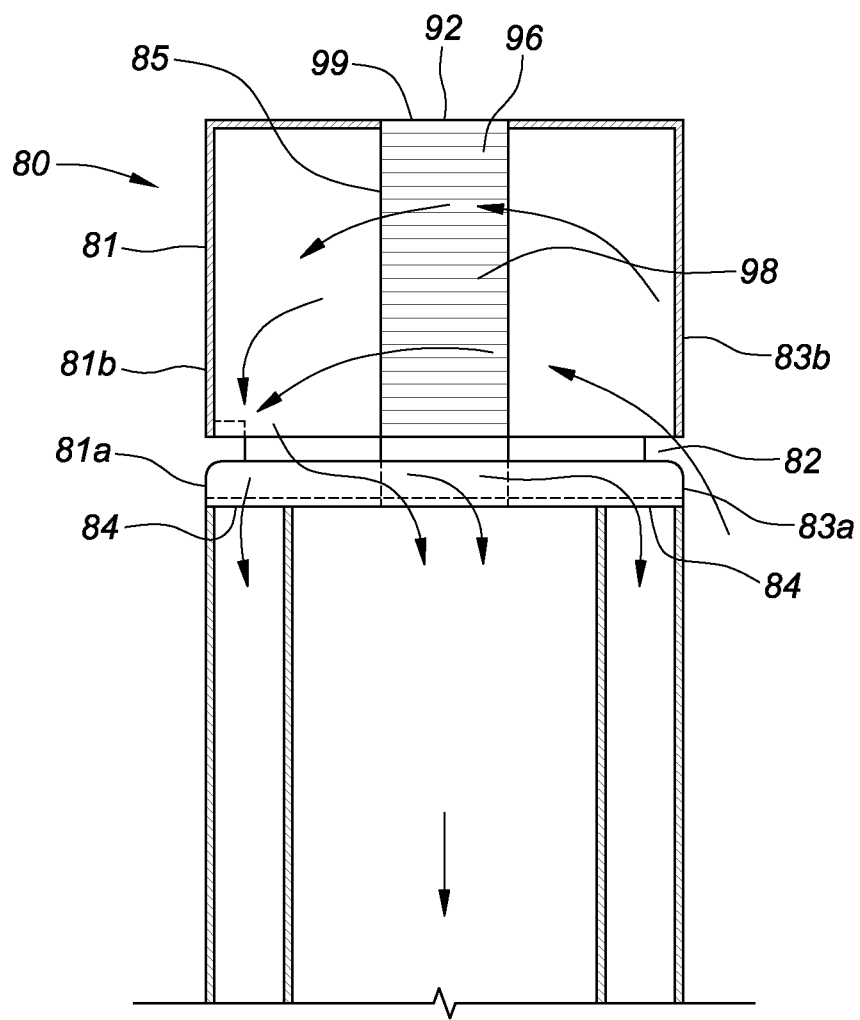
FIG. 6 is a side cross-sectional view of the upper portion of the present invention, including a cross-section of a heat exchanger cap.

Top section or portion 80 is now further described with reference to FIGS. 1, 2, 3, 3A, 4, 5, 6, 7 and 13. As best shown in FIGS. 5 and 6, top portion 80 may include heat exchanger cap or housing 81, which generally serves as a pressurized chamber that captures heat from the flame 51, and that directs the heat downward through forced air convection. Top section 80 also preferably releases exhaust fumes or other undesirable combustion products in an upward direction, or otherwise away from nearby individuals.

As shown in FIGS. 5-6, cap 81 may include outer wall 83 and inner wall 85. In a preferred embodiment, walls 83, 85 may comprise concentric cylinders, but other shapes may be used within the scope of the invention. Walls 83, 85 may be joined together by any suitable means. For example, inner wall 85 may be attached to midsection 50, and outer wall 83 may be supported by inner wall 83 by virtue of top surface 99. Alternatively, flanges, struts or other attachment means (not shown) may extend outward from inner wall 85 to engage outer wall 83.

Top section 80 may include one or more heat exchangers 96, 98 which may capture the rising heat from flame 51. Heat exchangers 96, 98 may be housed within inner wall 85 and mounted thereto. Top section 80 may also include inlet 82 and outlet 84 through which air may flow to direct the heat downward to midsection 50.

In general, it is preferred that top section 80 and its components are generally lightweight to avoid heater 10 becoming top heavy, and to limit the stress on the glass and/or plastic tubes supporting it. This is especially helpful as hot air flowing through the annular gap warms and softens the plastic and/or glass tubes. Top section 80 may be mounted to the top of midsection 50 through suitable attachment means, and it is preferred that top section 80 be removable for cleaning and/or maintenance from time to time. Alternative cleaning methods and items are discussed later.

As explained below, air may flow into cap 81 through inlet 82 and transport the heat from heat exchangers 96, 98 through outlet 84 down into midsection 50. At the same time, fumes may be vented upward through exhaust outlet 92 in the top of cap 81 as shown in FIG. 3A. For example, the portion of the top surface 99 above heat exchangers 96, 98 may be perforated, or may comprise a grate with gaps between metal bars. Other possibilities for exhaust outlet 92 are also contemplated, e.g., vents located in the side of top section 80 as discussed later.

Heat exchangers 96 and 98 may have a variety of configurations. For example, a single heat exchanger may be used. As an alternative, multiple concentric or stacked heat exchangers may be attached to a common manifold. The heat exchangers may be air-filled or water-filled. However, air-filled heat exchangers may be preferred for their lighter weight.

The manner in which heat exchanger cap 81 serves as a pressurized chamber is now further described. Air under pressure may pass through heat exchangers 96, 98 above and generally perpendicular to the direction of flame 51 and become heated thereby. This air may enter top portion 80 through fresh air inlet 82.

The fresh air may be forced through cap 81 due to the downward drawing force provided by fan 30 in base 20. As such, cap 81 may form a plenum chamber or pressurized chamber. The fresh air from inlet 82 may also absorb heat from the rising flame as it moves through cap 81. This heat-bearing air may be drawn downward through annular gap 56 through warm air exit 84.

Top portion 80 may be customized depending on space and design considerations. Top portion 80 may be a cylindrical shape, as depicted in FIG. 1. Other shapes are contemplated. For example, top portion 80 may alternatively be a square or rectangular shape, or it may include a pyramidal cap for decorative purposes. Top portion 80 may be finished with any variety of finishes to suit different decorative needs.

The height of top portion 80 may also be varied based on factors that include space and cost considerations. As one example, top portion 80 may be 12 inches high. Other heights are contemplated, and the invention is not limited to this example.

As shown by FIGS. 5 and 6, top section 80 and cap 81 may assume different configurations. In FIG. 5, for example, air inlet 82 may be formed by openings, holes or perforations in outer wall 83 of cap 81. Fresh air may be drawn into perforations or inlet 82 by virtue of the pressure differential or downward force created by fan 30 in base 20. After the air enters inlet 82, it may be heated by heat exchangers 96, 98 and be drawn downward through outlet 84 and into annular gap 56.

In the configuration of FIG. 6, top section 80, or cap 81, may include bottom section 81a and upper section 81b. Sections 81a, 81b may include outer walls 83a, 83b, respectively. In this embodiment, air inlet 82 may be formed in a gap between sections 81a, 81b. As such, inlet 82 may form a dedicated air gap inlet.

Figure 14:
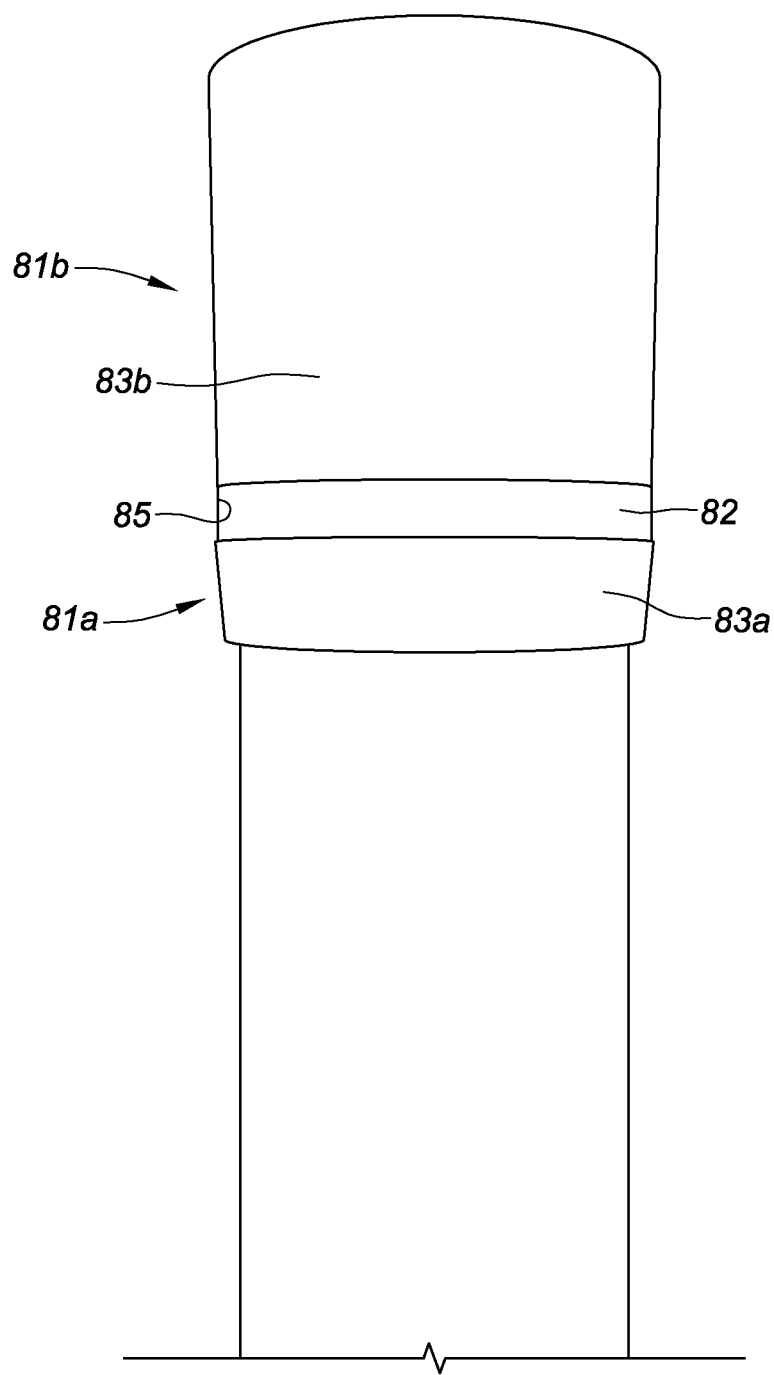
FIG. 14 shows a top section of a heater with a dedicated air gap inlet.

This embodiment may provide several benefits. For example, air gap inlet 82 may extend around partially or completely around the circumference of cap 81 which may provide an increased cross-sectional area to receive incoming airflow. The appearance of cap 81 with dedicated air gap 82 may also be sleek and stylistic as shown in FIG. 14.

Figure 15:
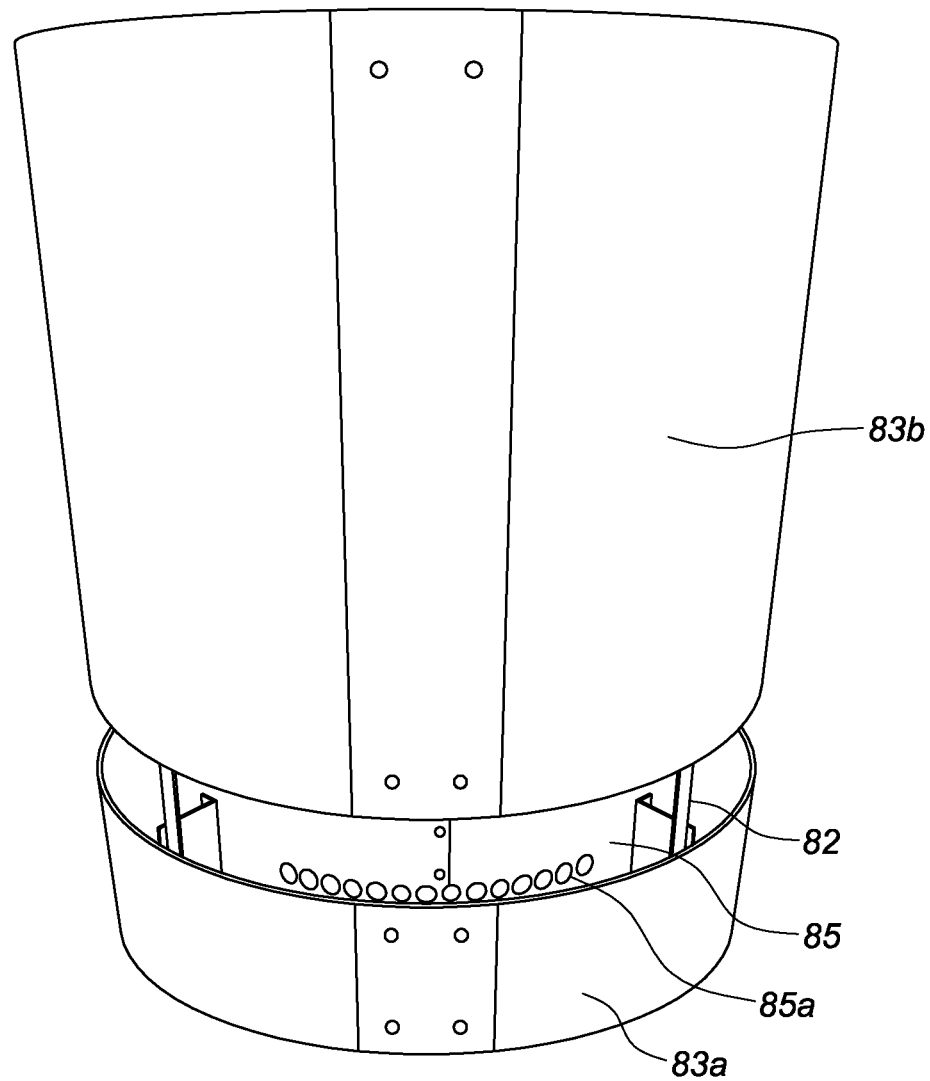
FIG. 15 shows a top section of a heater with a dedicated air gap inlet.

FIG. 15 shows this embodiment of top section 80 in more detail. As shown, inlet 82 may extend partially around the circumference of outer wall 83a, 83b. Air may flow into inlet 82 and may then flow through perforations 85a formed in inner wall 85. At this point, the incoming air may be heated by heat exchangers 96, 98. Thereafter, due to the downward force imparted by fan 30 in base section 20, the heated air is drawn downward through outlets 84.

The embodiment of top section 80 that may be associated with FIG. 5 is now further described with reference to FIG. 16. In this embodiment, outer wall 83 may comprise a perforated section 83a. In this embodiment, perforated section 83a may form air inlet 82. The pattern, size and/or placement of perforations in perforated section 83a may vary, and different perforation configurations are within the scope of the invention. To this end, the overall cross-sectional area of perforations 83a may be adjusted to permit appropriate, e.g., laminar, air flow through heater 10, in light of the downward drawing power of fan 30 and other parameters.

Figure 16:
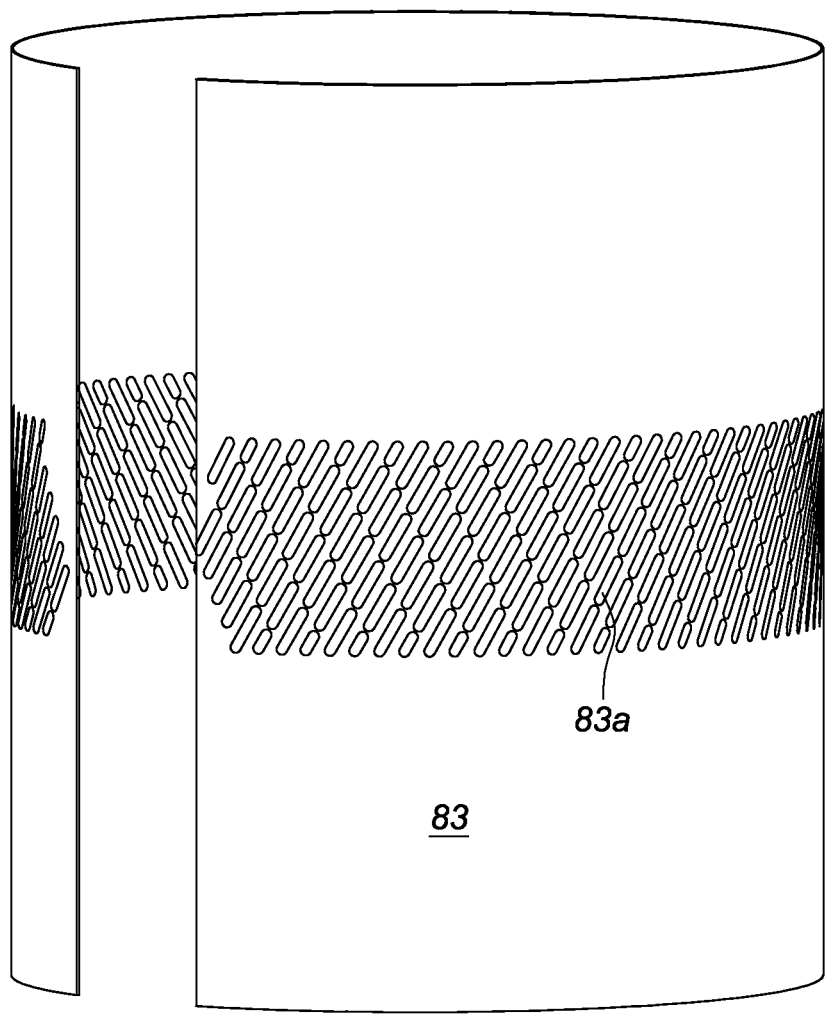
FIG. 16 shows a perforated outer wall of a top section.

The outer wall 83 of FIG. 16 is shown by itself with a vertical gap between its ends. However, when wall 83 is attached to heater 10, its vertical edges may be joined to form a cylindrical tube. As noted throughout this document, the cross-sectional shape of the various components of heater 10 need not be cylindrical, so outer wall 83 may assume other shapes.

Other aspects and benefits of outer wall 83 of this embodiment are now described. As indicated in the Background of the Invention section, existing heating devices used for patios and other areas are often grouped together because, individually, they do not provide sufficient heat. In this situation, existing heaters may contact each other and become dented or otherwise banged up. When this happens, the heater looks battered and may not fit in well with the surrounding decor or atmosphere.

As noted above, the heater 10 of the current invention preferably avoids the need to be grouped with, or placed near, other heating devices because it provides significant heat that is laterally or radially distributed. But to the extent outer wall 83 is dented or otherwise damaged, it may be readily replaced with another outer wall 83. In essence, this embodiment allows top section 80 to be re-skinned or fitted with another outer wall 83.

To facilitate the replacement of outer wall 83, it is preferred that outer wall 83 be attached to heater 10 with screws or other attachment means that may be readily removed and reattached.

Besides aesthetic purposes, the perforated outer wall 83 serves several purposes. For example, the perforations 83a receive incoming airflow which reduces the buildup of heat in outer wall 83 itself. This in turn may reduce the heat that would otherwise be radiated outward from outer wall 83. Besides increasing the efficiency with which heat is processed by heater 10, this also reduces the chance of anyone being burned should they touch top section 80. To this end, perforations 83a allow the incoming air to enter the space between outer and inner walls 83, 85, before the air proceeds to within inner wall 85 to engage heat exchangers 96, 98. In this manner, the airflow may cool outer wall 83.

Other features of heater 10 are now further described. For example, heater 10 may be operable via a remote control (not shown) held by the user. The remote control may interact with sequence switches and relays unit or control unit 42 to control the motors, injectors and other components of heater 10. For example, the remote control may cause the fuel to ignite in combustion chamber 24. The remote control may also allow the user to control the speed and direction of vortex flame 51. The remote control may further allow the user to select different settings such as the color of the flame and the intensity of the heat.

Any number of preprogrammed settings may be effected by the remote control. For example, the user may be provided with different types of "programs" or "performances" in which the flame vortex 51 undergoes certain transformations. The remote control and programmability of heater 10 is discussed later in more detail.

With reference to FIGS. 17-30, several alternate embodiments of heater 10 are now described. The heaters illustrated in FIGS. 17-30 may generally include various features of the embodiments of heater 10 described above, and/or features of the other alternate embodiments. As such, only the differences of each will be set forth in detail herein.

The heaters 200, 300, 400, 500 shown in FIGS. 17-20 may include various features making them well-suited for a permanent outdoor installation. For example, these heater embodiments may use plumbed gas as a fuel source, and hard wired electricity for power, as discussed above. To this end, these utilities may be provided up through the floor or other surface on which these heaters rest, and engage the bottom of their bases.

Figures 17, 17A:
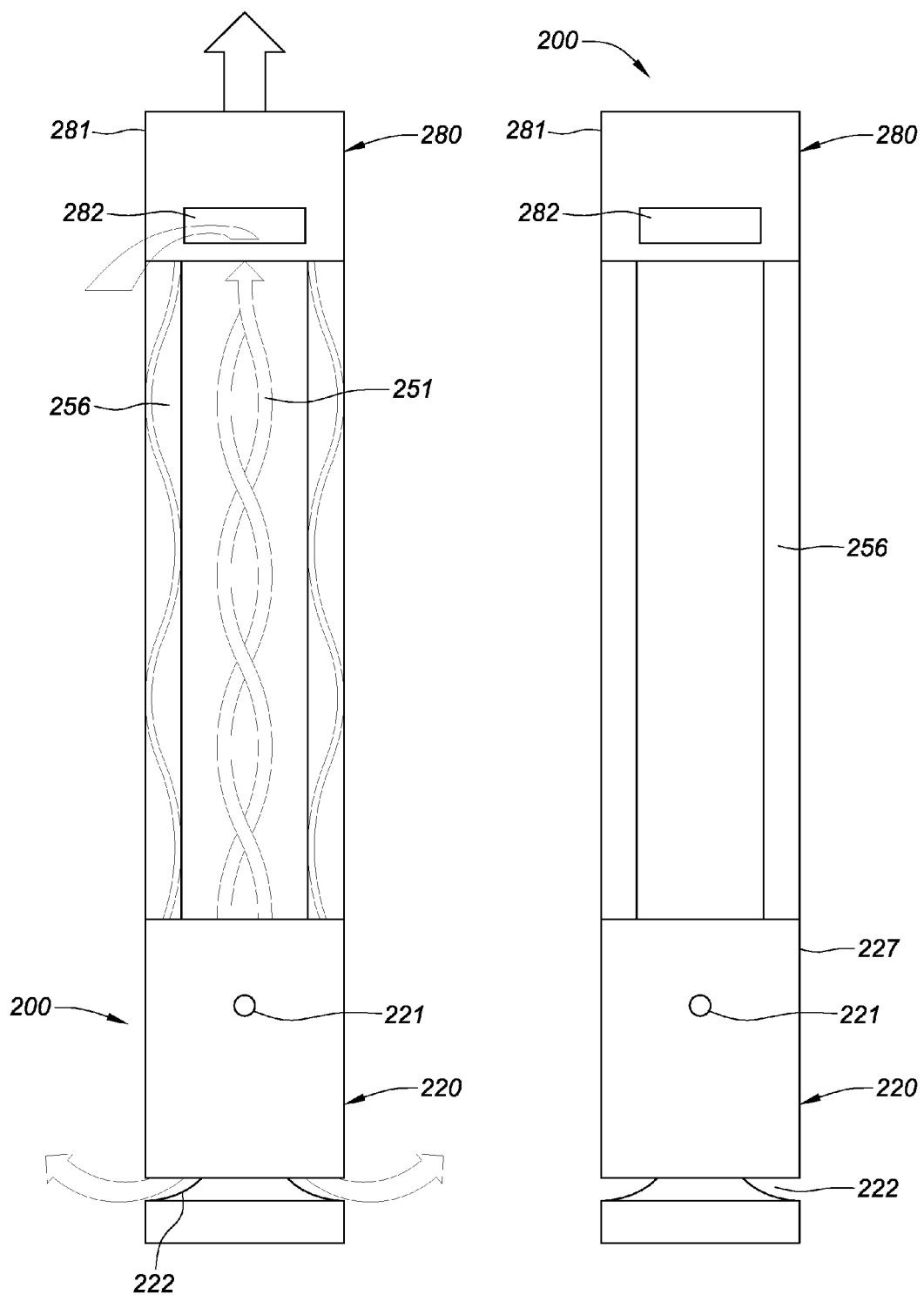
FIG. 17 shows an alternate embodiment of the heater that may be suited for permanent outdoor installations.
FIG. 17A shows the general operation of the heater of FIG. 17 that may be suited for permanent outdoor installations.

As shown in FIGS. 17 and 17A, heater 200 includes a base 220 including a cabinet 227 having an air intake opening 221. Intake 221 may allow air into base 220, which air may be directed by the vortex fan to aid in combustion when producing the flame vortex. Air intake opening 221 is shown as a generally circular opening located at approximately the middle of cabinet 227, but other suitable shapes, sizes, and locations may be used.

As also shown in FIG. 17, heater 200 may include a top section 280 including a cap 281 having an air inlet 282 therein. As illustrated, air inlet 282 may be generally rectangular extending about a portion of the circumference of cap 281. So configured, air inlet 282 may provide an increased cross-sectional area for receiving incoming air flow (as compared to air inlet 82 of heater 10) while also being capable of being positioned facing away, generally out of view of nearby people for a sleek appearance.

With reference to FIG. 17A, the operation of heater 200 may generally be as follows. Flame from the fire vortex expression 251 heats a radiator at the top section 281 which functions as a heat exchanger, and heats fresh air that is drawn through the top vent 282 by a fan in the base 220. The hot fresh air is drawn down the annular space 256 between the two tubes, past the fan and out the opening 222 at bottom of heater 200. The exhaust from the flame is vented out the top of the unit. Electronics may be housed in base 220 of heater 10 with electricity hard-wired to the heater, and plumbed natural gas as a fuel source.

Figure 18:
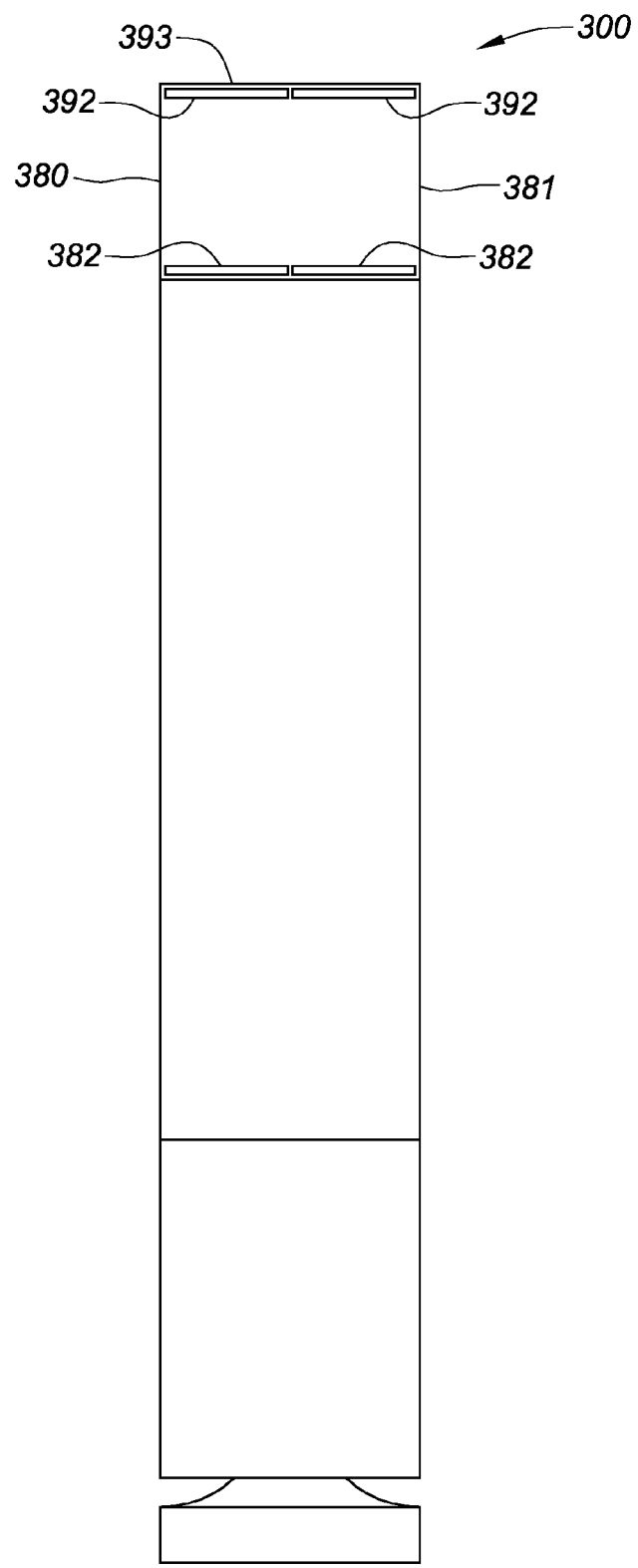
FIG. 18 shows another alternate embodiment of the heater that may be suited for permanent outdoor installations.

FIG. 18 shows another embodiment of heater 300. Heater 300 includes top section 380 including a cap 381 with one or more air inlet slot(s) 382 and one or more exhaust outlet slot(s) 392. As illustrated, air inlet slot(s) 382 and exhaust outlet slot(s) 392 may be horizontally aligned, narrow, generally rectangular openings extending about a portion of the circumference of cap 381. In one form, air inlet slot 382 is disposed near the bottom of cap 381, while exhaust outlet slot 392 is disposed near the top of cap 381. This configuration for slots 382, 392 advantageously provides a relatively discrete visual appearance. Further, the slots may be positioned facing away, generally out of view of people nearby. Alternatively, several of each of slots 382, 392 may extend about the periphery of cap 381. Various numbers of air inlet slots 382 and exhaust outlet slots 392 may be used.

Further, the positioning of exhaust outlet slot(s) 392 on the side of cap 381 allows for exhaust fumes to be vented out of the side of the cap rather than through the top surface 393 of the cap 381 as described above for heater 10. This modification may be accomplished, for example, with a modification of ducting within cap 381 to direct exhaust fumes out the sides rather than out the top of cap 381. This provides the benefit of having exhaust fumes vent out near the top of the heater 300, generally above any people nearby, while also allowing the top surface 393 of cap 381 to be closed and/or free from any openings that could potentially allow leaves and/or other debris to enter the top section 380.

Figure 19:
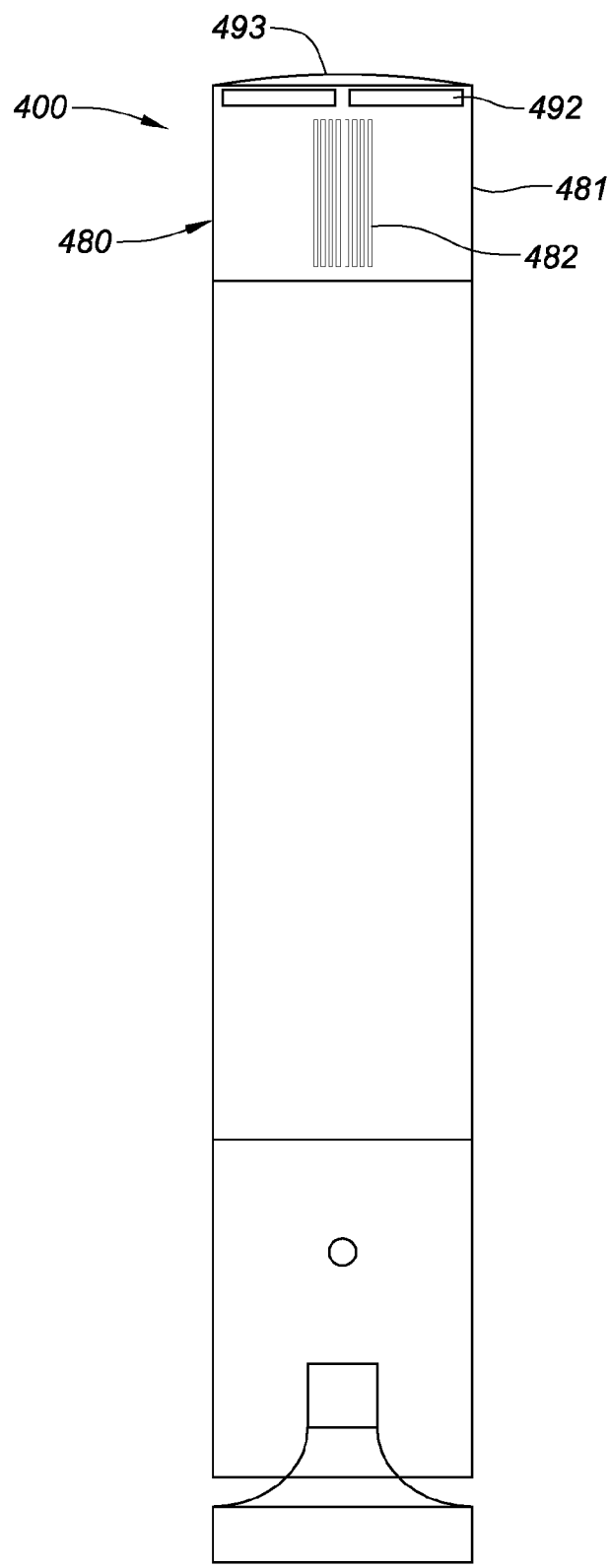
FIG. 19 shows another alternate embodiment of the heater that may be suited for permanent outdoor installations.

FIG. 19 shows another alternate embodiment for heater 400. In heater 400, air inlet 482 takes the form of a plurality of parallel, generally vertical slots similar in appearance to a grill. Eight slots are shown for air inlet 482, but any suitable number of slots may be used. Exhaust slots 492 may be one or more horizontal rectangles. The distance between intakes 482 and exhaust ports 492 may be varied to avoid noxious fumes being sucked into intakes 482. To this end, intakes 482 may be shorter so that their tops are further from exhaust ports 492. Cap 481 may also have a rounded top surface 493.

Figure 20:
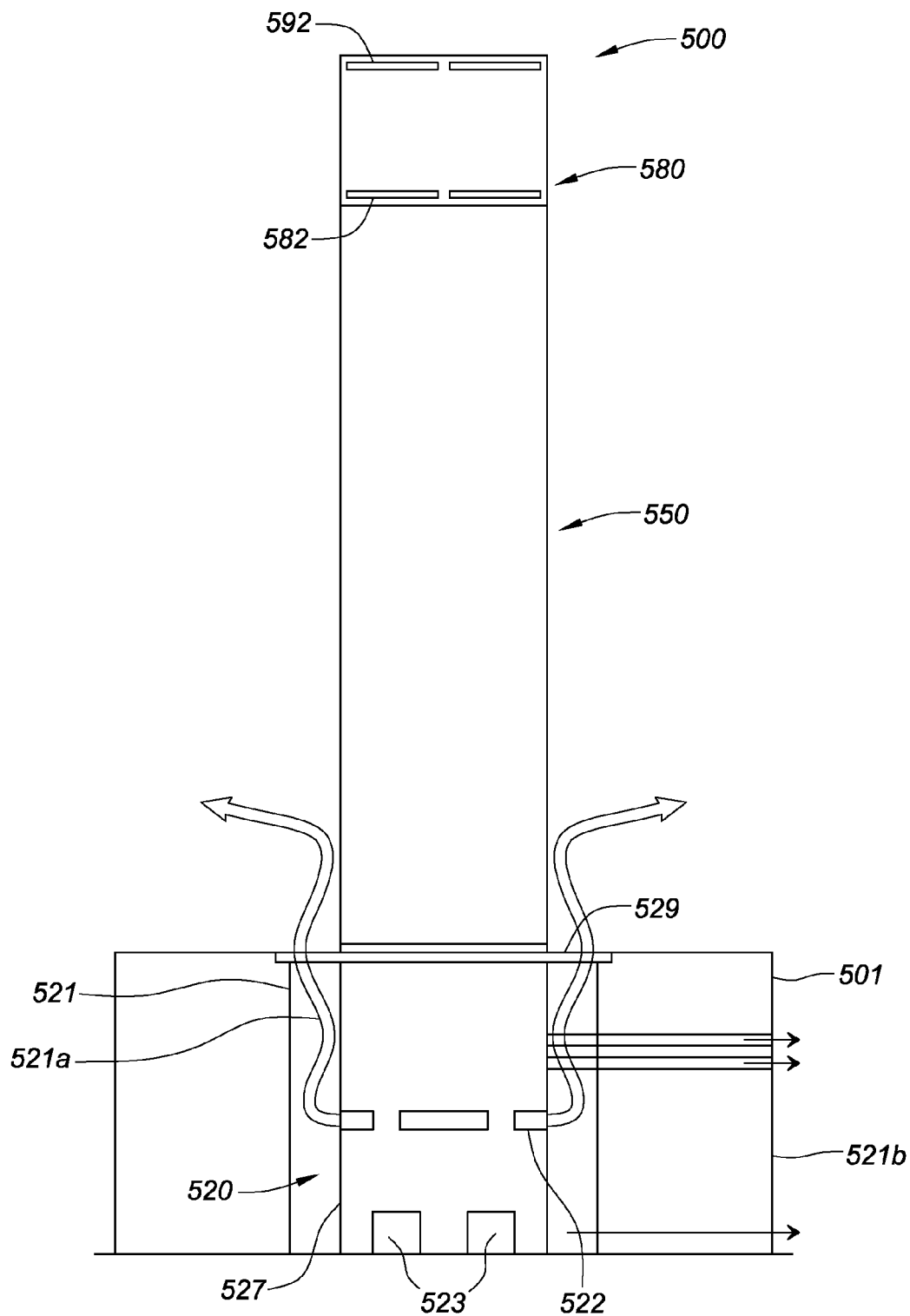
FIG. 20 shows another alternate embodiment of the heater that may be suited for permanent outdoor installations.

FIG. 20 illustrates another alternate embodiment for heater 500 in which base 520 is positioned below ground level 501. As such, base 520 includes cabinet or base tube or cylinder 527 which may include connections for fuel and electrical sources. Base 520 may also include shroud 521 that is positioned radially outward from cabinet 527 thereby forming annular passageway 521a between shroud 521 and cabinet 527.

Cabinet 527 may include one or more heat exhaust outlet(s) 522 for venting heated air out of base 520. Base 520 may also include annular vent 529, which may for example, comprise a decorative grate, disposed around the circumference of cabinet 527 and over annular passageway 521a.

In operation, heated air may travel from top portion 580 of heater 500 through midsection 550 into base 520. This heated air may be vented out of exhaust outlet(s) 522 and travel through annular passageway 521*a* and up through vent 529 to heat the surrounding area. When base 520 is installed underground, annular vent 529 is preferably substantially flush with the surrounding ground or foundation.

As illustrated in FIG. 20, the space or container 521*b* in which base 520 is positioned is preferably large enough to provide space around the circumference of cabinet 527 for grate 529. Alternatively, heater 500 may be sunk into the ground soil. So configured, base 520 of heater 500 may be hidden from view allowing the vortex flame within the midsection 550 to be the main focus.

In this embodiment, rainwater or other fluids may pass downward through grate 529 and into 520. To prevent fluids from accumulating, base 520 may include drains 523 which may lead to a sewer or other path to carry water away. Air intakes 582 and fume exhaust ports 592 may be located in top section 580 as shown.

The heaters 600, 700, 800, 900, 1000, 1100, 1200, 1300, 1400 shown in FIGS. 21-28 have features particularly well-suited for portable outdoor use. To this end, they may include a portable fuel supply and may also rely on external electrical power such as a wall electrical outlet.

Figure 21:
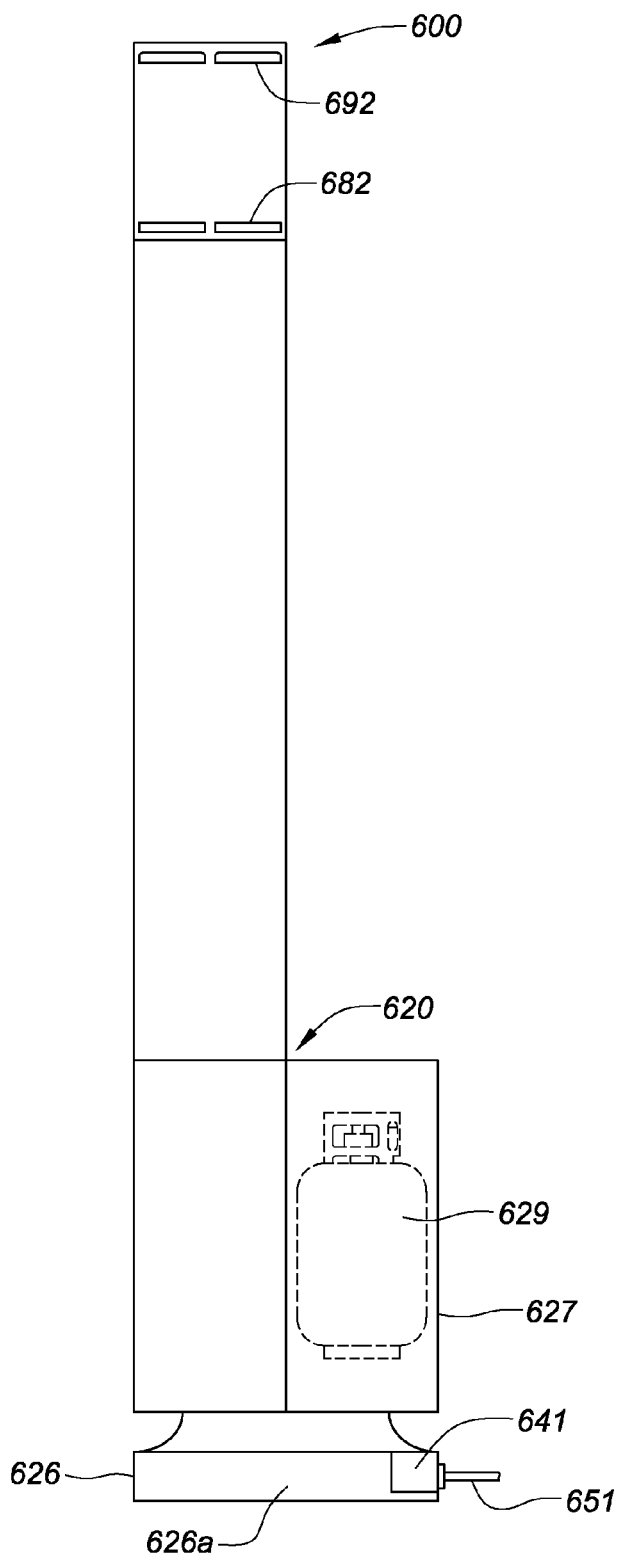
FIG. 21 shows another alternate embodiment of the heater that may be suited for portable outdoor use.
Figure 22:
FIG. 22 shows another view of the heater of FIG. 22 that may be suited for portable outdoor use.

Heater 600 is shown in FIGS. 21 and 22, and includes base 620 with two cabinets 627, 629. Cabinets 627, 629 may be aligned from front to back of heater 600 such that the cabinet 629 is substantially hidden from view by cabinet 627 when viewing heater 600 from the front (as shown in FIG. 22). Cabinet 627 may function similar to cabinet 27 in heater 10. Cabinet 629 is sized to house a portable fuel source, such as a propane tank.

As further illustrated in FIG. 21, base 620 may include a pedestal 626 having a generally oblong base portion 626*a* that is longer in diameter from front to back than from side to side. As illustrated, oblong base portion 626*a* may stably support the larger base 620, including the two cabinets 627, 629, and reduce the risk of heater 600 tipping. However, the extra length is generally only visible when viewing heater 600 from the side (as in FIG. 21). When heater 600 is viewed from the front (as in FIG. 22) pedestal 626 and base portion 626*a* may have a slim profile appearing to have substantially the same diameter as the rest of heater 600.

Base 620 may also accommodate additional components such as battery 641, which may be rechargeable, and/or electrical cord 651 which may plug into a power supply. Inlets 682 and fume exhaust ports 692 may be located as shown. Base portion 629 may be lifted up to expose propane tank 629*a*. Alternatively, cylinder 629 may include an access door (not shown). Air for the vortex fan to deliver for combustion may be drawn from inside base 620. Alternatively, base 620 may include an air intake, like intake 221 in FIGS. 17 and 17A to provide air for the vortex fan.

Figures 23A, 23B:
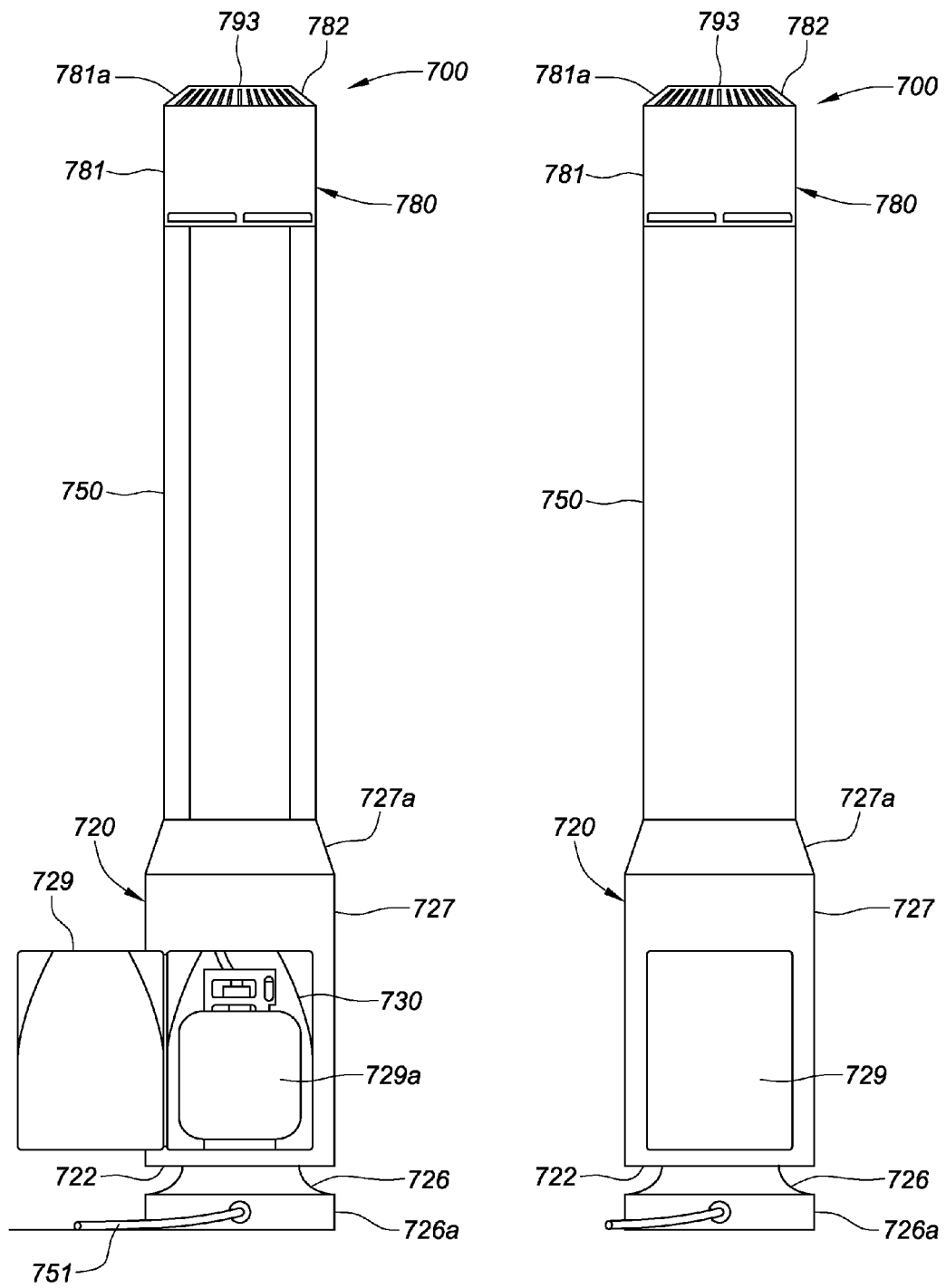
FIGS. 23A and B show another alternate embodiment of the heater that may be suited for portable outdoor use.

FIGS. 23A and 23B illustrate another alternate embodiment for heater 700 which includes base 720 with a main cabinet section, tube, or cylinder 727, which may have a circumference that is larger than the circumference of the midsection 750 of the heater, and an inwardly slanted transitional cabinet section 727*a* that connects midsection 750 to cabinet 727. As illustrated in FIG. 23A, main cabinet section 727 may house a portable fuel source, such as a propane tank 729*a*. A hinged door 729 sized to accommodate tank 729*a* therethrough is located in the main cabinet section 727 and is preferably substantially flush therewith when closed (as shown in FIG. 23B).

A fan (not shown) to direct the heated air downward may be positioned within main cabinet 727 above the tank 729*a*. One or more baffle(s) 730 located within main cabinet 727 may direct the flow of heated air around the tank toward the exhaust outlet 722. Power cord 751 may extend from base 720.

Pedestal 726 and pedestal base 726*a* of heater 700 may have a circumference substantially the same as the circumference of main cabinet section 727 (i.e., larger than that of the midsection 750 of the heater 700).

Heater 700 further includes top section 780 with cap 781 having another form of exhaust outlet. As illustrated, cap 781 may include an inwardly slanted transitional section 781*a* that connects the cap 781 to the top surface 793. Exhaust outlet 782 may comprise a plurality of slots disposed about the circumference of cap 781 in the transitional section 781*a*. This configuration allows for a closed top surface 793 with exhaust being vented out to the side near the top of the heater 700.

FIGS. 24A-B and 25A-B illustrate additional embodiments for outdoor portable heaters. Heater 800 shown in FIGS. 24A-B may include base 820 with a cabinet 827 that convexly slopes gradually outwardly from a smaller circumference near the top of cabinet 827 to a larger circumference near the bottom of cabinet 827. The convex slope may be parabolic or some other profile. Pedestal 826 and pedestal base 826*a* may have the same circumference as larger circumference of the bottom of base 827. Heater 900 includes a cabinet 927 that concavely slopes gradually outwardly from a smaller circumference near the top of cabinet 927 to a larger circumference near the bottom of cabinet 927. The concave slope may be parabolic or some other profile. Base 926 and base pedestal 926*a* may continue the concave profile of base 927.

Figure 24A:
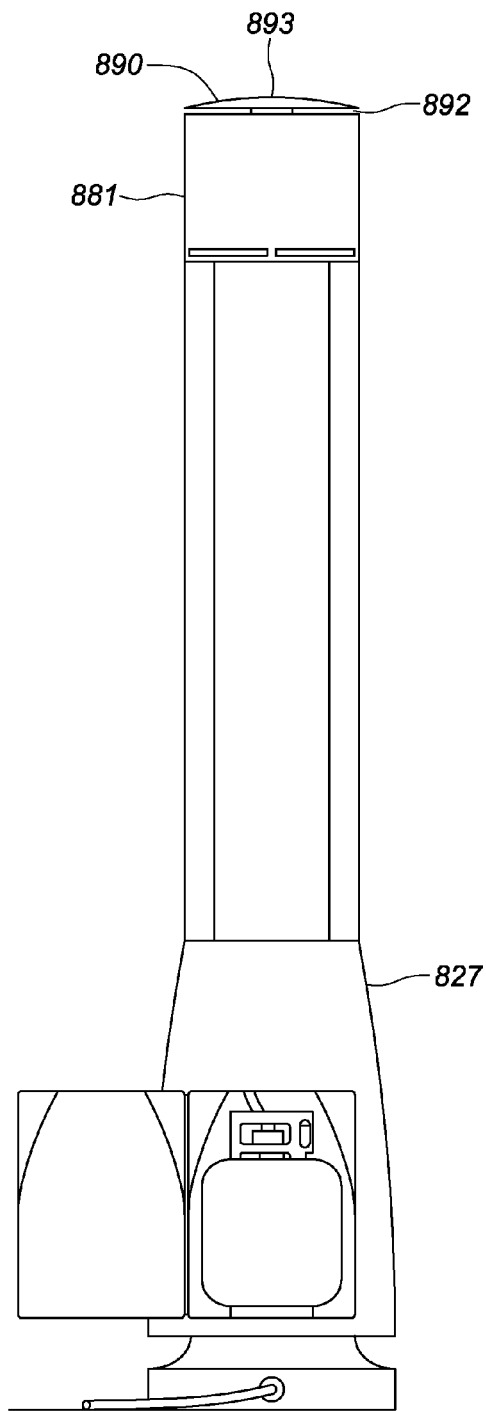
FIGS. 24A and B show another alternate embodiment of the heater that may be suited for portable outdoor use.
Figure 24B:
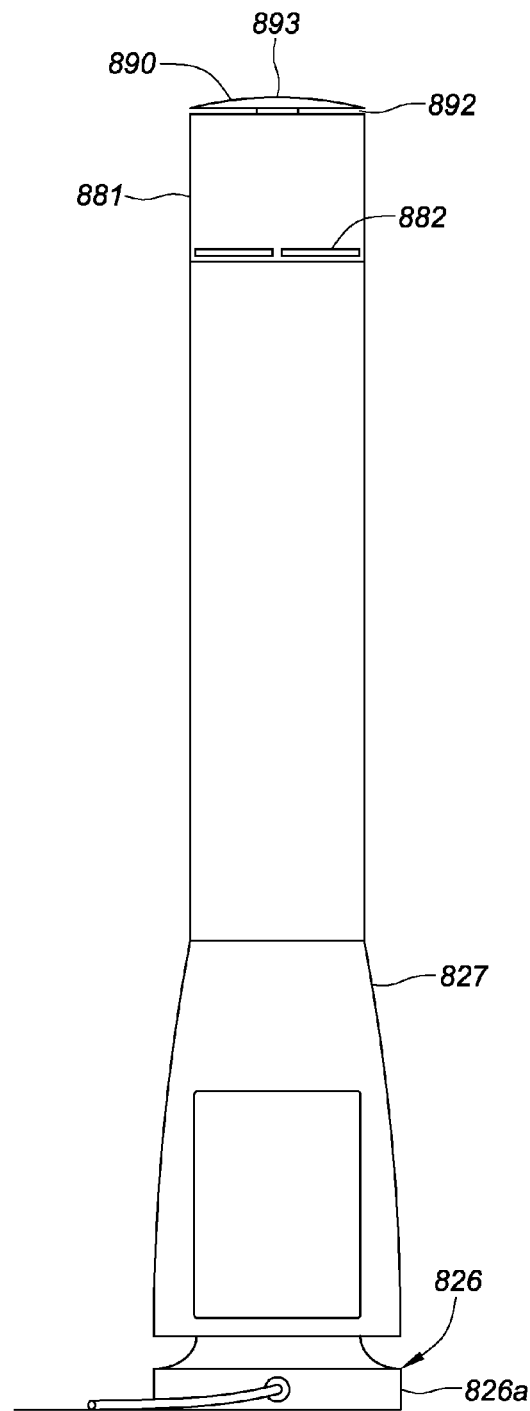
Figure 25A:
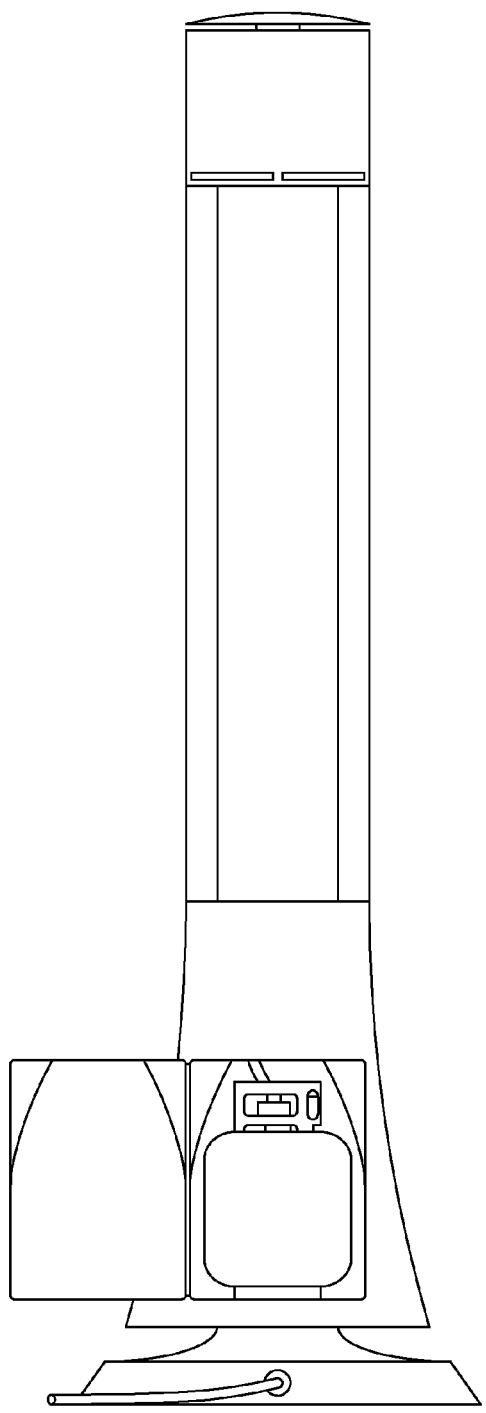
FIGS. 25A and B show another alternate embodiment of the heater that may be suited for portable outdoor use.
Figure 25B:
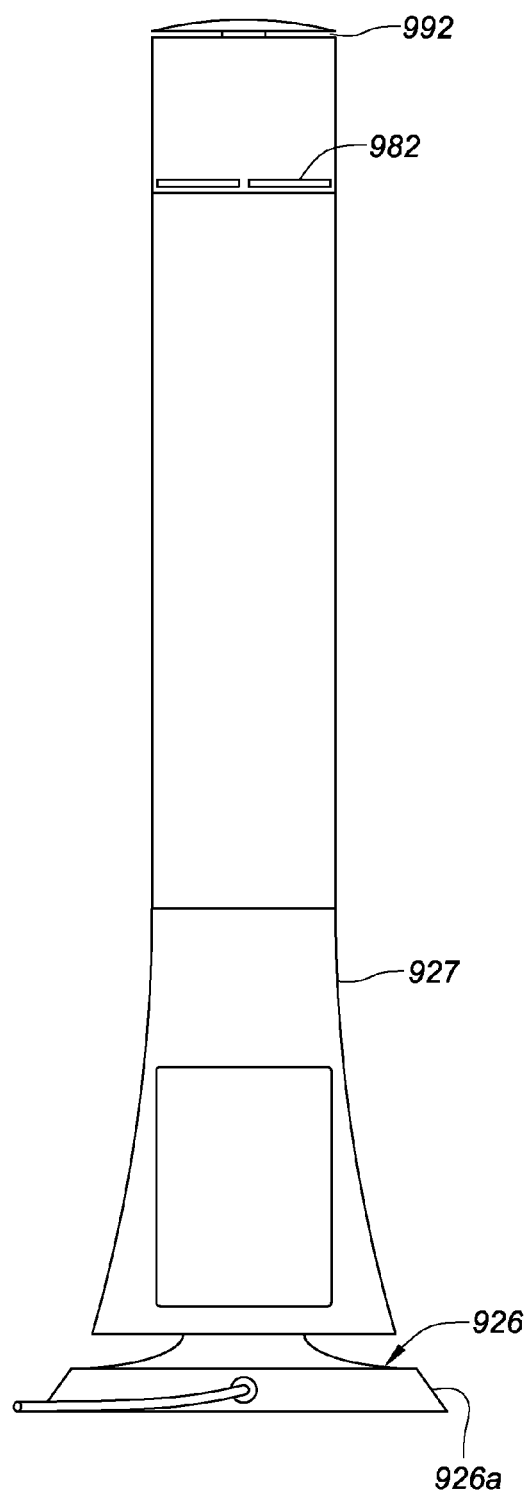

Heaters 800, 900 may include another form of exhaust port. As shown in FIGS. 24A-B, exhaust port 892 is in the form of a gap between cap 881 and top 890. As with other side venting embodiments, this configuration advantageously allows for a closed top surface 893 of cap top 890. Heater 900 may include a similarly configured exhaust port 992.

Figures 26A, 26B:
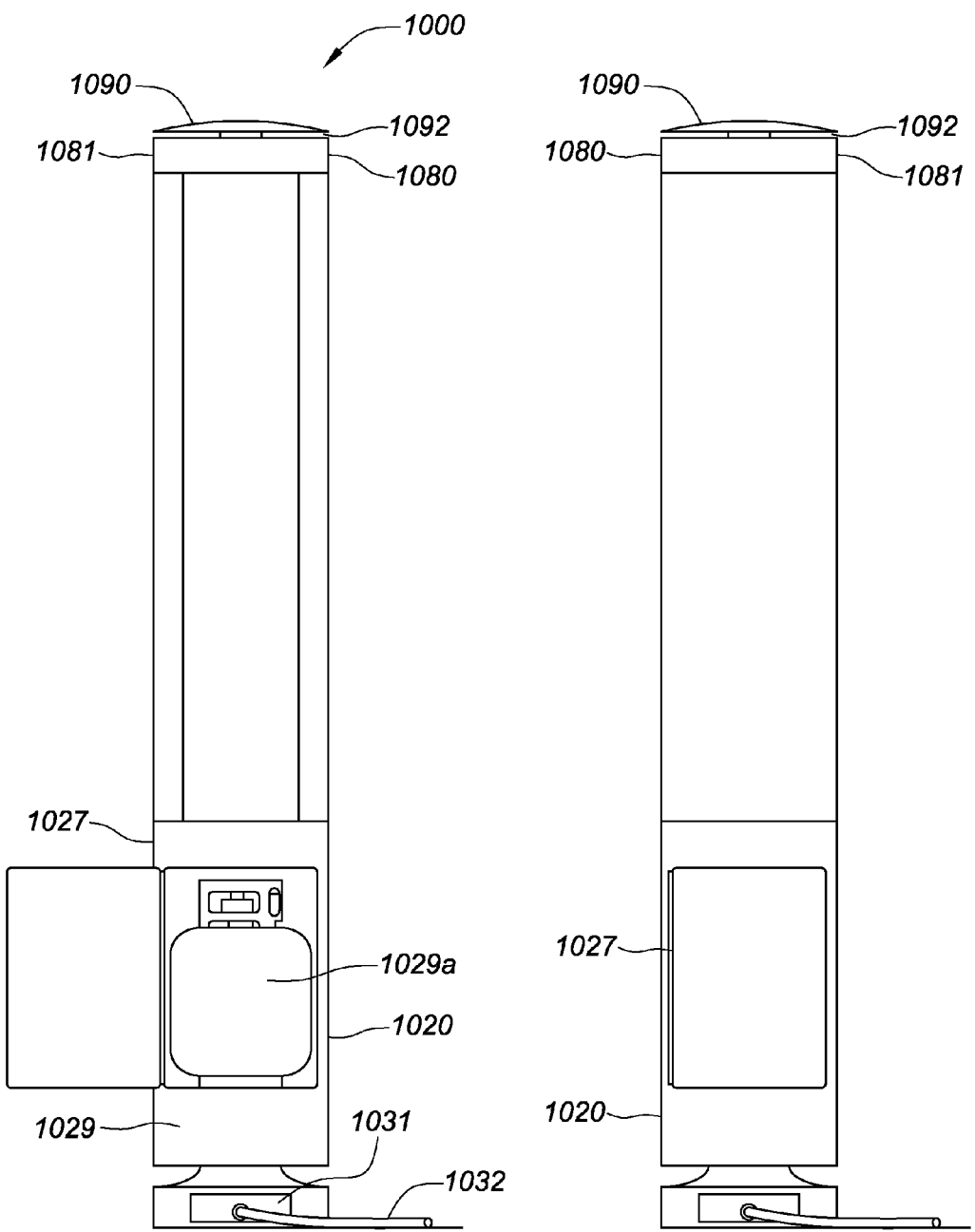
FIGS. 26A and B show another alternate embodiment of the heater that may be suited for portable outdoor use.

FIGS. 26A-B illustrate another embodiment for an outdoor portable heater. Heater 1000 may include a small top section 1080 without a heat exchange element as discussed with prior embodiments. Exhaust may be vented through exhaust outlet 1092, which is in the form of a gap between cap 1081 and top 1090 of top section 1080. This configuration of top section 1080 has the advantage that it includes fewer components and may thus be less expensive.

Heater 1000 may include a modified base 1020 including a cabinet 1027 for housing a portable fuel source 1029*a* for providing a flame vortex and a heating element 1029, for example, a propane or electric heating element, for providing heat from the base 1020. Heater 1000 may also include battery pack 1031, which may be removable, and power or recharge cord 1032, which may be removable from heater 1000.

Figures 27A, 27B:
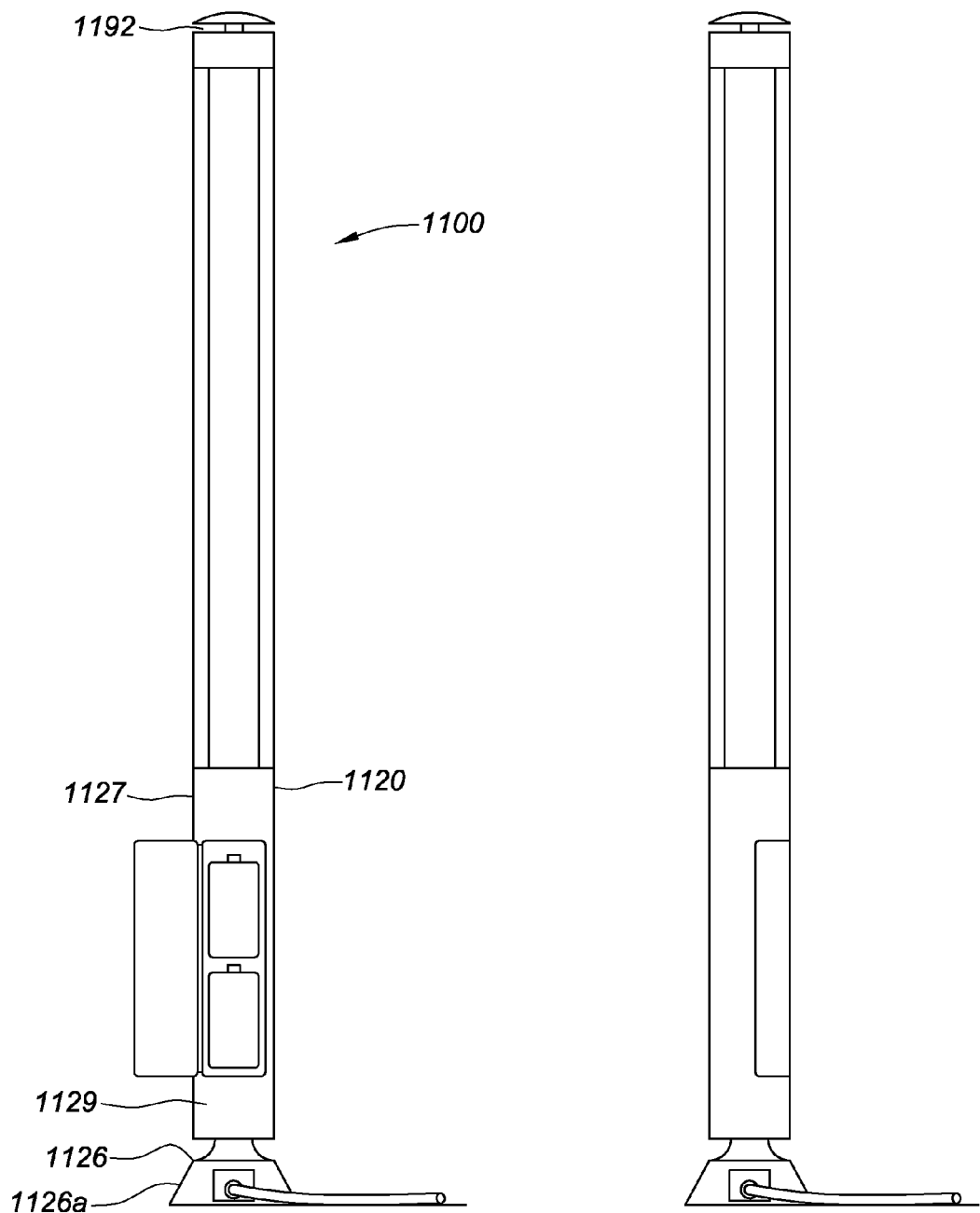
FIGS. 27A and B show another alternate embodiment of the heater that may be suited for portable outdoor use.

FIGS. 27A-B illustrate heater 1100, which, like heater 1000, houses a heating element 1129 in base 1120 rather than a heat exchanger in top portion 1180. Heater 1100 may have an overall long and slim profile relative to the other embodiments described herein. Likewise, base 1120 includes cabinet 1127 that may be relatively long and slim, suitable for housing multiple smaller portable fuel sources, e.g., one-pound propane tanks, one on top of each other. Cabinet 1129 may also house a heating element 1129 therein. Air for the vortex fan to deliver for combustion may be drawn from inside base 620. Alternatively, base 620 may include an air intake, like intake 221 in FIGS. 17 and 17A to provide air for the vortex fan.

Pedestal 1126 includes pedestal base 1126a having a generally conical frustum shape to stably support heater 1100. In this manner base pedestal 1126a may be wider than the rest of heater 1100. Base 1120 may include battery pack 1131 and cord 1132 as described in connection with heater 1000. Top section 1190 may include exhaust ports 1192 as shown.

Figure 28A:
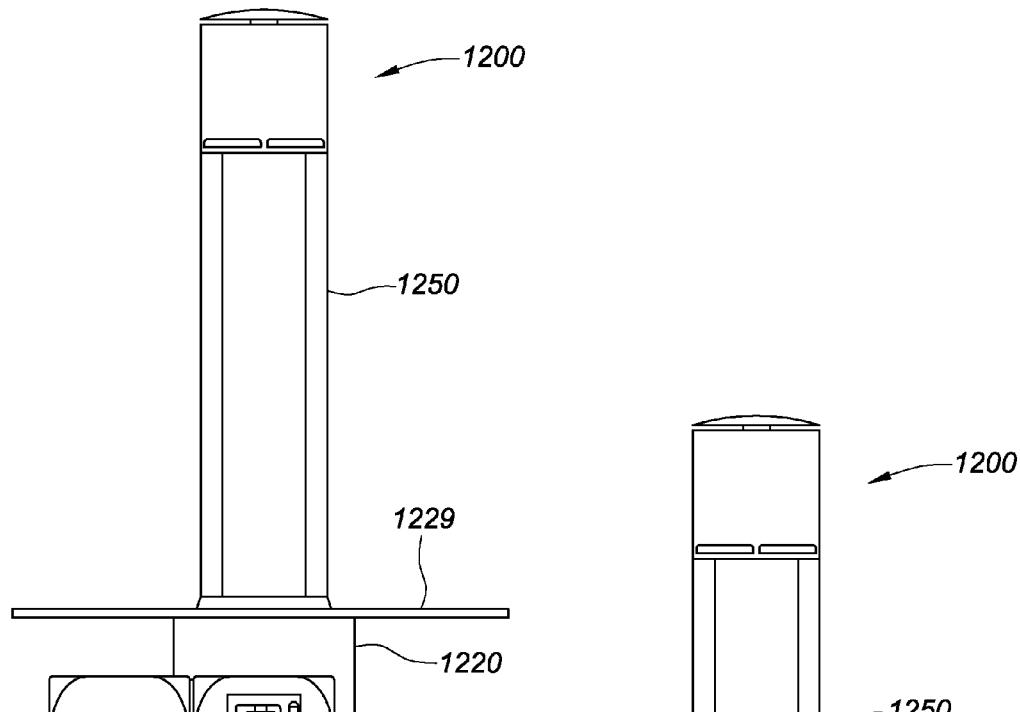
FIGS. 28A and B show another alternate embodiment of the heater that may be suited for portable outdoor use.
Figure 28B:
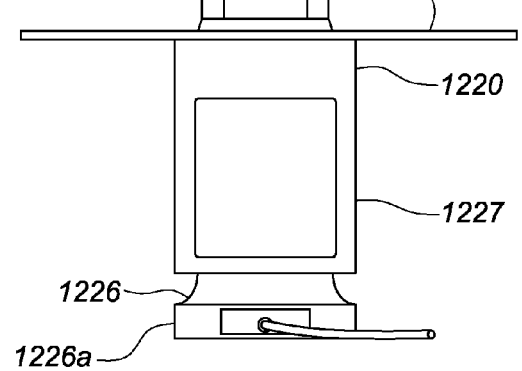

FIGS. 28A and 28B illustrate another embodiment for an outdoor portable heater that may be incorporated into a tabletop. Heater 1200 may include base 1220 that includes table top 1229 disposed around the base 1220 at or near the top thereof. Table top 1229 may be formed of any suitable material, including for example, glass, stainless steel, wood, acrylic, etc. In one form, table top 1229 is integral with heater 1200 such that midsection 1250 and the flame vortex project upward from table top 1229 while base 1220 supports table top 1229 much like a pedestal base of a conventional dining table.

As such, base 1220 includes a cabinet 1227, pedestal 1226, and pedestal base 1226a that have a circumference suitable for stably supporting the heater 1200 including the additional weight of the table top 1229. In this embodiment, heat may be delivered at or near an individual's feet, while the fire vortex may be the focus of attention above the table top 1229.

Figure 29:
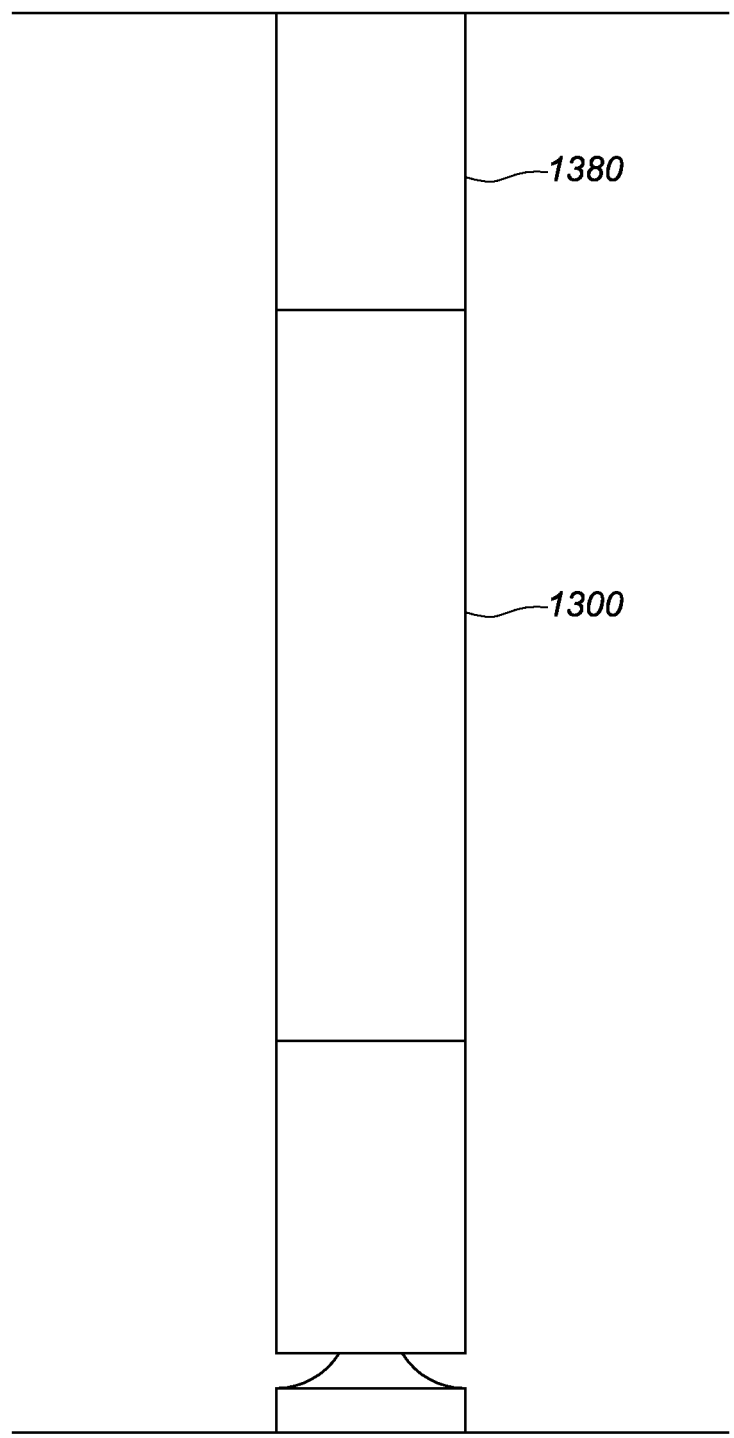
FIG. 29 shows another alternate embodiment of the heater that may be suitable for indoor use.
Figure 30:
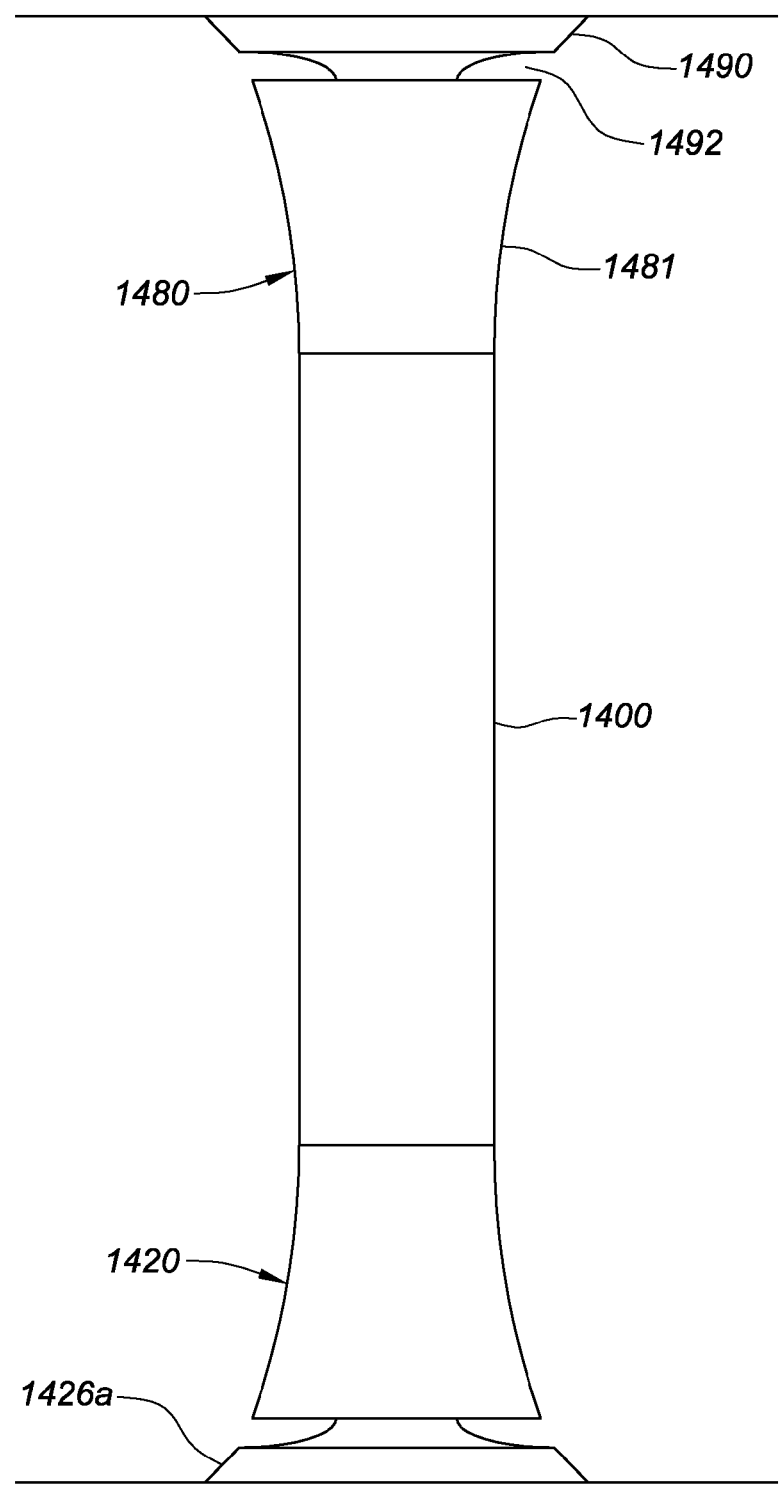
FIG. 30 shows another alternate embodiment of the heater that may be suitable for indoor use.

FIGS. 29 and 30 illustrate additional heater embodiments 1300, 1400, respectively, that may be suitable for indoor use. As shown, heaters 1300, 1400 may extend from floor to ceiling with exhaust being vented out through the ceiling into exhaust ducting (not shown). Heaters 1300, 1400 may use a plumbed fuel source, e.g., natural gas, propane or other fuels, and be hard wired to an electrical system.

Heater 1300 includes top section 1380 configured to intake fresh air and release exhaust fumes through ducting (not shown) in the ceiling such that there need not be any visible air intake or exhaust outlet vents. Air for the vortex fan to deliver for combustion may be drawn from inside base 620. Alternatively, base 620 may include an air intake, like intake 221 in FIGS. 17 and 17A to provide air for the vortex fan.

Like heater 1300, heater 1400 includes top section 1480 configured to vent exhaust fumes through the ceiling to ducting (not shown). Top section 1480 may include a cap 1481 and a top 1490 with an air intake gap 1492 therebetween.

Bottom section 1420 and pedestal base 1426a may reflect a concave profile. Similarly, top section 1480 and top 1490 may reflect a similar concave profile. This preferably provides a balanced and sleek appearance.

Figure 30A:
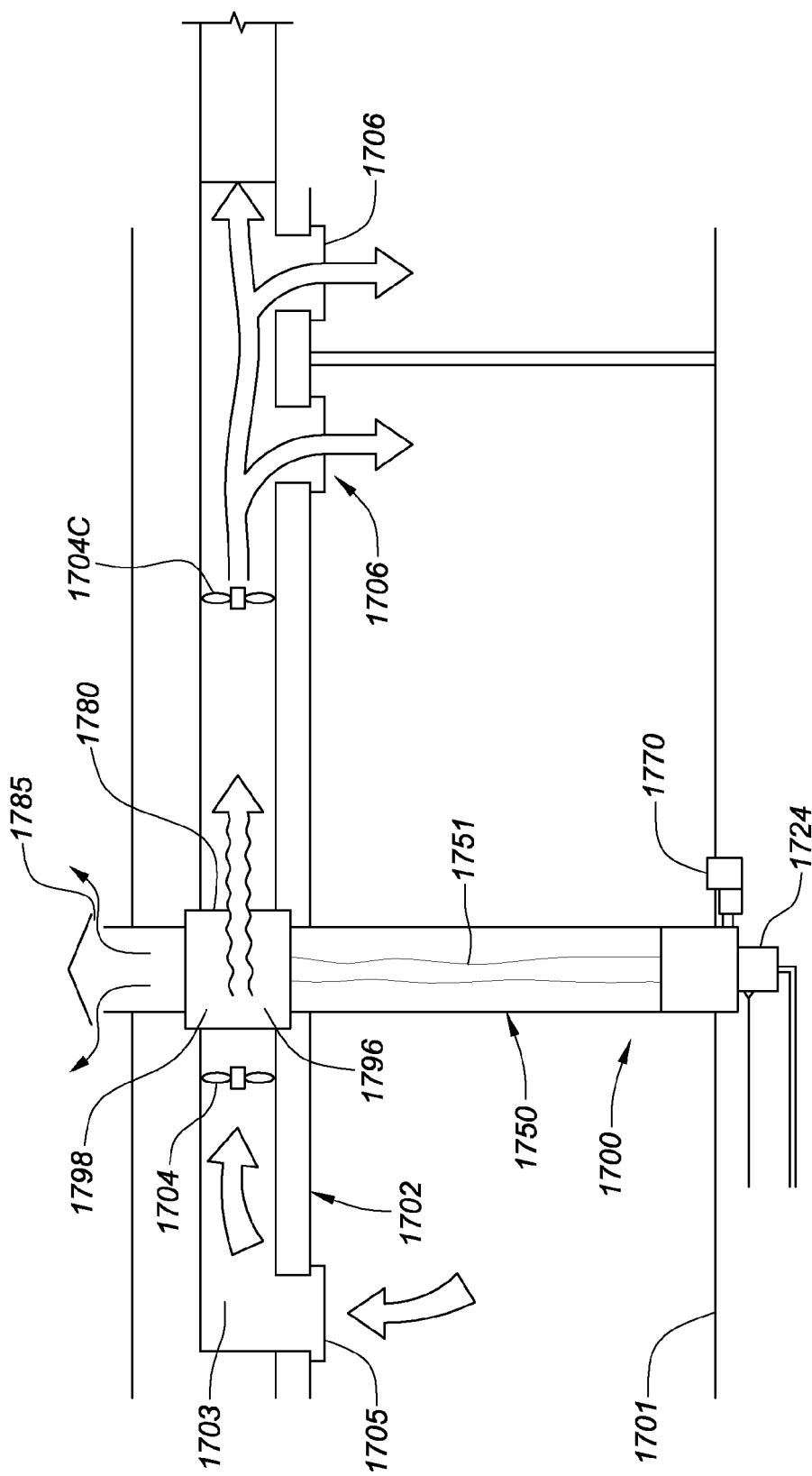
FIG. 30A shows another alternate embodiment of the heater that may be suitable for indoor use.

Another indoor heater embodiment 1700 is now discussed with reference to FIG. 30A. As shown, heater 1700 may extend from floor 1701 to ceiling 1702. More specifically, midsection 1750 may extend from floor 1701 to ceiling 1702 to provide the unique appearance of a transparent section and fire vortex 1751 without a base and top section. In this embodiment, midsection 1750 may be more properly referenced simply as tube section 1750, because as shown, heater 1700 need not have a base as in the other embodiments. Furthermore, tube section 1750 may only include a single tube because in this embodiment, heated air need not be drawn to any base through an annular gap between concentric tubes. Instead, vortex fan 1770 may simply provide air for combustion below or at floor level with fuel supplied as shown to combustion chamber 1724. Flame vortex 1751 may then extend upward.

The resulting heat may be captured in top section 1780 in heat exchanger(s) 1796, 1798. These heat exchangers may be positioned in HVAC ducting 1703 in which air flows due to fan 1704. To that end, air may be sucked into HVAC duct 1703 through inlet 1705 and then forced past heat exchangers 1796, 1798 to deliver air to one or more vents 1706. To facilitate the heated airflow, an additional HVAC fan 1704a may be used as shown. Warm air may be delivered to multiple rooms.

In another embodiment similar to the other heaters described above, heater 1700 may include a base with a fan to draw down heated air as described above. This heater air may then be fed from the base to HVAC ducting to vents in the floor 1701.

Fumes from fire vortex 1751 may be vented through ports 1785 that are preferably positioned out of HVAC ducting 1703.

Another heater embodiment that allows cleaning without disassembly is now described with reference to FIGS. 33-35. Heater 1500 is configured to receive a cleaning apparatus 1600 for removing soot, dirt and/or other debris that may be deposited on the interior of inner cylinder 1552 over time. More specifically, as illustrated, heater 1500 includes a base 1520, midsection 1550 and top section 1580 similar to other embodiments. However, top section 1580 is modified to receive the cleaning apparatus 1600 therethrough. In particular, top section 1580 includes cap 1581 with access tube 1587 extending therethrough. Access tube 1587 is generally coaxial with the inner cylinder 1552 of midsection 1550 and sized to receive the cleaning apparatus 1600 therethrough.

In one form, cleaning apparatus 1600 may include a hose or tube 1610 with a plurality of perforations or openings 1612 disposed around the circumference and along the length thereof. The tube 1610 may include a water hose attachment 1614 at one end thereof. Tube 1610 may be rigid, semi rigid or flexible. As shown, tube 1610 is preferably sized so that it may be inserted through the access tube 1587 of top section 1580 and inner cylinder 1552 of midsection 1550. It preferably has a length that is substantially the same as the height of the inner cylinder 1552.

Figures 33, 34:
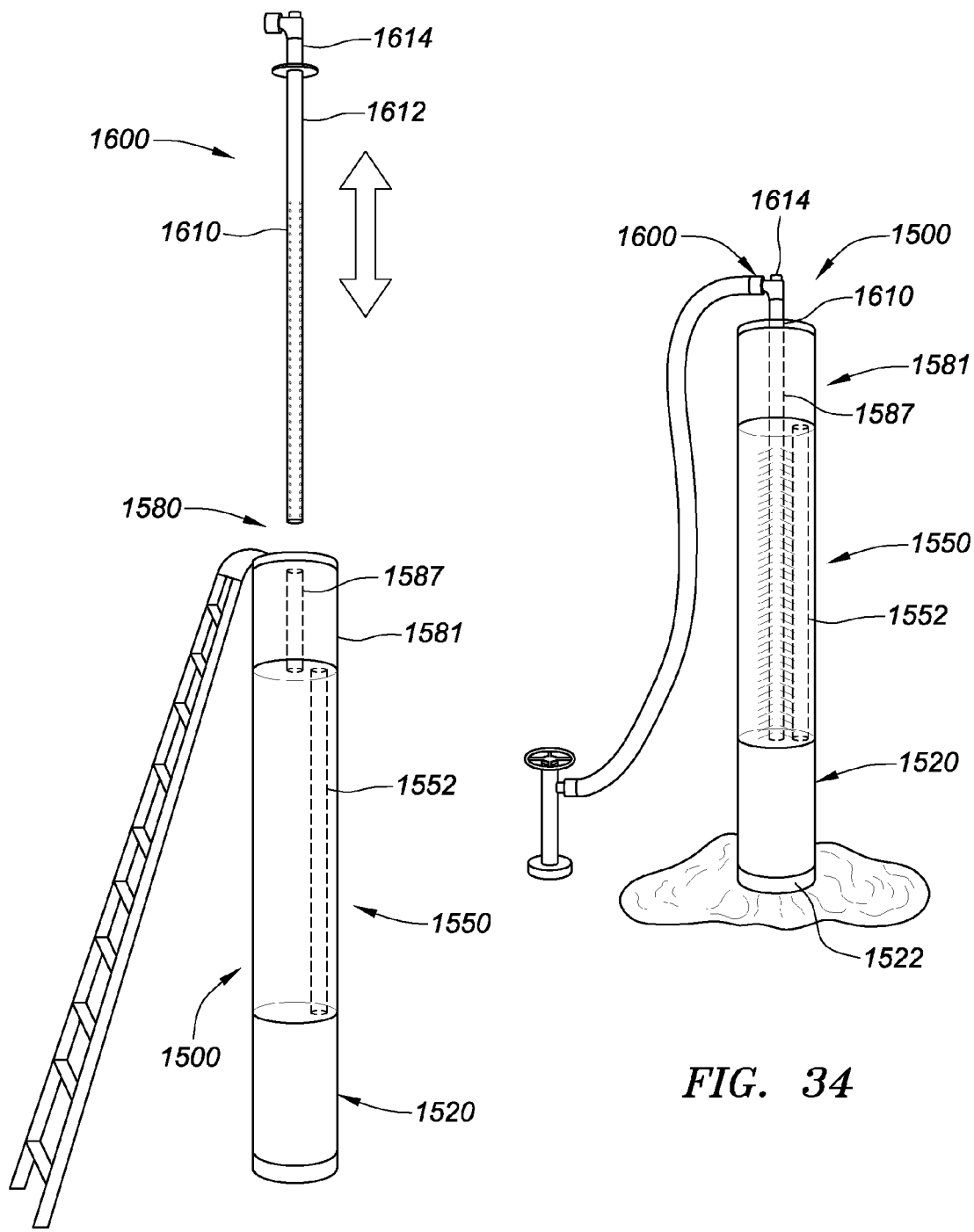
FIG. 33 shows a perspective view of an alternate embodiment of the heater with a cleaning apparatus.
FIG. 34 shows another perspective view of the heater of FIG. 33 with the cleaning apparatus in use.

As illustrated in FIG. 34, once tube 1610 is positioned within the inner cylinder 1552, a water or other cleaning fluid supply may deliver water or cleaning fluid into tube 1610. The water may spray out of tube 1610 from each of the perforations 1612 thereby spraying water or cleaning fluid at the inner surface of inner cylinder 1552. The water may then drain from inner cylinder 1552 into base 1520 and out through heat exhaust vent 1522.

Figure 35:
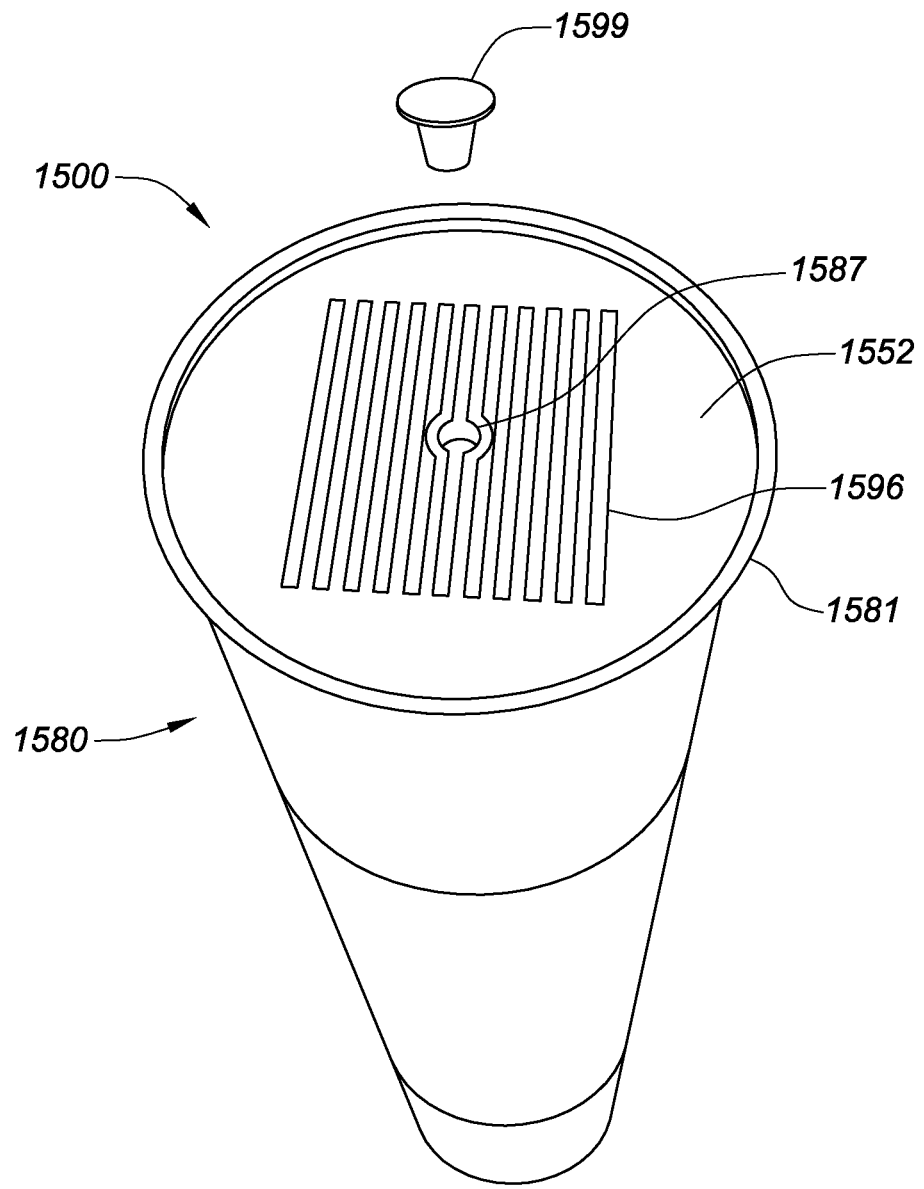
FIG. 35 shows a top view of the heater of FIG. 33.

As illustrated in FIG. 35, in one form, access tube 1587 may extend through the top surface 1593 of cap 1581 and may pass through one or more heat exchangers 1596, 1598 within cap 1581. Removable cap or plug 1599 may also be inserted in the top end of access tube 1587 to seal it when cleaning apparatus 1600 is not in use.

Access tube 1587 in the heat exchanger may also allow for the insertion of a vacuum cleaner attachment. A tube attached to a vacuum unit or similar low air pressure inducing appliance may be used to extract water, dirt or debris from the combustion chamber area.

As described above in connection with FIGS. 28A-28B, the heater of the current invention may be incorporated into furniture such as a table. Further in this regard, a table or tables may be arranged around the heater of the current invention in a manner to optimize heat output. For example, ducting may extend outwardly from the heater exhaust vents below the table(s), or other furniture, to provide an even greater radius of warmth. Additionally, the table or other furniture may be formed of a suitably porous material or with openings therethrough to provide released heat upwards as well as outwards. In this matter, the heater may be used to keep food warm on a table.

Figure 36:
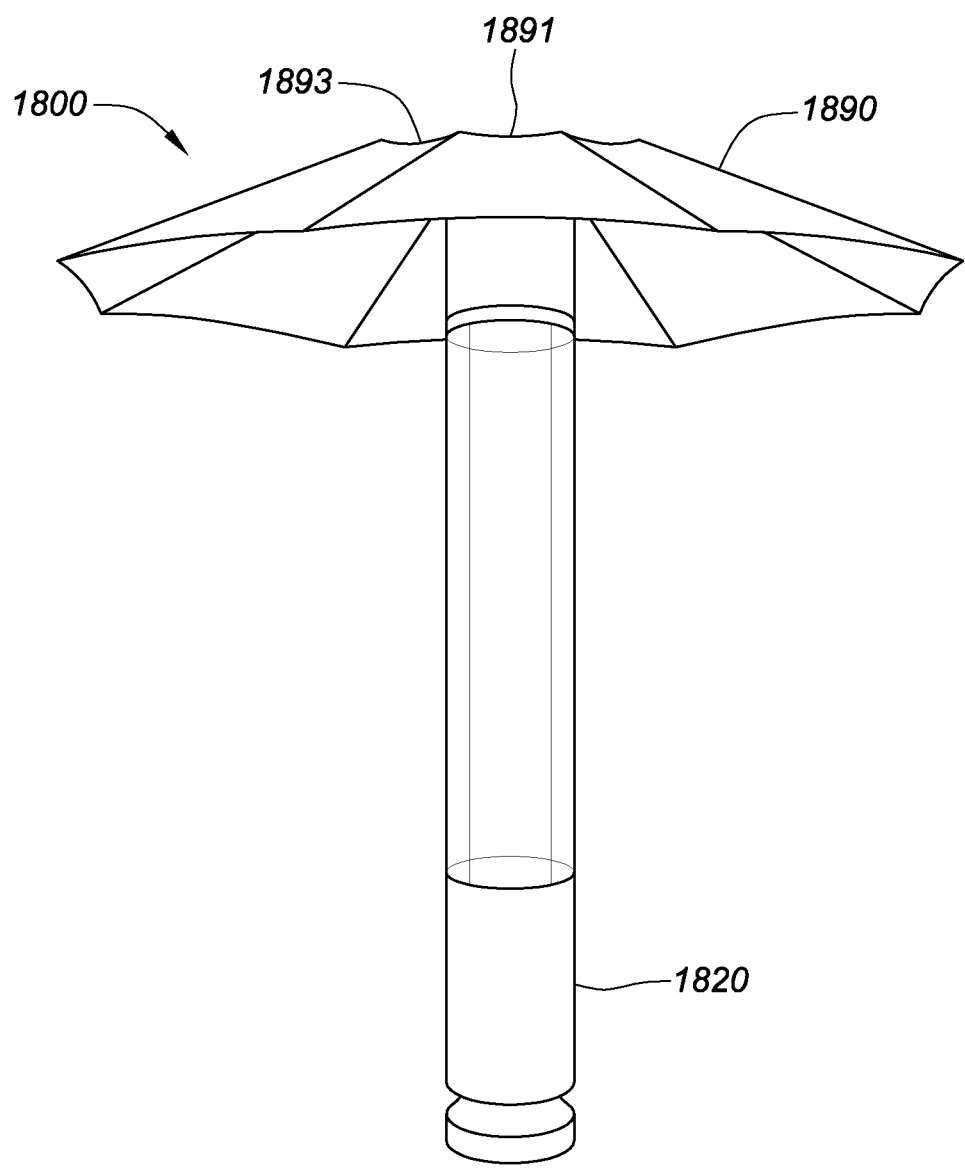
FIG. 36 shows another alternate embodiment of the heater with an umbrella attachment.
Figure 37:
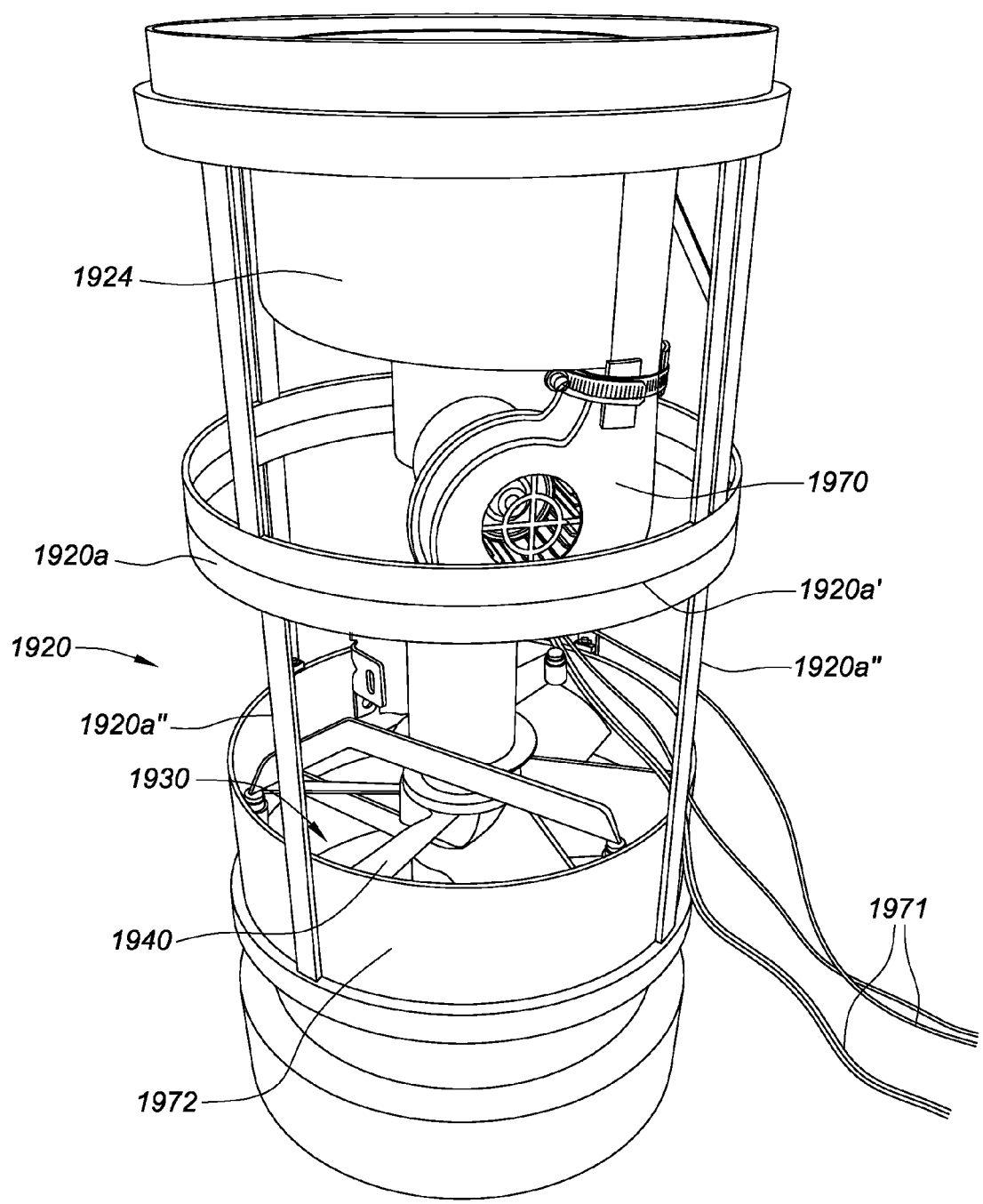
FIG. 37 shows a base for a heater in accordance with various aspects of the invention.
Figure 38:
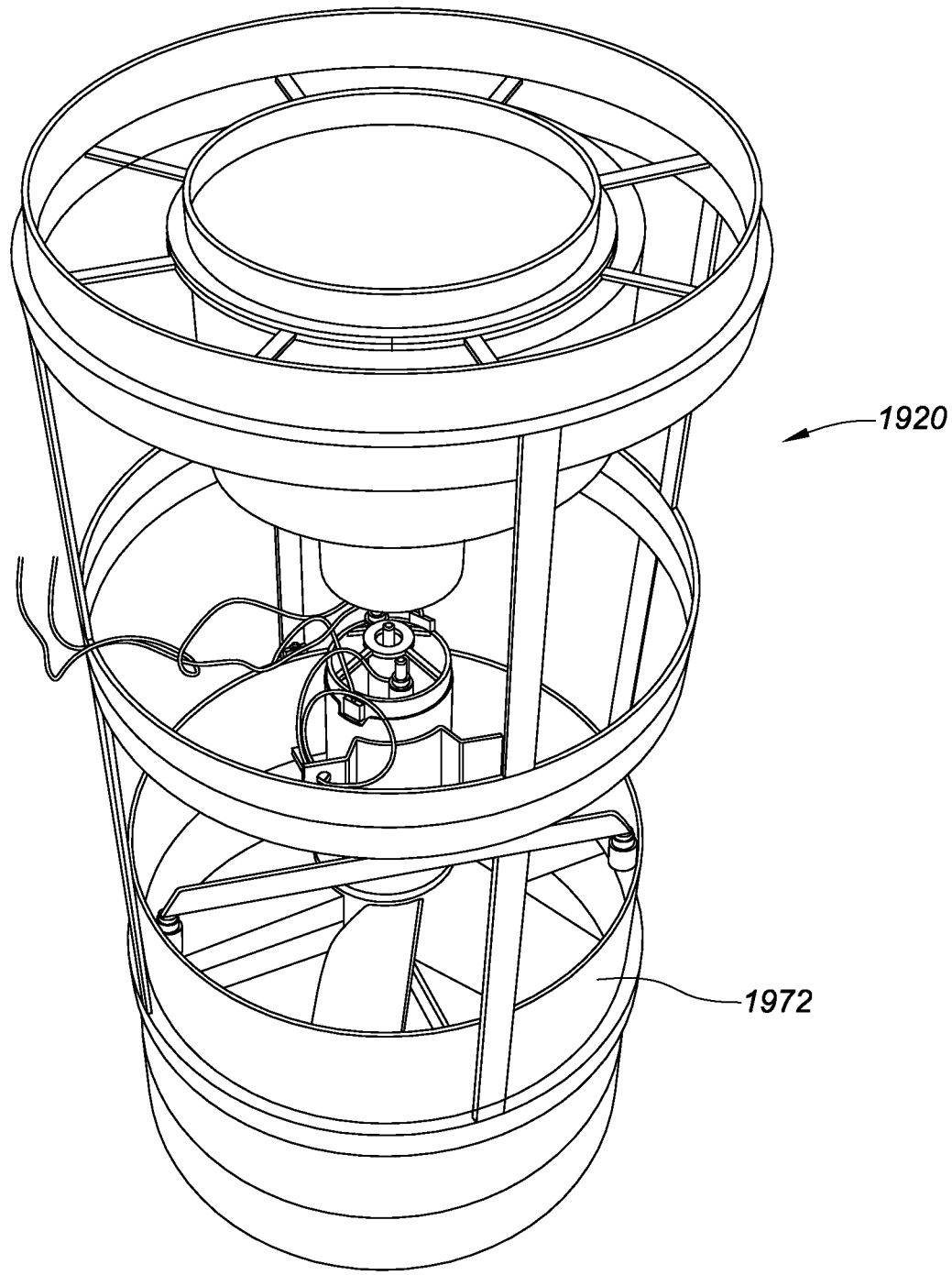
FIG. 38 shows another view of the base of FIG. 37.
Figure 39:
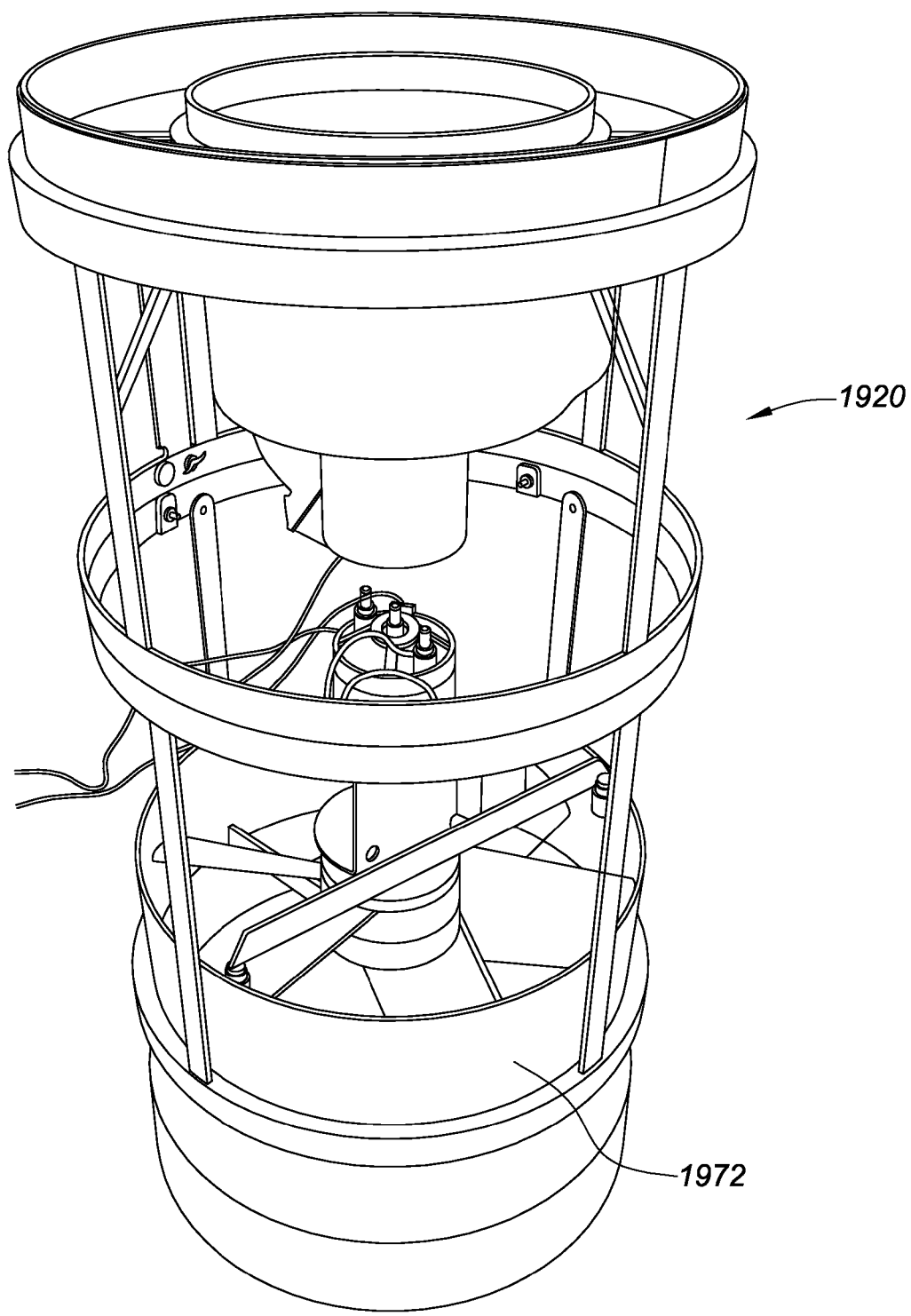
FIG. 39 shows another view of the base of FIG. 37.
Figure 40:
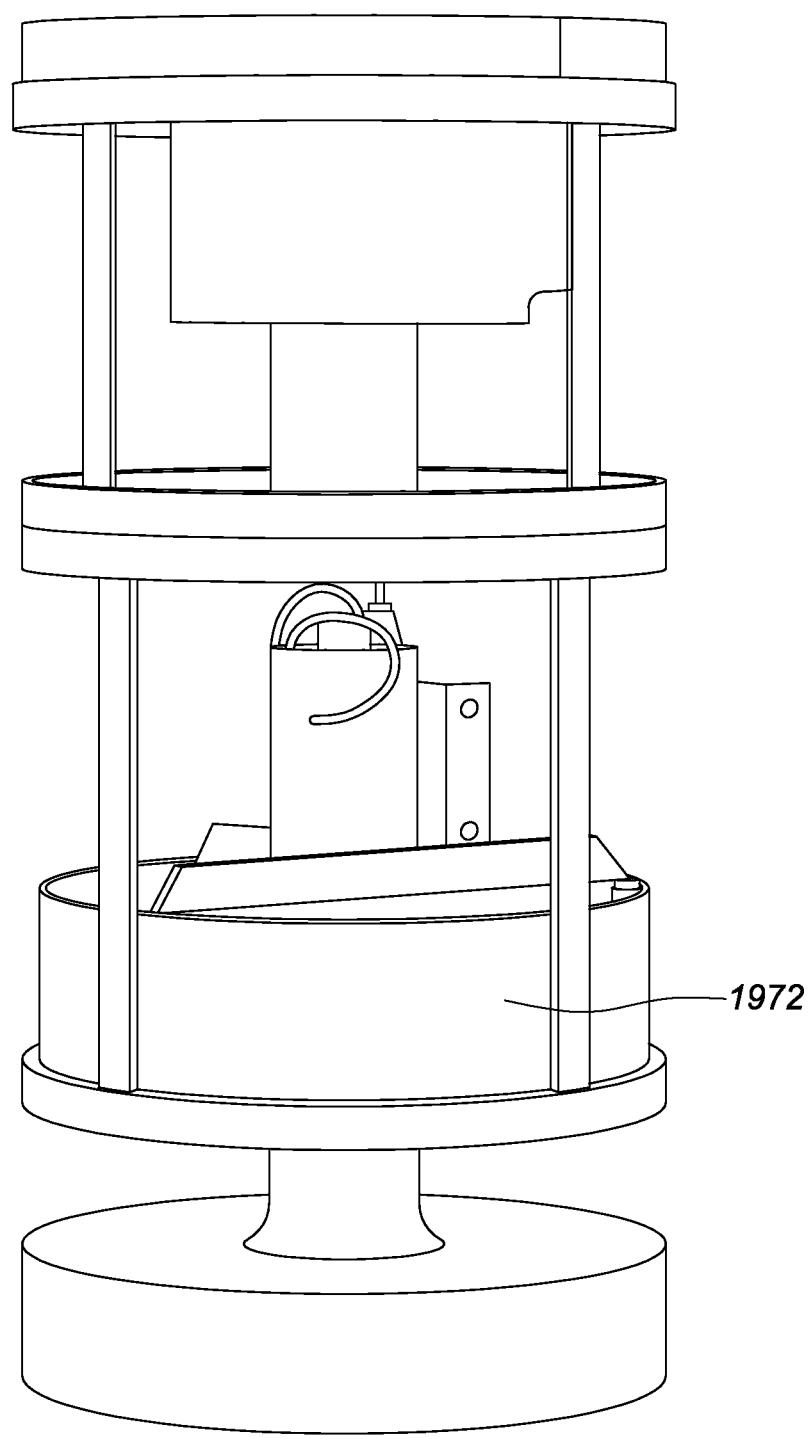
FIG. 40 shows another view of the base of FIG. 37.
Figure 41:
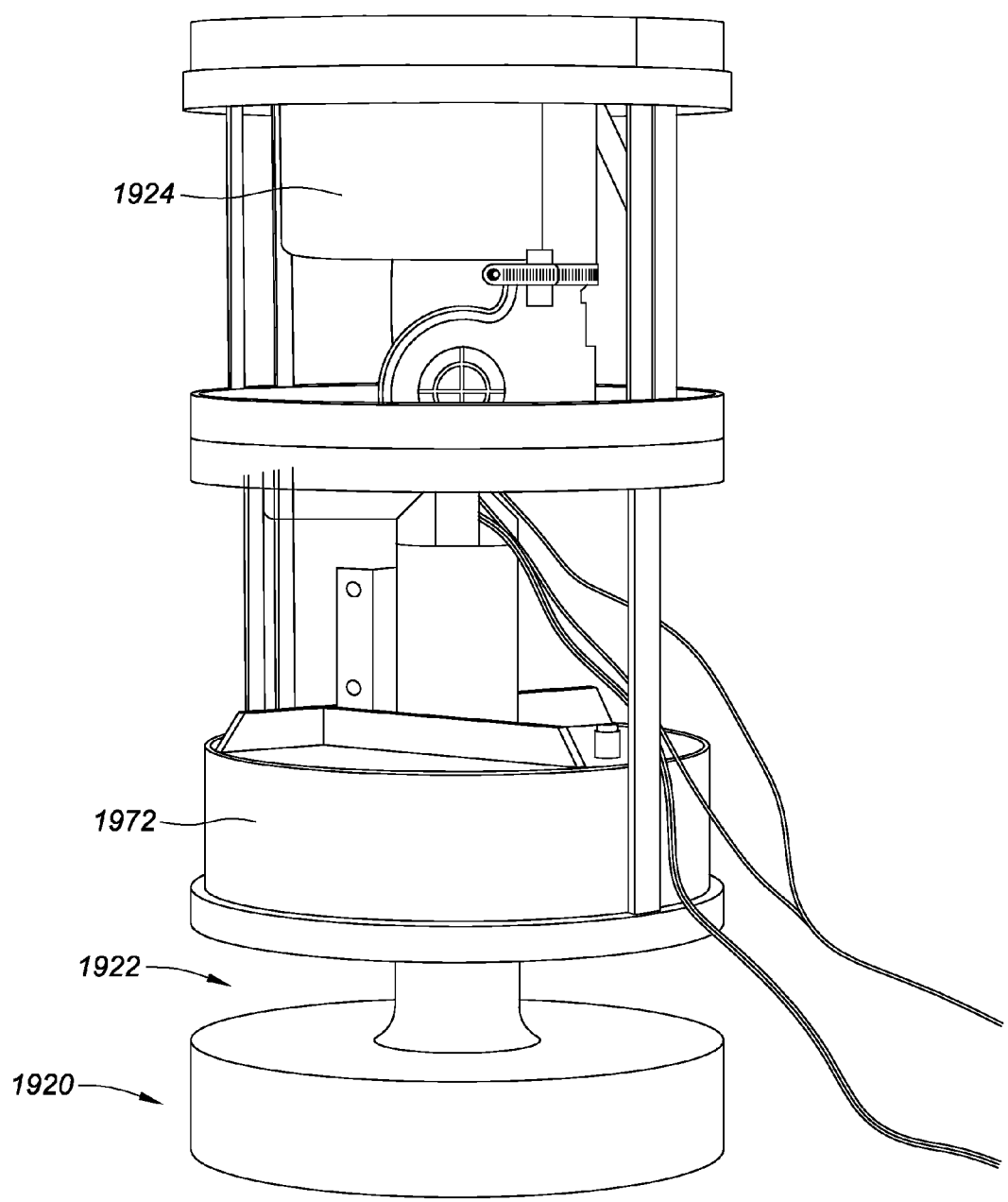
FIG. 41 shows another view of the base of FIG. 37.
Figure 42:
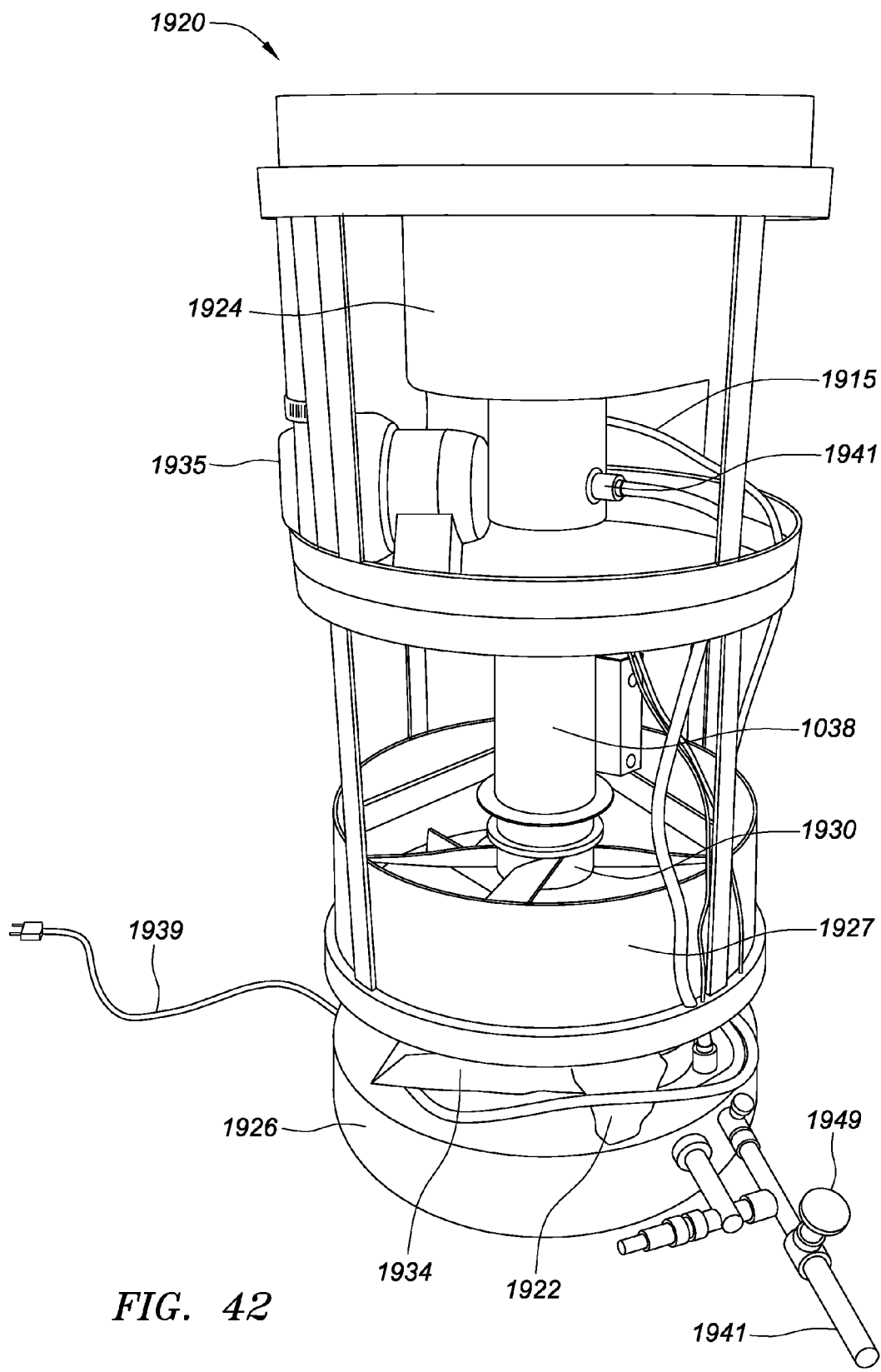
FIG. 42 shows another view of the base of FIG. 37.
Figure 43:
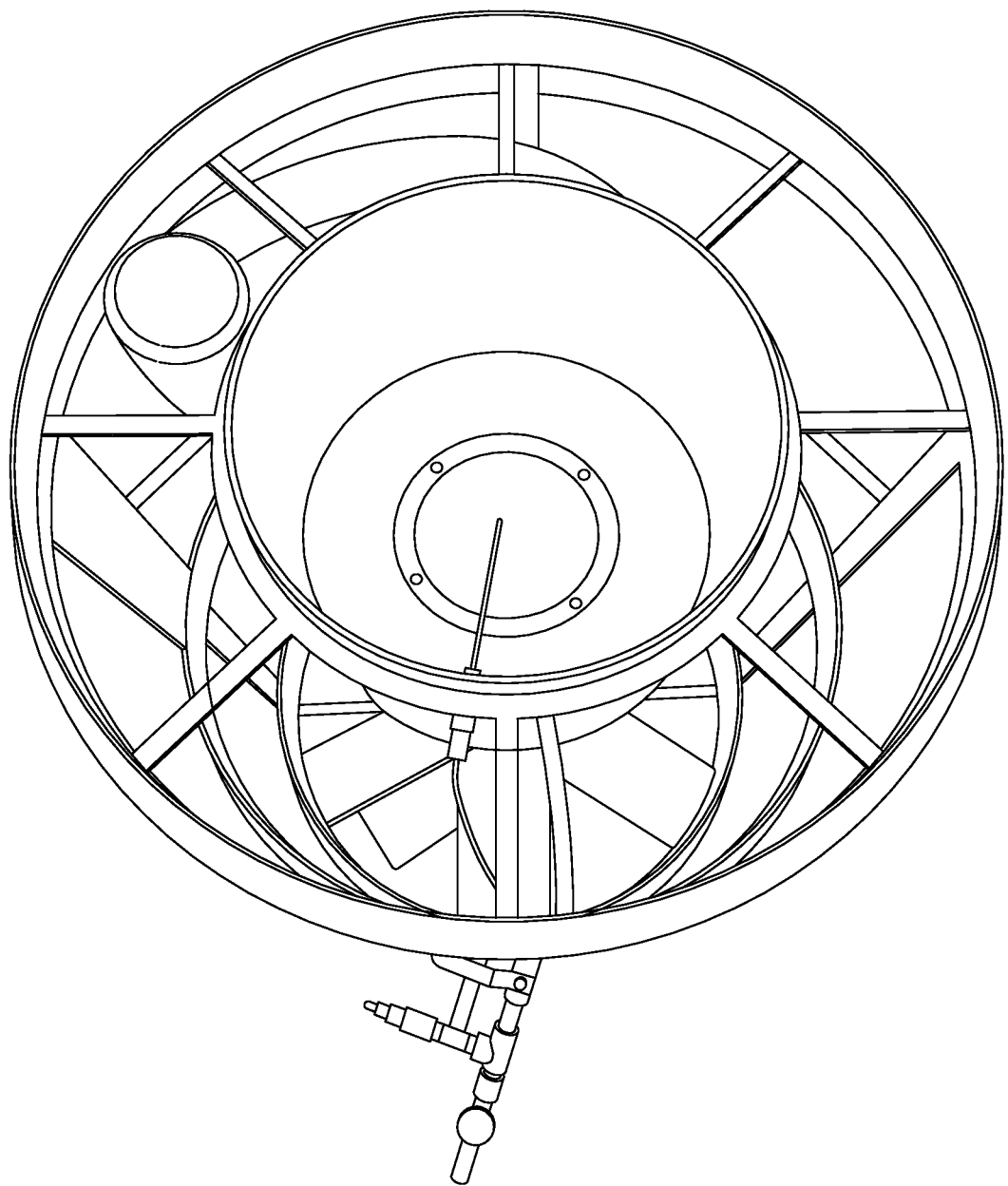
FIG. 43 shows another view of the base of FIG. 37.

FIG. 36 illustrates another alternate embodiment of a heater. Heater 1800 may incorporate umbrella 1890 at top section 1880. As illustrated, top section 1880 of heater 1800 includes cap 1891 with an open top surface 1893 for venting exhaust fumes. Umbrella 1890 is preferably removably attached to the top of cap 1881 and includes an open top 1891 such that exhaust venting from top surface 1893 is released above umbrella 1890. Umbrella 1890 may be removed and/or foldable into a closed position if not in use.

Heater 1800 advantageously provides a sturdy and stable base 1820 for umbrella 1890. Thus, heater 1800 may advantageously be used day and night. It may provide shade and/or rain protection during the day in addition to the vortex flame display at night. In this manner, heater 1800 may reduce the time and/or labor required with existing devices where sun umbrellas must be installed during the day and heaters must be installed at night on a nearly daily basis.

Further, in another form, multiple heater 1800s may be positioned proximate to one another to provide a canopy. This may be used to advantageously provide a partially enclosed space similar to a heated tent or room.

FIGS. 37-43 illustrate an alternate embodiment for base 1920. Base 1920 incorporates many of the features of base 20 described above, and similar reference numerals are used. Hence, only the differences will be described in detail. Different views of base 1920 are provided so that these components may be seen.

Base 1920 may include fan 1930 near the bottom of base 1920 to draw heated air downward from above. Fan blades 1940 may be attached to the drive shaft of an electrically driven axial fan. Fan 1930 preferably operates smoothly and quietly, located beneath the combustion chamber 1924, drawing warm air from above. Fan 1930 may be a direct drive thereby avoiding the need for a fan belt or bearings on which a fan rotates. This preferably saves on cost and increases durability.

In this embodiment, fan blades 1940 do not extend all the way to base 1920, thereby allowing enough space between base 1920 and the tips of the rotating fan blades 1940, to run utility lines 1971, e.g., fuel lines and electric power for both the axial flow fan 1930 and also the centrifugal fan 1970 that provides air into combustion chamber 1924 and for spinning the flame. Control wires for operating solenoids, etc. may also be passed through this gap between fan blades 1940 and base 1920. In one embodiment, the gap between the fan blade tips 1240 and base 1220 is about 1 inch, but other gaps may be used. Running utility lines 1971 in an exterior fashion avoids the need to run utilities centrally up the support structure described in earlier embodiments.

Utility lines 1971 may run vertically and preferably close to the exterior wall of base 1220 to provide clearance for the largest diameter fan allowable. In this manner heat delivery may be increased. Additionally, a shroud or duct 1972 may be installed around the fan within close proximity to the tips of fan blades 1940 to provide efficient airflow, to protect utility lines 1971 (which may run exteriorly to shroud 1972), and to act as heat shielding for the external wall of base 1920.

As shown in FIGS. 37-43, base 1920 may include framing or frame structure 1920a, which may in turn include horizontal circular rings 1920a' and vertical members 1920a". These items may be welded or otherwise fastened together to provide strength to support heater 1920. Base 1920 may also include mating ring 1920a" to which a midsection (not shown) may be attached.

As will be readily understood to those of skill in the art, the various embodiments described herein may have particular advantages in certain applications, for example a permanent outdoor installation, a portable outdoor use, and/or indoor use. For example, a device that is permanently installed outside plumbed to a fuel source and hard-wired electricity will have the advantage of a clean installation, with utility lines hidden from view and out of the way of traffic. The device run time will not be limited by a limited fuel source or battery life. The device may also be stably and securely mounted to a floor or foundation, for example, with anchors.

Portable devices have the advantage of being easily relocated and/or repositioned. They do not require plumbing or hard wiring and may be used in new and old spaces alike.

Indoor devices, like permanent outdoor devices, have the advantage of hidden gas and electrical sources and unlimited run time. They may also be stably and securely mounted to a floor or foundation (for example with anchors). Additionally, exhaust fumes may be vented through the ceiling out of a given space.

Figure 45:
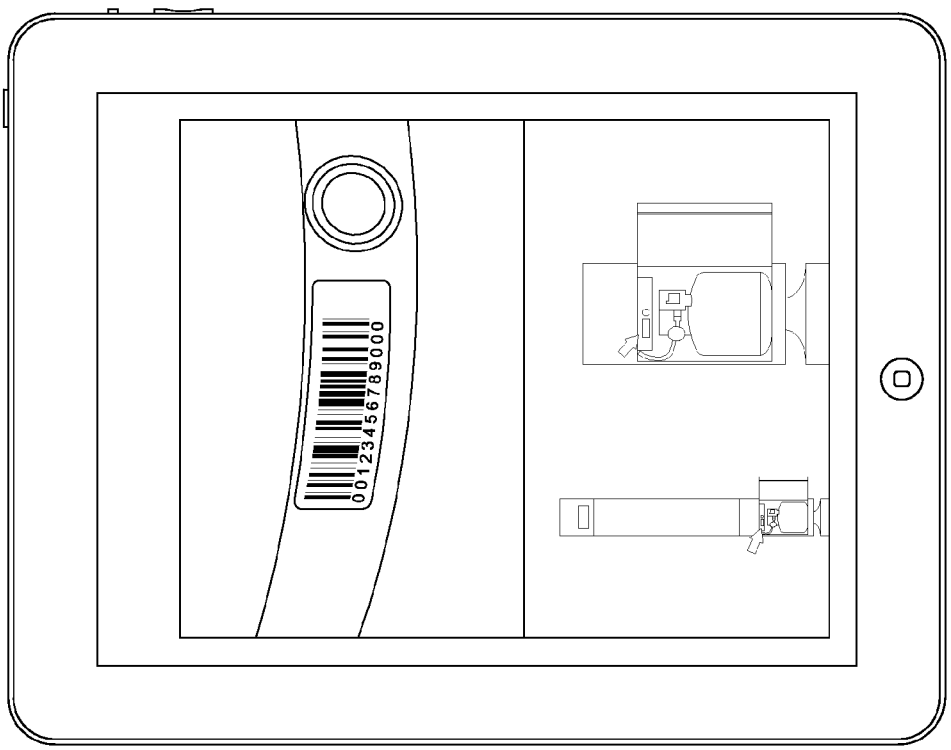
FIGS. 44-49 show screen shots of a mobile application illustrating remote operation of a heater via mobile device.
Figure 44:
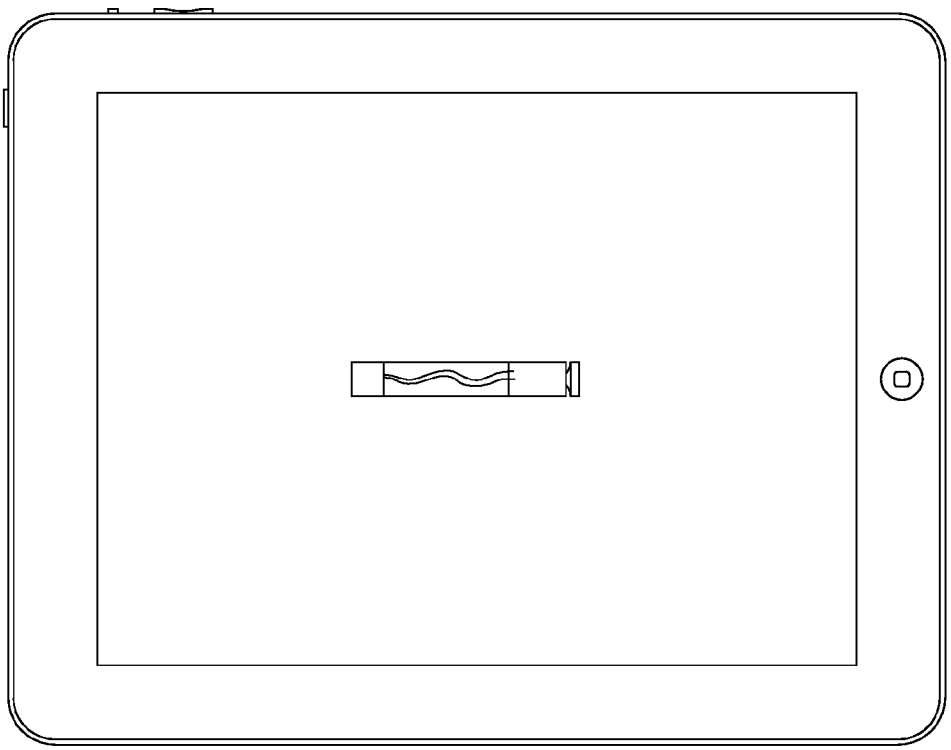

With reference to FIGS. 46-50, a heater in accordance with any of the embodiments described herein may be operable by computer, smartphone and/or other mobile device via mobile and/or web app. For example, a user may initiate a Wi-Fi connection between one or more heater(s) and one or more mobile device(s) as shown in FIG. 44. The user may scan a heater's serial number into the mobile device (for example, via the mobile device's built in camera), turn the heater on to a "setup mode" and thereby establish remote control of the heater through the app as shown in FIG. 45. Additionally, the app may also synch the heater's status and GPS location.

Figure 46:
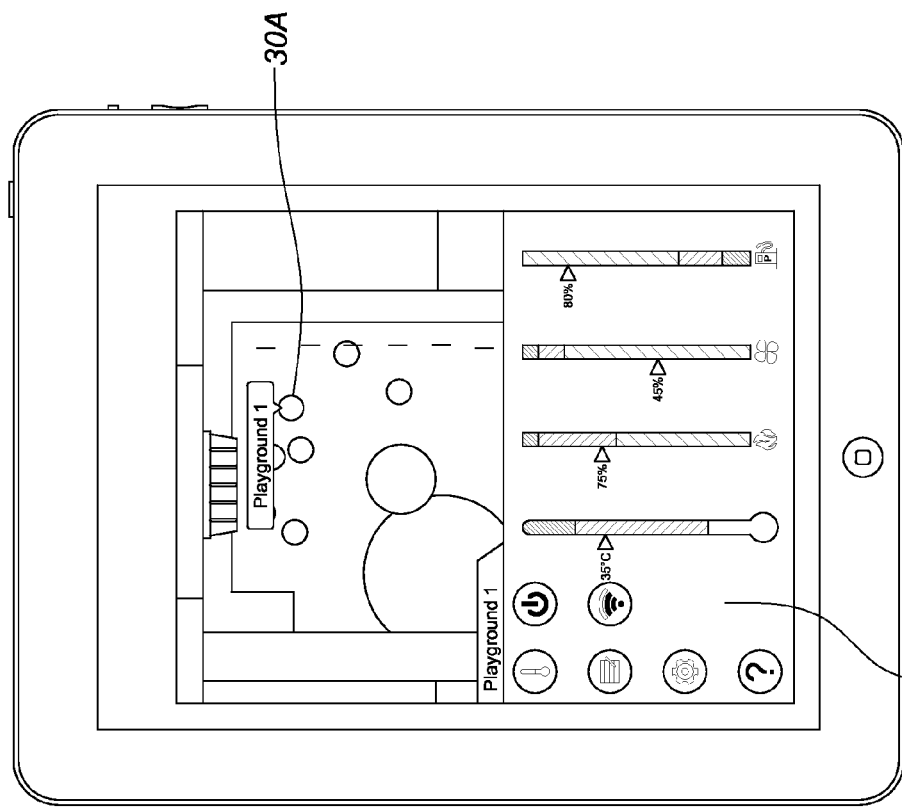

Once a heater is connected to a computer or mobile device, the app may show a representation 30A of the heater (e.g., dot, star, icon, etc.) on a map and or satellite image as shown in FIG. 46. A user may click on the heater 30A to open a control window 32 for the given heater 30A. From control window 32, the user may view the heater's status and signal strength, and may control various features of the heater, for example, output air temperature, propane output, flame height or appearance, fan speed, and the like. The values for the various features may be linked by the app such that adjusting the setting of one feature may automatically adjust the setting of one or more additional features. In this manner, it can be ensured that the heater is operated within safety limits.

Figure 47:
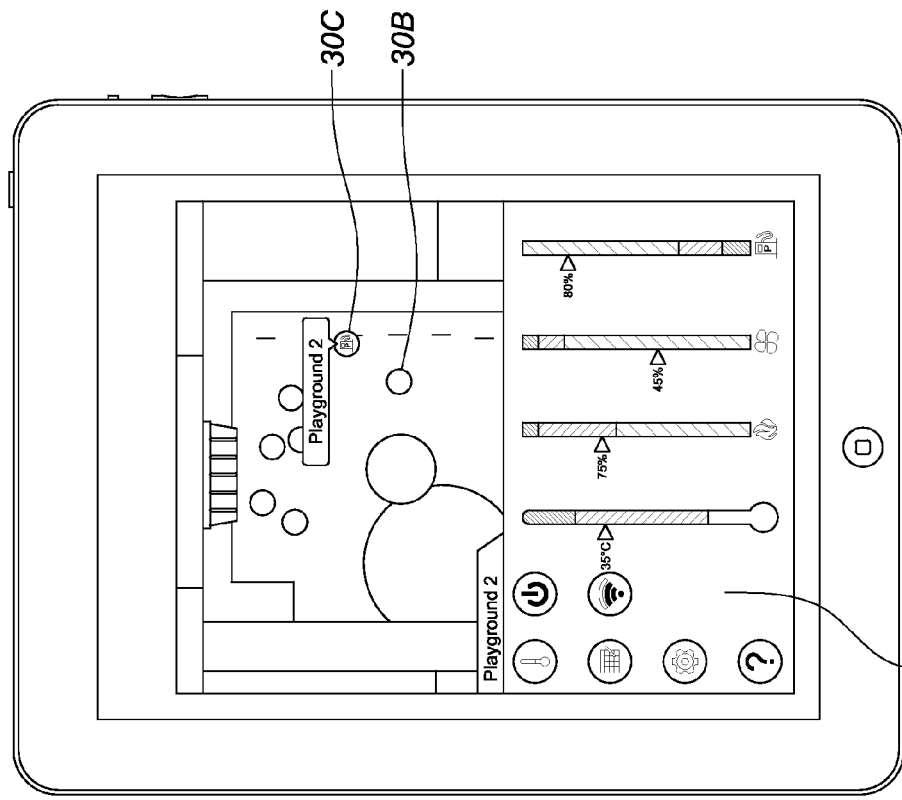

The dot or icon representing a given heater may be different colors to give an indication of the heater's status as shown in FIG. 47. One color, grey for example, may indicate that a heater 30B is powered down and not operational. Another color, green for example, may indicate the heater is powered on and operating properly. Another color, yellow for example, may indicate a warning with respect to the heater's 30C status. If the user opens the control window for such a heater 30C, the control window may provide detail regarding the particular issue. For example, the control window 32 may indicate that the heater's fuel source is running low.

Figure 48:
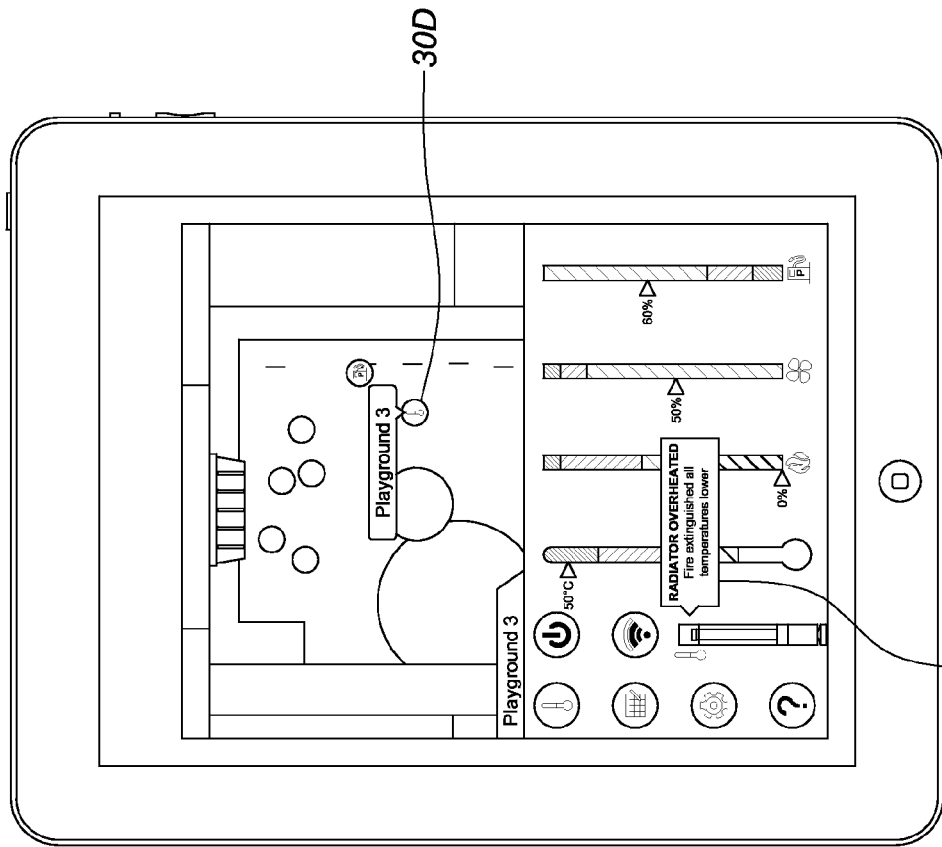

Yet another color, red for example, as shown in FIG. 48 may indicate that heater 30D has shut off due to a fault in the system, for example, an overheated radiator. Again, the user may open the control window for the heater to see details 34 about any particular fault.

An onboard monitoring system may monitor any number of possible faults and may notify a user of the fault and/or take appropriate action. For example, if the pilot light is not lit, the heater may not start. If the temperature of the radiator is too high, the flame level may be decreased or the output fan speed or bypass vent may be increased. If the output temperature is too high, the flame level may be decreased or the output fan speed or bypass vent may be increased. If the tilt sensor indicates the device is not within predetermined limits, the device may be shut off or not start. If the glass cylinder is broken, the gas may be shut off or the device may not start. If there is a restriction of output air flow, a warning may indicate a need to clean the radiator or the device may shutdown via an overheat protocol. If the fuel level or pressure level is too low, a warning may indicate if the estimated run time is less than a predetermined value, for example, 10 minutes, or the device may shut off.

The app may include both manual and automatic controls for various features. Manual controls may include, for example, increasing or decreasing output temperature, increasing or decreasing flame height, increasing or decreasing output air flow. Automatic controls may include, for example, setting thermostat for a predetermined value for indoor use, remotely sensing temperature and making adjustments to hold a predetermined temperature for outdoor use, permitting a programmed schedule, for example, based on date, time, or light sensor.

Figure 49:
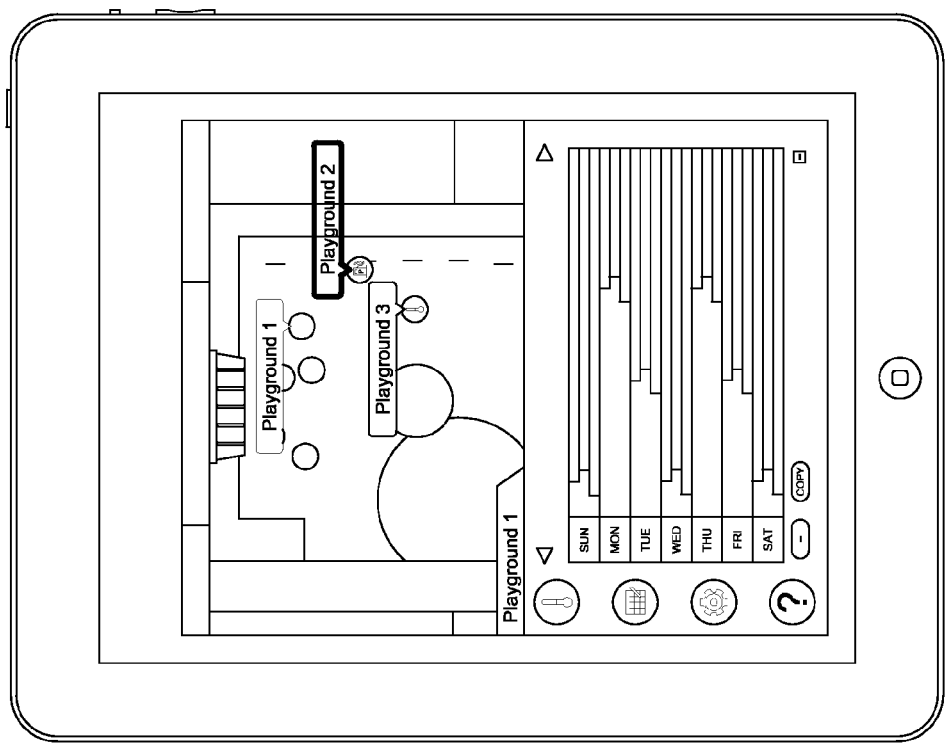

A scheduler, as shown in FIG. 49, may allow a user to program on/off times for various heaters on a daily and/or weekly schedule. Additionally, the app may allow a choreographed flame appearance, for example, height and/or spinning speed, which may be synched with music or other audio element.

A heater in accordance with the various embodiments described herein may include a variety of additional features. For example, an auto-clean system may automatically clean the inner and outer cylinders on a schedule and thereby reduce required maintenance of the device. Alternatively, the user may be advised that a manual cleaning, such as that described in FIGS. 33-35, is necessary.

A water feature may be incorporated between the inner and outer cylinders thereby allowing the device to provide an interesting visual effect both during the daylight and at night. The water may be colored, for example, with an additive or with lighting, to provide additional interest to the visual effect. Further, such a water feature may also advantageously act as a cleaning system to remove any soot, dirt, or other debris from within the device.

Aromatherapy may be incorporated in the device. For example, controlled release of incense pellets housed within the device may allow a user to change the aroma of the surrounding area. The aromatherapy may be released such that corresponds to certain flame choreography or schedule.

Misters may be incorporated, for example, around the top of a device, to allow for cooling as well as heating, thereby allowing the device to be an all season device.

Colored flames may be incorporated. Further, users may be able to control and change the color of the flame to correspond to different flame choreography or audio input. In this regard, pelletized salts may be released into the combustion chamber to control the flame color.

Finally, speakers and/or audio controls may be incorporated into the device so that the device could provide a complete audio and visual display. For example, music or fire sounds may be provided through the audio system to correspond with choreographed flames and/or schedule.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A heater with a visual flame display, comprising:
a base that includes an ignition chamber to produce a flame and that includes an exhaust vent to provide heat;
a midsection that is attached to the base and that includes inner and outer walls; and
a top section that is attached to the midsection;
wherein the flame extends from the ignition chamber through the midsection substantially to the top section; and
wherein heat from the flame is captured in the top section and drawn down to the base for release through the exhaust vents.

2. The heater of claim 1, wherein the inner and outer walls are cylinders separated by an annular gap through which heat is transferred from the top section to the base.

3. The heater of claim 1, wherein the flame forms a vortex of fire.

4. The heater of claim 3, wherein the speed of the vortex of fire is variable.

5. The heater of claim 1, wherein the color of the flame is variable.

6. The heater of claim 1, wherein the top portion includes one or more heat exchangers to capture heat from the flame.

7. The heater of claim 1, wherein the base includes a fan to create a downward force to draw heat from the top section to the base.

8. The heater of claim 7, wherein the base includes a control unit to control the speed of the fan.

9. The heater of claim 1, wherein the top section includes an air inlet opening.

10. The heater of claim 1, wherein the top section includes an exhaust vent.

11. The heater of claim 10, wherein the top section includes a circumference and a closed top surface; and wherein the exhaust vent is on the circumference of the top section.

12. The heater of claim 1, wherein the base further includes a cabinet for housing a fuel source.

13. The heater of claim 1, wherein the base further includes table top supported thereby.

14. The heater of claim 1, wherein the base further includes a system monitor for monitoring a status of the heater and providing information about the status of the heater to a computer or mobile device.

15. The heater of claim 1, wherein the base is configured to be positioned underground.

16. A heater with a visual flame display, comprising:
a base that includes an ignition chamber to produce a flame and a heating element and exhaust vent to provide heat;

a midsection that is attached to the base and that includes inner and outer walls; and a top section that is attached to the midsection; and wherein the flame extends from the ignition chamber through the midsection substantially to the top section.

* * * * *